(12) United States Patent
Nam

(10) Patent No.: US 9,077,847 B2
(45) Date of Patent: Jul. 7, 2015

(54) VIDEO COMMUNICATION METHOD AND DIGITAL TELEVISION USING THE SAME

(75) Inventor: Sangwu Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 570 days.

(21) Appl. No.: 12/964,635

(22) Filed: Dec. 9, 2010

(65) Prior Publication Data

US 2011/0181683 A1 Jul. 28, 2011

(30) Foreign Application Priority Data

Jan. 25, 2010 (KR) .................. 10-2010-0006460

(51) Int. Cl.
*H04N 7/14* (2006.01)
*G06K 9/00* (2006.01)
*H04N 5/445* (2011.01)
*H04N 21/4223* (2011.01)
*H04N 21/478* (2011.01)
*H04N 21/4788* (2011.01)
*H04N 21/485* (2011.01)
*H04N 21/442* (2011.01)

(52) U.S. Cl.
CPC ........... *H04N 7/147* (2013.01); *H04N 5/44513* (2013.01); *H04N 21/4223* (2013.01); *H04N 21/478* (2013.01); *H04N 21/4788* (2013.01); *H04N 21/485* (2013.01); *H04N 21/4854* (2013.01); *H04N 21/44218* (2013.01)

(58) Field of Classification Search
USPC ................. 348/14.01, 14.02, 14.07, 14.08; 382/118
See application file for complete search history.

(56) References Cited

U.S. PATENT DOCUMENTS

| 5,790,180 | A | 8/1998 | Wild |
| 7,404,645 | B2 * | 7/2008 | Margulis ................... 353/31 |
| 8,613,078 | B2 * | 12/2013 | Takiyama ................. 726/19 |
| 2003/0037335 | A1 * | 2/2003 | Gatto et al. .............. 725/86 |

(Continued)

FOREIGN PATENT DOCUMENTS

| EP | 1503588 A1 | 2/2005 |
| EP | 1624679 A1 | 2/2006 |

(Continued)

OTHER PUBLICATIONS

Thorpe, "Skype User Guide for Windows XP and Windows Vista," University Systems Client Technologies, retrieved from the internet: URL:http://web.uvic.ca/uvicav/Windows Skype 4.1 Guide-5.pdf; Mar. 12, 2013, XP-55056225A1, (48 pages).

*Primary Examiner* — Duc Nguyen
*Assistant Examiner* — Theodore Ndje
(74) *Attorney, Agent, or Firm* — Birch, Stewart, Kolasch & Birch, LLP

(57) ABSTRACT

A digital TV capable of video communication is discussed. According to an embodiment, the DTV for a video call operation using a camera associated with the DTV, includes a display unit and at least one processor. The processor is configured to display simultaneously, on the display unit, (a) an image received from the camera for a video call operation, and (b) different image setting items for controlling characteristics of the image received from the camera. The processor is further configured to adjust at least one of the characteristics of the image based on a user's control of at least one of the different image setting items, to display on the display unit the image having the adjusted characteristic based on the user's control, and to perform the video call operation with another party using the image having the adjusted characteristic.

7 Claims, 54 Drawing Sheets

(56) References Cited

U.S. PATENT DOCUMENTS

| | | |
|---|---|---|
| 2003/0174146 A1 | 9/2003 | Kenoyer |
| 2005/0099492 A1* | 5/2005 | Orr .................... 348/14.08 |
| 2006/0179451 A1* | 8/2006 | Sung ........................ 725/12 |
| 2006/0253330 A1 | 11/2006 | Maggio et al. |
| 2007/0092220 A1 | 4/2007 | Tanabe |
| 2007/0140532 A1* | 6/2007 | Goffin ...................... 382/118 |
| 2007/0188597 A1* | 8/2007 | Kenoyer ................. 348/14.08 |
| 2008/0098295 A1* | 4/2008 | Nelson et al. ............. 715/233 |
| 2008/0212849 A1* | 9/2008 | Gao ......................... 382/118 |
| 2009/0048908 A1 | 2/2009 | Kaplan et al. |
| 2009/0060292 A1* | 3/2009 | Sukegawa ................. 382/118 |
| 2009/0060295 A1* | 3/2009 | Inoue et al. .............. 382/118 |
| 2009/0083850 A1* | 3/2009 | Fadell et al. ............... 726/19 |
| 2009/0133051 A1 | 5/2009 | Hildreth |

FOREIGN PATENT DOCUMENTS

| | | | |
|---|---|---|---|
| EP | 2 104 349 A2 | | 9/2009 |
| JP | 2006146413 | * | 6/2006 |
| WO | WO 97/24876 A1 | | 7/1997 |
| WO | WO 98/36570 A1 | | 8/1998 |
| WO | WO 03/067517 A2 | | 8/2003 |
| WO | WO 2007/119901 A1 | | 10/2007 |

\* cited by examiner

VIDEO COMMUNICATION METHOD AND DIGITAL TELEVISION USING THE SAME

The present application claims priority benefits of Korean Patent Application No. 10-2010-006460 filed on 25 Jan. 2010 in Republic of Korea, the entire contents of which are fully incorporated by reference.

BACKGROUND OF THE INVENTION

1. Field of the Invention

The present invention relates to a video communication method using a digital TV.

2. Description of the Related Art

As digital TV and wired and wireless network technologies having more excellent signal processing and storage capacity than the existing analog TVs have commercially developed, it has been possible to provide the users with various kinds of contents services such as real-time broadcast, COD (Contents on Demand), games, news, video communication, etc., using the Internet network connected to each house, in addition to the existing broadcast media.

An example of providing contents services using the Internet network may include an IPTV (Internet Protocol TV). The IPTV technology implies transmitting various information services, video contents, and broadcast by using high speed Internet networks and providing them to the user's TVs.

Recently, concepts such as a broadband TV, a web TV, etc., have been proposed as a type of network TV, which is developed one step further from the IPTV. Unlike the existing IPTV, in the broadband TV or the web TV, there are several contents providers and a user can be provided with the contents such as various VODs, games, etc. provided by the contents provider, by individually accessing several contents providers.

In the foregoing network TV system, it is possible to provide information to the users in various types. A need exists for a method of exchanging the information and contents between the users and performing the video communication between them as needed.

SUMMARY OF THE INVENTION

The present invention has been made in an effort to provide a video communication method capable of effectively perform video communication in display devices such as a digital TV, etc., and to provide a digital TV using the same method.

A digital TV (DTV) according to an exemplary embodiment of the present invention transmits and receives video communication data by using a wired/wireless network and displays at least one of communication image according to the transmitted and received video communication data and the contents image input from the outside or stored therein on a screen.

A digital TV according to an exemplary embodiment of the present invention includes: a communication unit that transmits and receives video communication using a wired and wireless network; a video communication processor that processes the transmitted and received video communication data according to a predetermined video communication scheme; an AV processor that processes communication images according to the transmitted and received video communication data contents images input from the outside or stored therein; and a display unit that displays at least one of the communication images and the contents images processed in the AV processor on a screen.

A video communication method according to an exemplary embodiment of the present includes: transmitting and receiving video communication data by using a wired and wireless network; processing the transmitted and received video communication data according to a predetermined video communication scheme; processing communication images according to the transmitted and received video communication data and contents images input from the outside or stored therein; and displaying at least one of communication images and contents images processed in an AV processor on a screen.

A video communication method according to an exemplary embodiment of the present includes: selecting video communication services; processing a user log-in for the video communication services; and transmitting and receiving video communication data to and from video communication apparatuses of other party wishing to try video communication.

The video communication method may be implemented by a computer-readable recording medium for recording therein computer-readable programs executable with a computer.

As set forth above, embodiments of the present invention preferably implement the video communication function using the digital TV to enable the user to receive and transmit the video communication while watching the contents, thereby making it possible to improve the user convenience. In addition, the present invention can provide the user interface capable of effectively performing the video communication by using the digital TV. According to an embodiment, the invention provides a digital TV (DTV) for a video call operation using a camera associated with the DTV, the DTV comprising: a display unit; and at least one processor configured to: display simultaneously, on the display unit, (a) an image received from the camera for a video call operation, and (b) a plurality of different image setting items for controlling characteristics of the image received from the camera; adjust at least one of the characteristics of the image based on a user's control of at least one of the plurality of different image setting items; display, on the display unit, the image having the at least one adjusted characteristic based on the user's control; and perform the video call operation with another party using the image having the at least one adjusted characteristic.

According to an embodiment, the invention provides a method for controlling a digital TV (DTV) for a video call operation using a camera associated with the DTV, the DTV including a display unit and at least one processor, the method comprising: displaying simultaneously, on the display unit, (a) an image received from the camera for a video call operation, and (b) a plurality of different image setting items for controlling characteristics of the image received from the camera; adjusting, by the at least one processor, at least one of the characteristics of the image based on a user's control of at least one of the plurality of different image setting items; displaying, on the display unit, the image having the at least one adjusted characteristic based on the user's control; and performing, by the at least one processor, the video call operation with another party using the image having the at least one adjusted characteristic.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

A video communication method and a digital TV using the same method according to exemplary embodiments of the present invention will now be described with reference to the accompanying drawings. Various methods and operations of the invention discussed below can be implemented in any of the devices or systems discussed below or in any other suitable device or system. Any feature discussed in connection with one embodiment can be added to or applied to any other embodiment of the invention. Various examples of embodiments of the invention may be combined into one embodiment or example.

Figure 1:
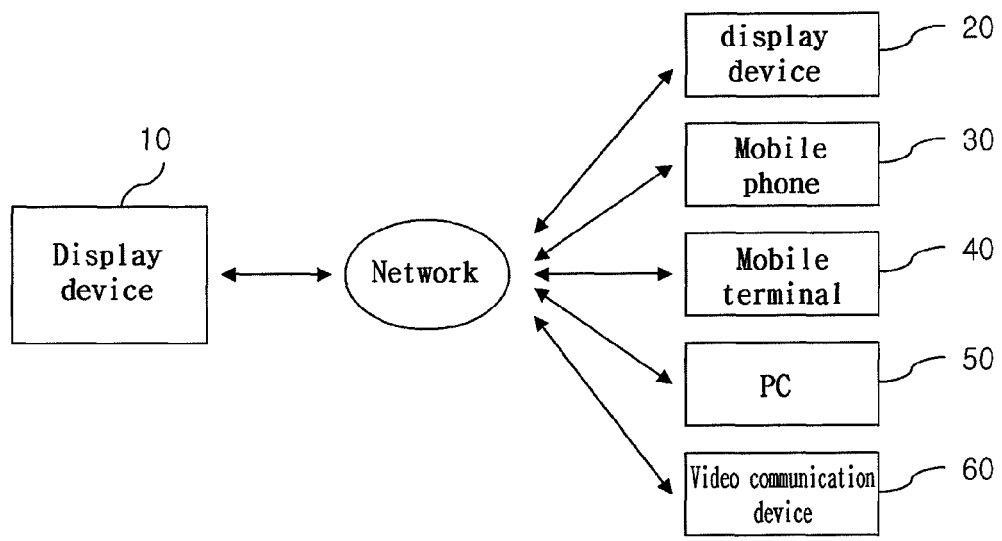
FIG. 1 is a block diagram showing a configuration of a video communication system according to an embodiment of the present invention.

FIG. 1 is a block diagram showing a configuration of a video communication system according to an embodiment of the invention.

Referring to FIG. 1, a video communication system is a system that uses a plurality of devices capable of processing, transmitting, and receiving video data and audio data so that a calling party and a called party may communicate with each other, while seeing videos transmitted from the other party. Preferably, audio sounds such as voices are also exchanged between the call parties. In the present disclosure, call parties preferably include at least one party among called party(ies) and calling party(ies). The video communication system may include a display device 10 and other devices 20, 30, 40, 50, 60, etc. communicating with each other via one or more networks. All components of the system are operatively coupled and configured.

For example, the display device 10 may use input devices such as a camera, a microphone, etc., to acquire image and audio data corresponding to the image and voice of the user and transmit the acquired image and audio data to one or more other devices 20 to 60 connected to wired and/or wireless network(s).

According to an exemplary embodiment of the present invention, the display device 10 may be a digital TV that receives and displays digital broadcasting, wherein the digital broadcasting depends on a scheme of compressing and transmitting the image and voice signals.

Meanwhile, the display device 10 may receive the image and audio data from other devices 20 to 60 connected to the wired/wireless network, such that communication may be made between the display device 10 and the external devices 20 to 60.

As shown in FIG. 1, the external device capable of performing the video communication (e.g., video conference, video chatting, etc.) with the display device 10 may be another display device 20 of a different party, a mobile terminal 40 such as a mobile phone 30, a PDA, smart phone, or a notebook computer, a PC 50, a video communication device 60, or the like.

Further, a network connecting the display device 10 with the external devices 20 to 60 can transmit and receive the image and audio data according to a communication protocol for video communication.

For example, the display device 10 and the external devices 20 to 60 may use a network depending on the protocols of Ethernet or IEEE 802.3, etc., to transmit and receive the image and audio data and use a wireless network depending on the standards of IEEE 802.11 to transmit and receive the data.

Meanwhile, the network can use voice over broadband (VoBB) or legacy services, etc., to transmit and receive data between the display device 10 and the external devices 20 to 60.

In more detail, the VoBB may include services such as a voice over cable modem (VoBB), a voice over DSL (VoSL), a voice over Internet protocol (VoIP), a fixed wireless access (FWA), a fiber to the home (FTTH), or a voice over ATM (VoATM), etc.

Meanwhile, the legacy service may include an integrated service digital network (ISDN), a plain old telephone service (POTS), a cellular or 3G service, or the like.

Therefore, the display device 10 and the external devices 20 to 60 may use a wireless network, an existing telephone network, a data network such as the Internet, etc., a cable modem system, or a cellular network, etc., to transmit and receive the image and audio data.

Meanwhile, the display device 10 and the external device 20 to 60 may transmit and receive the image and audio data according to the established protocol therebetween. For example, they may use protocols such as a H.261 standard for video data coding, a H.221 standard for image and audio data communication, and a H.242 standard for call setup and release, etc.

In more detail, the video communication system using the Internet may uses protocols implemented in video communication standards such as H.323, H.263, and H.264 standards for video coding and G723.1, G.711, and G.729 for audio coding, etc.

However, the video communication system according to the exemplary embodiment of the present invention is not limited to the above-mentioned configurations. For example, the devices 20 to 60 that perform video communication with the display device 10 are not limited the devices 20 to 60 as shown in FIG. 1 and the standards such as SIP, RTP/RTCP protocols other than (or in addition to) the above-mentioned standards may be used.

Figure 2:
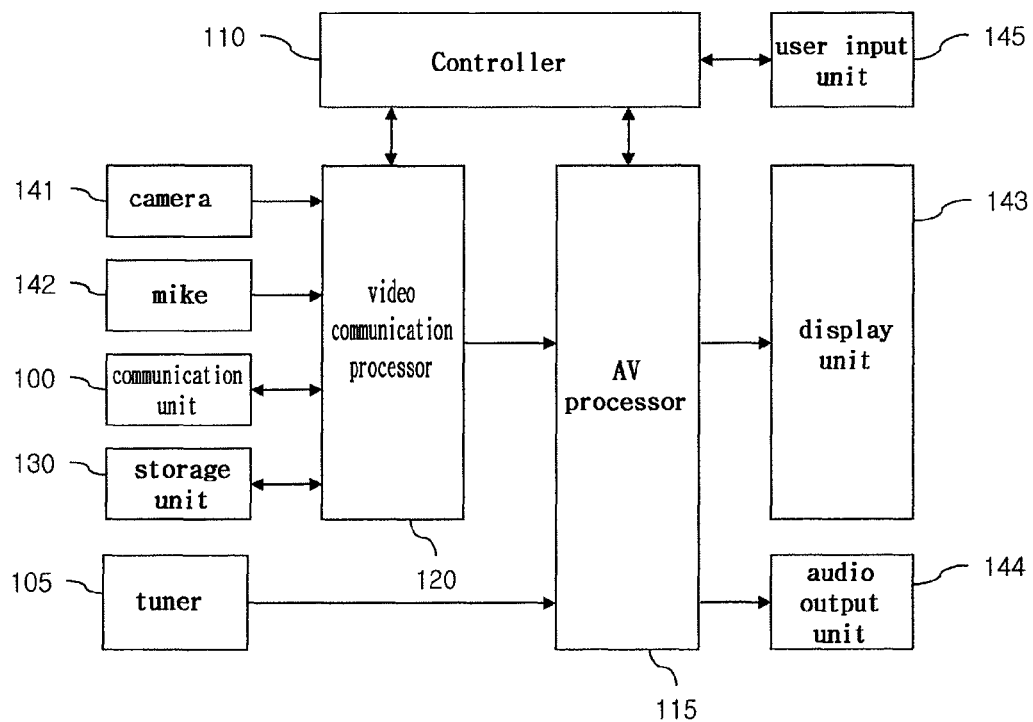
FIG. 2 is a block diagram showing a configuration of a display device according to a first exemplary embodiment of the present invention.

FIG. 2 is a block diagram of a configuration of the display device 10 (or 20) according to a first exemplary embodiment of the present invention. The display device shown may include a communication unit 100, a tuner 105, a controller (e.g., processor) 110, an AV processor 115, a video communication processor 120, a storage unit 130, a camera 141, a microphone 142, a display unit 143, an audio output unit 144, and a user input unit 145. Referring to FIG. 2, the communication unit 100 is connected to a server for video communication services or the video communication device of the other party, thereby making it possible to transmit and receive the video communication data.

For example, the communication unit 100 may transmit data streams including the AV data corresponding to the videos and audios of the user to the external devices, for example, the video communication device of another party through the wired and wireless network. Here, the video communication occurs between the user at the display device 10 and the another party at the external device.

In addition, the communication unit 100 may receive data streams including the AV data corresponding to the videos and audios of the other party performing the video communication from the video communication device of the other party.

For instance, the communication unit 100 is connected to the video communication device of the other party using the wired/wireless network such as Ethernet or IEEE 802.3, IEEE 802.11, etc., thereby making it possible to transmit and receive the AV data to and from the video communication device of the other party.

The video communication processor 120 can process and output the transmitted and received video communication data, e.g., the AV data of the user acquired by using the camera 141 and the microphone 142 and the AV data of the other party(ies) received through the communication unit 100 according to video communication protocols, such as preset video communication schemes, for example, H.323, H.2.63, or H264 standards for video data, G723.1, G.711, or G.729 for audio data, or the like.

For example, the video communication processor 120 may encode the video data according to H.323, H.263, and H.264 standards, or the like, to output a basic stream of digital data, e.g., a video stream in an elementary stream form.

In addition, the video communication processor 120 may encode the audio data according to G.723.1, G.711, and G.729 standards, or the like, to output an audio stream in an elementary stream form.

The AV processor 115 converts the image and audio data of the user (current user at the display device 10) and the image and audio data of the other party (e.g., another user at the external device 20-60) according to video communication data, for example, video communication output from the video communication processor 120 into a form that can be output from the display unit 143 and the audio output unit 144. For instance, the AV processor 115 can process the communication image of each of the involved parties to be output from the display unit 143 by using the video communication data processed in the video communication processor 120.

The AV processor 115 can process the communication voice of each of the involved parties to be output from the audio output unit 144 by using the video communication data processed in the video communication processor 120.

In addition, the AV processor 115 may convert the contents input from the outside or stored in the display device 10 into a form that can be output from the display unit 143 and the audio output unit 144.

Referring to FIG. 2, the AV processor 115 may process the digital broadcasting signals received through the tuner 105 to be output from the display unit 143 and the audio output unit 144.

In more detail, the AV processor 115 converts the communication image according to the video communication data transmitted and received through the communication unit 100 and the contents image according to the broadcasting signal input through the tuner 105 into the displayable form, such that the display unit 143 can display at least one of the communication image (e.g., picture of the other party's face) and the contents image on a screen.

The AV processor 115 may perform pre-processing operations adjusted to improve the quality of video or meet a specific purpose, for example, video processing such as readjustment of contrast, removal of noise, smoothing, sharpening, or the like.

The storage unit 130 such as a memory or database may store programs and/or user information, or the like, for the operation of the display device.

The camera 141 photographs the peripheral regions of the display device, e.g., a region including an image of the current user at the display device 10, thereby making it possible to acquire and output the corresponding video data.

Meanwhile, the camera 141 may be provided to be mounted on one side of the main body of the display device such as a web cam, etc., such that it may be disposed to photograph the front of the display device.

The mike (microphone) 142 may collect the audio generated around the display device, e.g., the audio including the voice of the user at the display device 10 and output the corresponding audio data.

Meanwhile, the mike 142 may be mounted on one side of the main body of the display device or may be disposed at the outside of the display device, for example, at a position adjacent to the user at the display device 10.

The display unit 143 may display the video of the user acquired by the camera 141, e.g., the communication image to be transmitted to the video communication device of the other party, display the communication image of the other party received through the communication unit 100 and display the video of the contents input from the outside and stored therein.

For example, the display unit 143 may display videos using various types of displays, such as a DLP (Digital Light Processing), an LCD (Liquid Crystal Display), PDP (Plasma Display Panel), etc.

Further, the audio output unit 144 may output the communication voice of the user at the display device 10 obtained by the mike 142, output the communication voice of another party involved in the video communication which is received through the communication unit 100, and transfer it to the user at the display device 10.

The user input unit 145 includes a plurality of key buttons for a user input and/or displays the plurality of key buttons using a touch panel, thereby making it possible to receive an input for controlling the operation of the display device 10 from the user.

Meanwhile, the user input unit 145 may be provided at the outside of the display device 10. For example, the user input unit 145 may be a remote controller including the plurality of key buttons for the user input.

The controller 110 controls the entire operation of the display device 10 as described above. For example, the controller 110 can control the communication processor 120, the AV processor 115, and the user input unit 145, respectively.

According to the exemplary embodiment of the present invention, the display device 10 uses a wired/wireless network to transmit and receive the video communication data and may display at least one of the communication image according to the transmitted and received video communication data and at least one of the contents images input from the outside and stored therein on a screen of the display unit 143.

Figure 3:
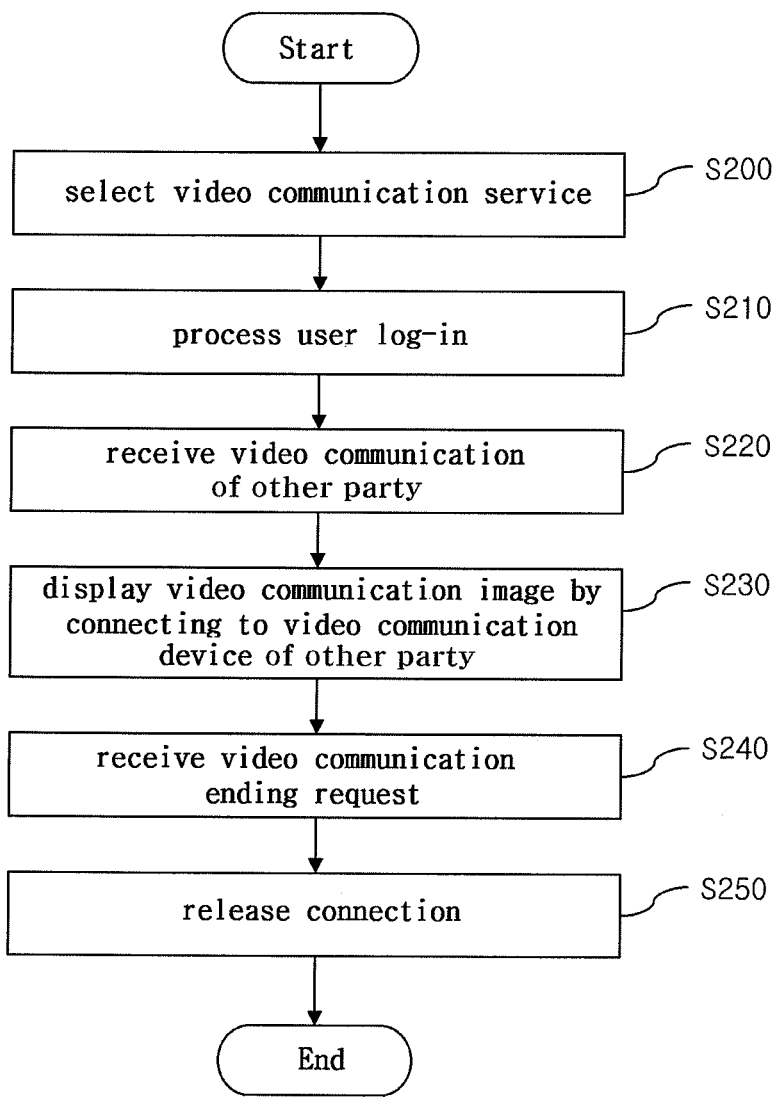
FIG. 3 is a flowchart showing a video communication method according to an exemplary embodiment of the present invention.

FIG. 3 is a flow chart showing a video communication method according to the exemplary embodiment of the present invention. The video communication method shown in FIG. 3 will be described in combination with a block diagram showing a configuration of the display device according to the exemplary embodiment of the present invention shown in FIG. 2

Referring to FIG. 3, the user input unit 145 of the display device 10 selects the video communication service identified from the user (S200) and the controller 110 processes a log-in for the user (S210).

For example, the controller 110 performs the user authentication using the user information input from the user through the user input unit 145, e.g., a user ID and a password, etc., to process the user log-in.

The user input unit 145 receives the selection command of the other party that the user wishes to try video communication with the user (S220). In this embodiment and any other embodiments of the invention, the other party includes a single party or a plurality of parties. A party can include one or more individuals who are at one or more external devices (e.g., 20-60 in FIG. 1) for video communicating with the user at the display device 10.

Thereafter, the communication unit 100 is connected to the video communication apparatus of the other party and the display 143 uses the video communication data transmitted and received through the connected wired/wireless network to display the video communication image (S230).

For example, the communication unit 100 may be connected to the video communication apparatus through the server providing the video communication services, transmit the AV data of the user acquired through the camera 141 and the mike 142 to the server, and receive the AV data of the other party transmitted from the video communication apparatus of the other party through the server.

Meanwhile, the transmitted and received video communication data, e.g., the AV (Audio and/or Video) data of the user and the AV data of the other party according to the video communication are input to the display unit 143 and the voice output unit 144 via the video communication processor 120 and the AV processor 115, such that the communication image and voice each may be output.

Thereafter, when the ending of the video communication is requested from the user (S240), the communication unit 100 releases the connection with the video communication apparatus of the other party, e.g., the wired/wireless network connected with the server, thereby ending the video communication services (S250).

The exemplary embodiments of the method for performing the vide communication using the display device or display system will now be described in more detail with reference to FIGS. 4 to 47.

The display system according to the exemplary embodiment of the present invention may be configured to include at least one of a network operator, a contents provider (CP), a service provider, and a display device.

The network operator may provide a basic software necessary to normally operate contents provided to the display device 10 by a contents provider. In addition, the network operator may provide hardware information on the display device 10 necessary to normally execute contents in the display device 10 to the contents provider.

For example, the network operator may provide a user interface that provides a main screen configured when contents provided by the contents provider is displayed on the display device 10 or allows the user to select contents or input various commands and displays the corresponding outputs. In addition, the network provider may serve to provide information for updating the firmware or software of the display device 10 each time the user interface is needed.

The contents provider may generate various contents that can be provided on the network and configure them into a format that can be reproduced in the display device 10 and provide the contents according to the request of the display device 10. The contents may be optional data that may be served through the network.

The service provider may be an Internet service provider that provides network communication among the network operator, the contents provider, and the display device 10.

The display device 10 receives the contents through the service provider in response to the request of the user and reproduces or executes them. For example, the display device 10 may be configured to include a broadcasting receiving apparatus, an optional apparatus mounted with a network module such as a telephone for a network, etc.

For example, the contents provider may be a provider that produces various contents to be provided to the display device 10. The contents provider 20 can include a TV broadcasting station, a radio station, a VOD provider, an AOD provider, a game provider, a video communication service provider, a weather information provider, and a photograph-related service provider etc.

In more detail, the video communication service provider may provide relay services that can serve to perform the video communication with the user of other network TVs through the network.

The display apparatus 10 can preferably have a network interface accessible to the network, which may be allocated with an IP address to receive and process data packets through the network and may store or reproduce the data packets when the data packets are multimedia data, such as video or an audio data.

Further, the display device 10 may be operated to transmit the user demands in two ways while processing the multimedia data. To this end, a remote controller for controlling the display device 10 may be provided with buttons for controlling the network TV, e.g., buttons for selecting various menus.

Figure 4:
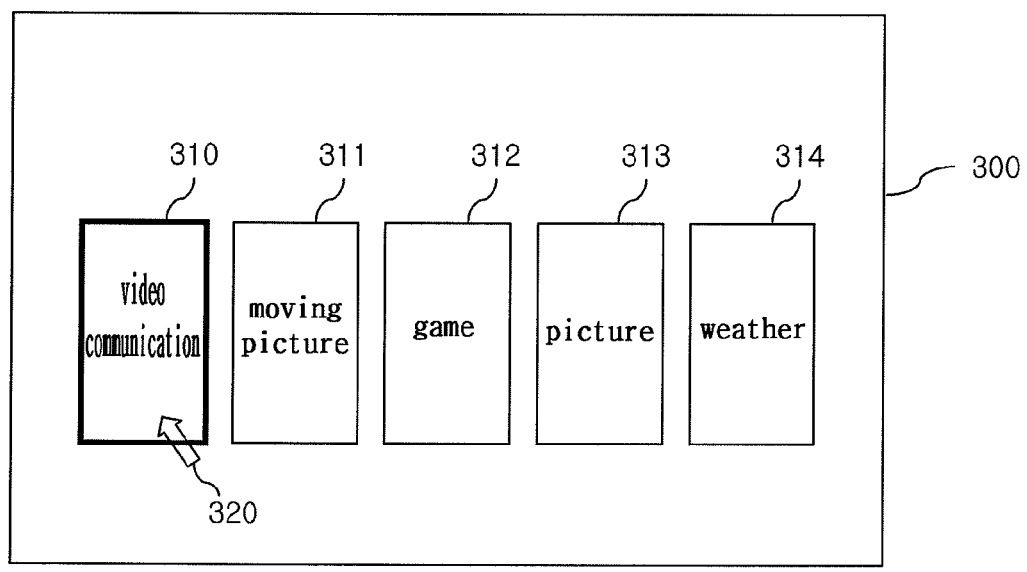
FIGS. 4 to 47 are diagrams for explaining exemplary embodiments of a method for performing video communication by using a display device.

Referring to FIG. 4, the menu screen of the display device 10 may include icons 310 to 314 each representing a plurality of contents providers.

The icons 310 to 314 displayed on the screen 300 may be buttons for accessing the servers of the plurality of contents providers. The user selects one of the icons 310 to 314, e.g., using a remote controller or mouse, to access the server of the desired contents provider, such that he/she can receive contents services from the server. The icons 310 to 314 also may be selected by a touch by the user, e.g., if the screen is a touch-sensitive screen.

According to the exemplary embodiment of the present invention, at least one of the plurality of contents providers provides the video communication services, and any one of the icons 310 to 314 displayed on the screen 300 of the display device 10, for example, the 'video communication' icon 310 may be an icon corresponding to the vide communication service.

The user may select the "video communication" icon 310 among the icons 310 to 314 displayed on the screen 300 to access the server of the contents provider and thus, receive the video communication services.

The user input unit 145 may be an input unit for performing the selection operation as described above and may be a remote control apparatus connected with the display device 10 through the wired or wireless communication manner or an apparatus sensing a motion of a portion of a body such as the user's finger or eye, etc.

For example, the remote control apparatus may be a spatial remote controller or a mouse, etc., that can recognize the operation of the user to transmit the corresponding signals to the contents reproducing apparatus.

Further, the display device 10 may include a touch panel capable of sensing the positions touched by the specific object or the motion of the touched object, such that the user may touch the screen by using his/her finger or the specific object to perform the above-mentioned selection operation.

Meanwhile, the display device 10 may include a sensing unit capable of sensing the motion of the user's eye, such that the above-mentioned user input may be received according to the motion of the user's eye.

Referring to FIG. 4, a pointer 320 moving corresponding to the motion of the above-mentioned input unit may be displayed on the screen 300, such that the pointer 320 may display the position/selection pointed by the input unit of the user.

When the user selects the video communication services, the screen for processing the user log-in may be displayed.

Figure 5:
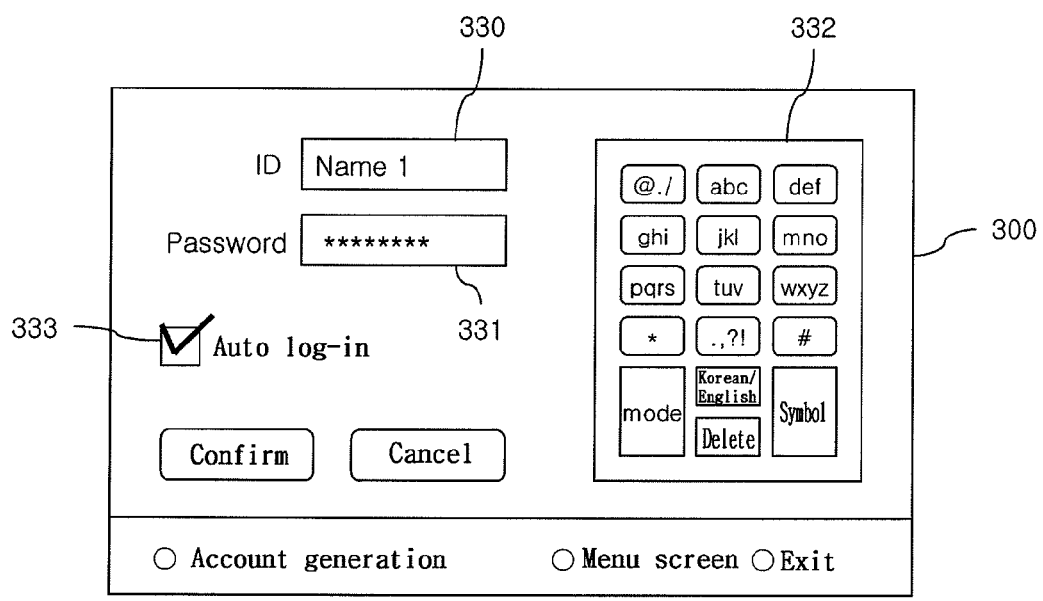

Referring to FIG. 5, input windows 330 and 331 capable of inputting a user ID and a password, respectively, are displayed on the screen 300 of the display device 10 providing the video communication services and the user may input the ID and the password by using a keypad 332 displayed on the specific region of the screen 300.

Meanwhile, when the user selects an automatic log-in for the input ID, for example, when the selection is displayed on the region 333 for the automatic log-in, the video communication service may be automatically logged-in by the input ID, e.g., 'Name 1' when turning-on the display device 10.

Figure 6:
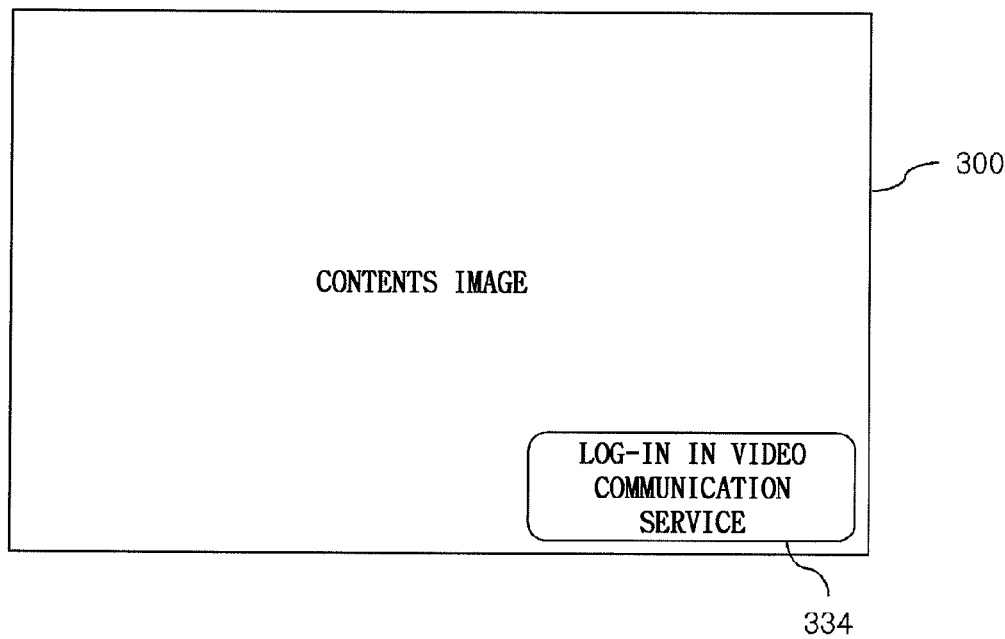

Referring to FIG. 6, when the display device 10 is turned-on, the log-in work for the ID set to be automatically logged-in is automatically performed and a pop up window 334 may be displayed on the screen 300 indicating that it is logged-in in the video communication services.

Meanwhile, when there is the video communication service ID previously registered in the display device 10, the registered IDs may be displayed on the screen 300 in response to the selection of the video communication service of the user.

For example, referring to FIG. 5, the user may input the ID and password for the video communication service by using the above-mentioned method to register the video communication service ID in the display device 10 and the user information including the registered ID and password may be stored in the storage unit 130.

Figure 7:
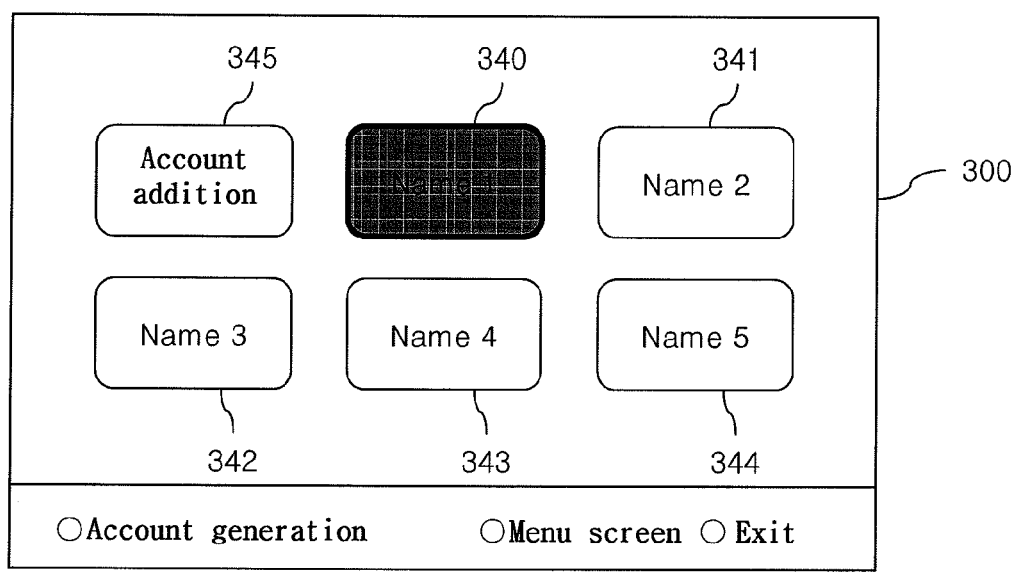

Referring to FIG. 7, when the user selects the video communication service, the information on the registered users may be displayed on the screen 300. For example, the buttons 340 to 344 corresponding to the registered user IDs, e.g., 'name 1', 'name 2', 'name 3', 'name 4', and 'name 5' may be displayed on the screen 300 for the video communication service.

Meanwhile, the currently logged-in ID among the user IDs registered in the display device 10 may be displayed on the screen 300 to be differentiated from the remaining IDs that are not logged-in.

As shown in FIG. 7, the button 340 corresponding to the currently logged-in 'name 1' among the registered user IDs may be displayed to be differentiated from the remaining buttons 341 TO 344, for example, the button 340 corresponding to the logged-in 'name 1' may be displayed in color, brightness, or form different from the remaining buttons 341 to 344.

Figure 8:
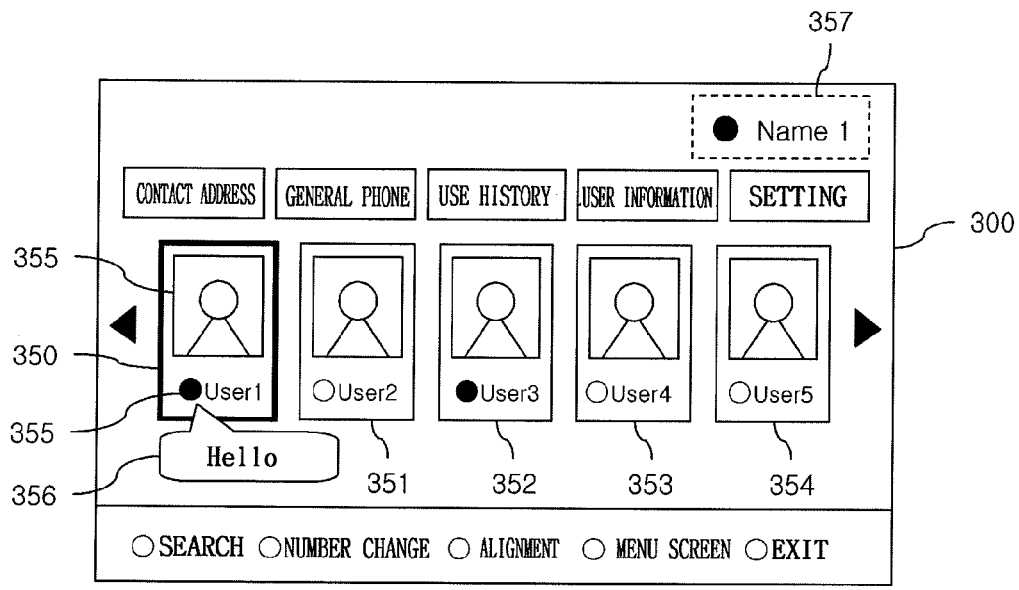

When the user selects the button 340 corresponding to the logged-in. ID, e.g., 'name 1', the plurality of items related to the video communication service as shown in FIG. 8, for example, the menu screen including 'contact address', 'general telephone', 'using history', 'user information', and 'setting items' may be displayed. For instance, when the current user having 'name 1' at the display device 10 selects 'name 1' button, then all information associated with the selected 'name 1' is discussed. Such information may include contact address (e.g., contact information of all other parties that the 'name 1' user communicates with).

Referring to FIG. 8, the registered contact addresses for the 'name 1' 357 (selected ID) may be displayed on the screen 300.

For example, the contact addresses registered under the 'name 1', that is, buttons 350, 351, 352, 353, and 354 each corresponding to 'user 1', 'user 2', 'user 3', 'user 4', and 'user 5' (other parties) may be displayed on the screen 300. These buttons are selectable items.

Further, an icon 355 for the corresponding contact address may be displayed, where the icon 355 can indicate whether or not that user is logged-in (e.g., filled-out dot indicates that user is currently logged-in), and user information such as the user ID, etc. may be displayed. In more detail, the icon 355 may be set by an image, such as a photograph of the corresponding user's face, or the like, and the setting can be done by the corresponding user.

Meanwhile, for each contact address, it may be displayed whether the corresponding ID is currently logged-in in the video communication services.

In the case shown in FIG. 8, it can be appreciated that the 'user 1' and 'user 3' among the users registered in the contact addresses are logged-in in the current video communication service and the 'user 2', 'user 4', and 'user 5' are not currently logged-in. Here, these users would generally be other users at other devices, but can include the current user who may prefer to have multiple user IDs.

Further, a message 356 set by the user of the corresponding contact address may be displayed on the screen 300, together with the above-mentioned button 350. The above-mentioned user icon 355 and message 356 may be changed by the corresponding user.

Figure 9:
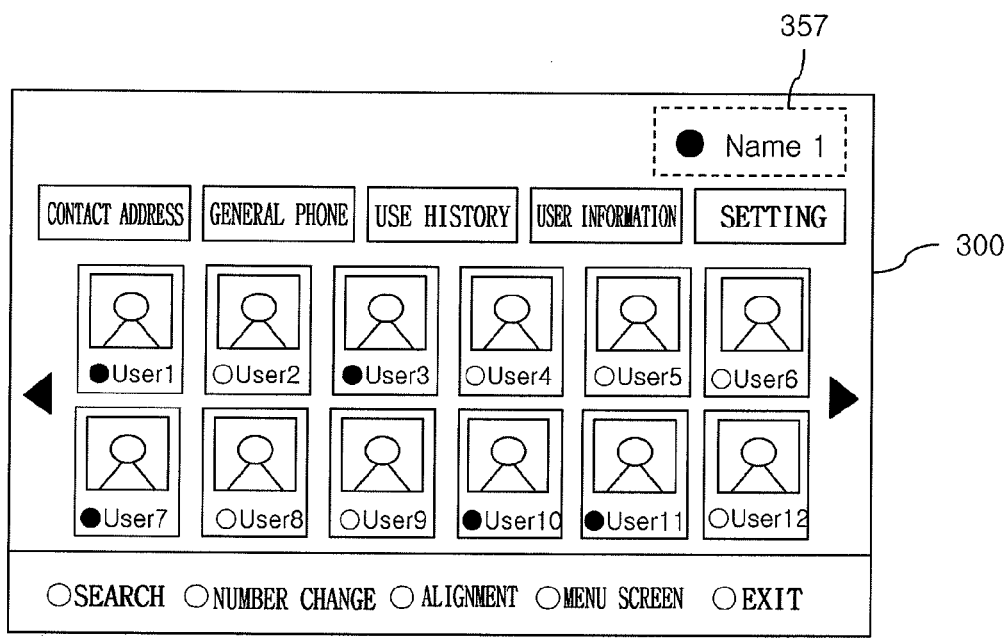

When the current user at the display device selects to display his contact addresses, the current user may change the number of contact addresses that are simultaneously displayed on the screen 300 by selecting 'number change' on the bottom portion of the screen 300 as shown in FIG. 9.

For example, when the user selects the 'number change', the contact addresses more than those shown in FIG. 8 may be simultaneously displayed on the screen 300, as shown in FIG. 9. The user (that is, the current user at the display device 10) can use the arrow buttons to scroll through his/her contact addresses.

Further, the registered contact addresses may be aligned according to the specific conditions to be displayed on the screen 300, by selecting an 'alignment' button displayed on the bottom portion of the screen 300. Here, the alignment can include a manner in which the contact addresses are displayed. For instance, the alignment can include sorting the contact addresses in a particular manner and display them in that manner.

Figure 10:
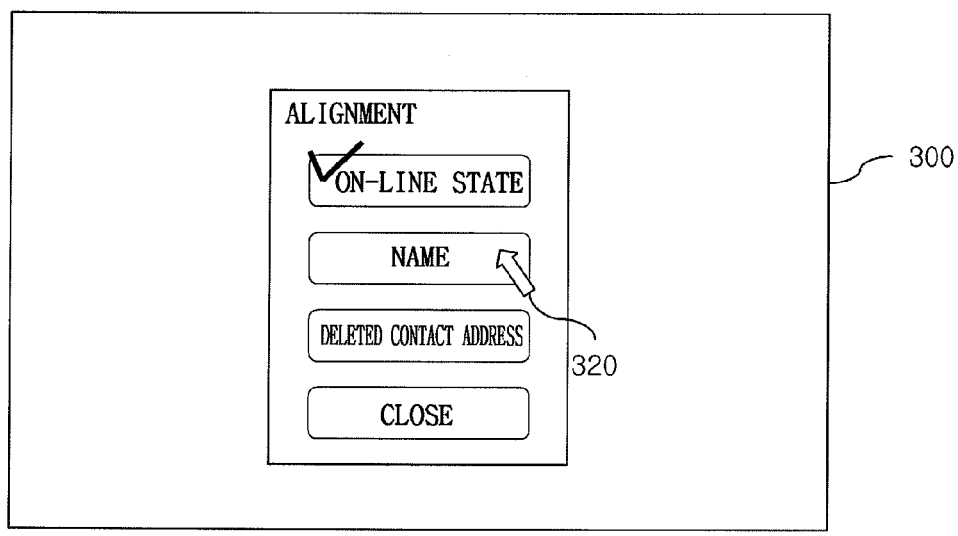

Referring to FIG. 10, each contact address registered in the current screen 300 is currently logged-in and is aligned according to whether they are in an 'on-line state' and the user may move the pointer 320 by using the input unit such as the remote control apparatus, etc., to change the alignment condition of the contact addresses in a 'name' order. Further, the user may select to display the deleted contact addresses on the screen 300.

The user selects 'search' on the bottom end of the screen 300 in FIG. 9, thereby making it possible to search the video communication service ID. For example, the user uses the keypad 332 as shown in FIG. 5 to input IDs or email addresses, etc., and to have them registered as contact addresses and can search the input IDs or email addresses in the server for the video communication service. The user can also search the stored contact addresses to quickly find a desired contact using the 'search' button.

Figure 11:
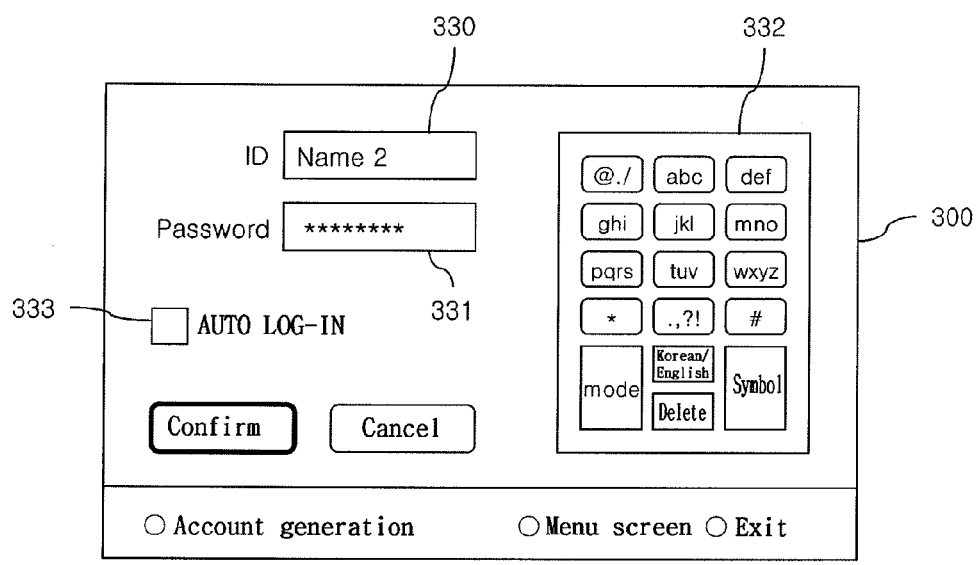
Figure 12:
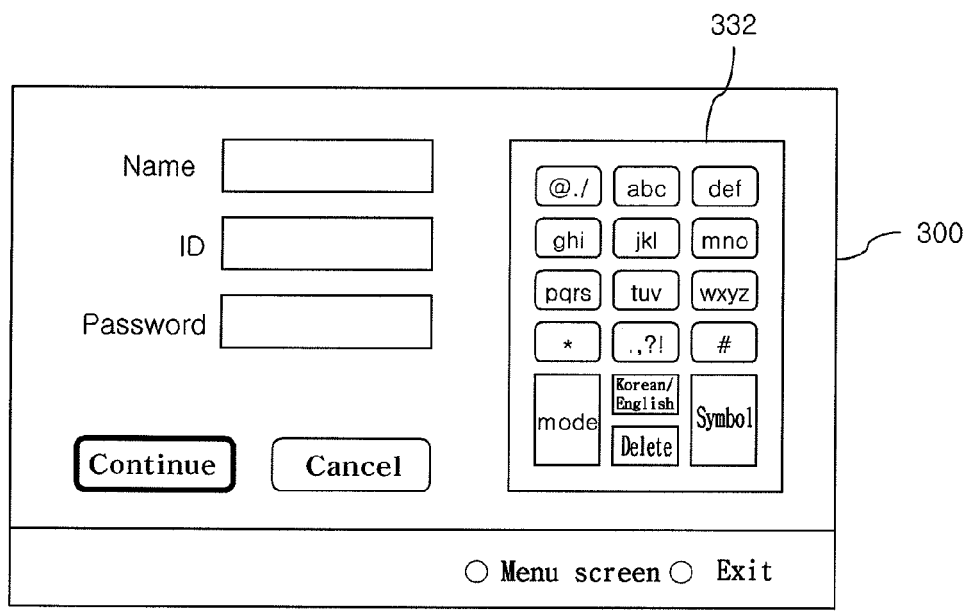

Meanwhile, when the user selects a particular ID, that is not currently logged-in, among the user IDs registered in the display device 10, for example, 'name 2', the input window 331 for inputting the password of the selected 'name 2' ID may be displayed on the screen 300 as shown in FIG. 11. Here, 'name 2' can be one of the IDs that a current user at the display device 10 decided to use for himself/herself, or can be another user if the current user knows the password for that another user.

When the user inputs the password to the password input window 331, the user authentication for the 'name 2' ID may be performed and the 'name 2' ID may be logged-in through the password acknowledgement. Here the user authentication can be performed by the display device 10 or by the server communication with the display device 10.

As described above, when the log-in for the 'name 2' ID is completed, the video communication service screen 300 as described with reference to FIGS. 8 to 10 may be displayed.

Further, when the user selects an 'account additional' button 345 shown in FIG. 7, a new video communication service ID may be additionally registered in the display device 10. In that case, referring to FIG. 12, the user may input a user name, ID, and password that will be additionally registered by using the keypad 332 displayed on the screen 330.

Figure 13:
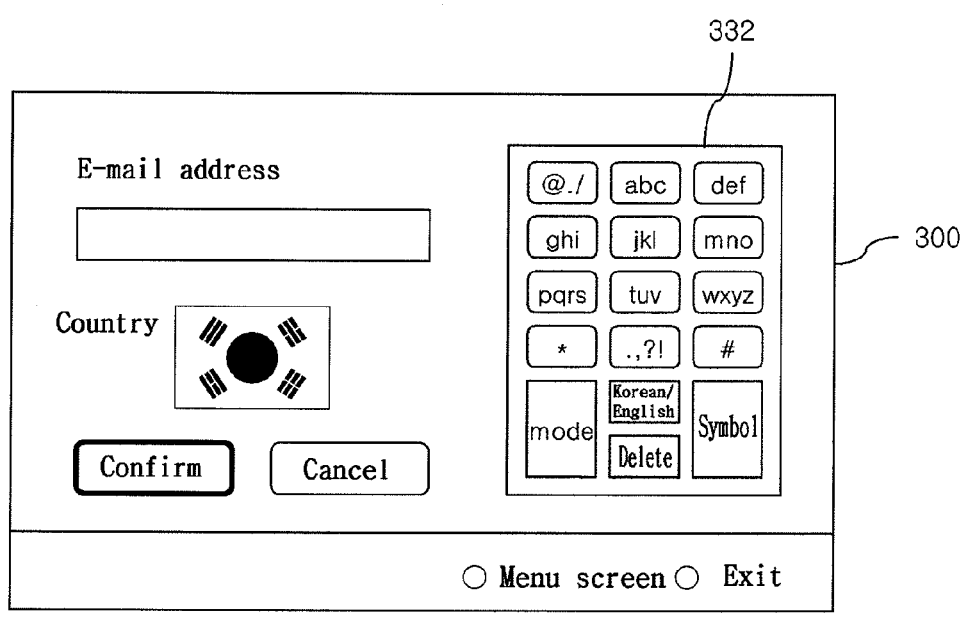

In addition, when the user name, ID, and password are input and a 'continue' button is then pressed, the user information, for example, the user interface for inputting email addresses and countries, etc., may be displayed on the screen 300 as shown in FIG. 13.

The user may input email addresses by using the keypad 332 and automatically set countries, referring to countries or using languages, etc., set in the display device 10.

As described above, the information on the added user ID may be stored in the storage unit 130 in the display device 10 and the server for the video communication services, respectively.

Hereinafter, the exemplary embodiment of the video communication method according to the present invention will be described, by way of example, the case of performing the video communication by selecting the currently logged-in user ID, for example, 'user 1' in the screen 300 shown in FIG. 7.

Figure 14:
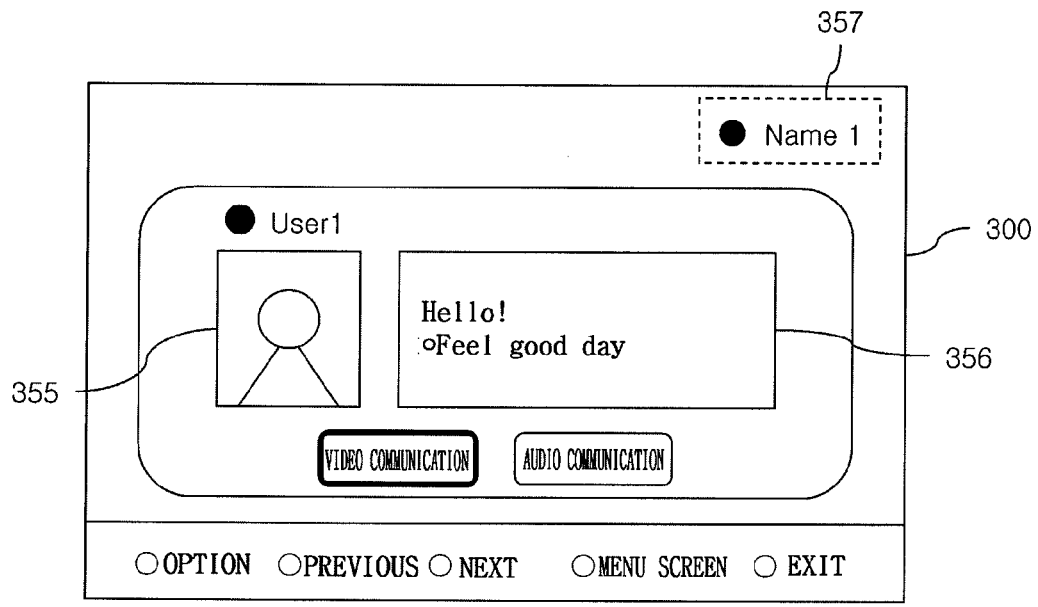

Referring to FIG. 14, when the user (current user at the display device 10) selects the 'user 1' as the other party that he/she wants to have the vide communication with (e.g., video talk/conference/chat), the information on the 'user 1' and the buttons for selecting the type of communication may be displayed on the screen 300. Video communication includes video and audio if available, while audio communication preferably includes audio (voice) but not video.

For example, the icon 355 and the message 356 set by the 'user 1' that is the other party involved in the communication with the current user identified by the icon 357 is displayed. The user can select the 'video communication' button or the 'audio communication' button, thereby making it possible to request the communication with the 'user 1'. The user selects the 'video communication' button to request the image communication with the 'user 1' or selects the 'audio communication' button to request the voice communication with the 'user 1'.

Meanwhile, information/icon 357 on the user currently using the video communication service may be displayed on the specific region of the screen 300, for example, the top portion thereof.

The user information 357 displayed on the screen 300 may include information on the name, ID, current status, and credit for using video communication service of the corresponding user, etc.

The user may access the server for the video communication service to charge the credit card and receive the video communication service by using the credit card, wherein the charged amount can be displayed as part of the user information 357. The charges incurred due to the video communication service can be updated and displayed as updated in real time as part of the user information 357.

Figure 15:
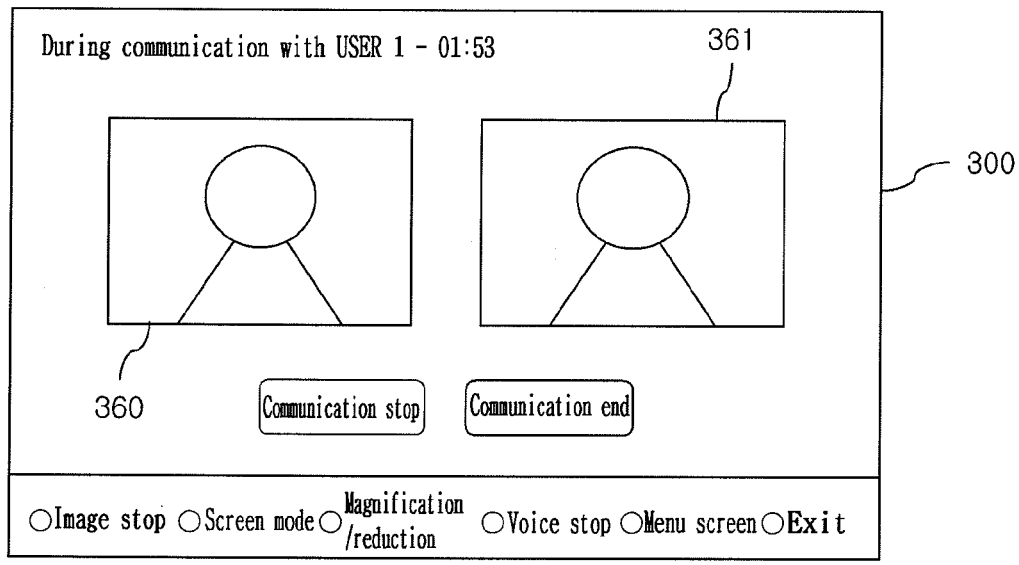

When the user selects the 'video communication' button, the communication image 360 of the other party at another device and the communication image 361 of the current user at the display device 10 may be displayed on the screen 300 as shown in FIG. 15.

Meanwhile, the user selects a 'screen mode' item on the bottom portion of the screen 300, thereby making it possible to change the type, size, or position in which the communication image 360 of the other party and the communication image 361 of the user are displayed on the user's screen 300.

Figure 16:
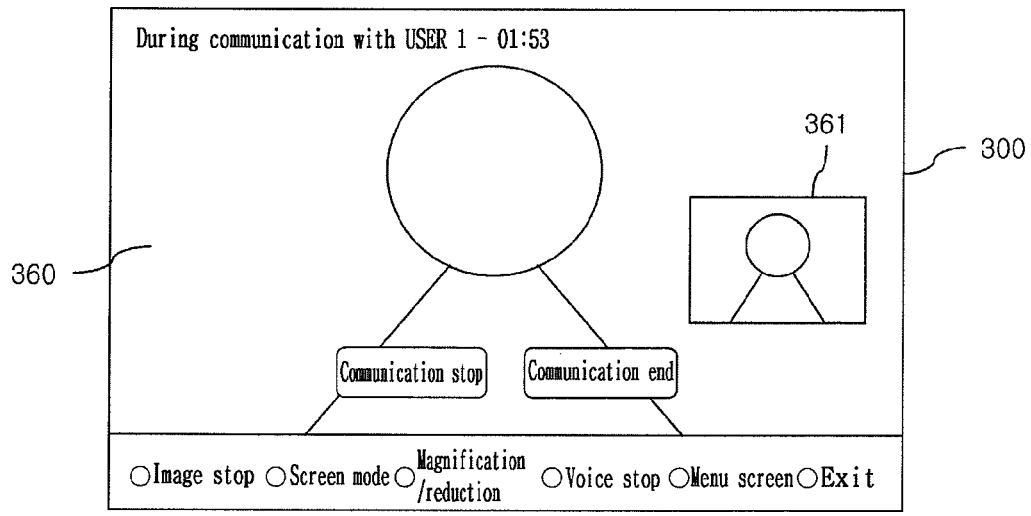

For example, when the user selects the "screen mode', the communication image 360 of the other party is displayed in the entire region (or main region) of the screen and the communication image 361 of the user may be displayed in a specific region of the screen 300 at a size smaller than the size of the communication image 360 of the other party, as shown in FIG. 16.

Alternatively, the user may select the 'screen mode' item to display only the communication image 360 of the other party on the user's screen 300.

When the user selects a 'voice stop' item on the bottom portion of the screen 300, the voice of the user is not transmitted to the other party's device. To this end, the operation of the mike 142 stops or the audio data of the user acquired by the mike 142 may not be transmitted to the video communication apparatus or the server of the other party or the user. In this case, the image indicating that the transmission of the communication voice is stopped may be displayed in the portion of the communication image 361 of the user as shown in FIG. 17.

Figure 17:
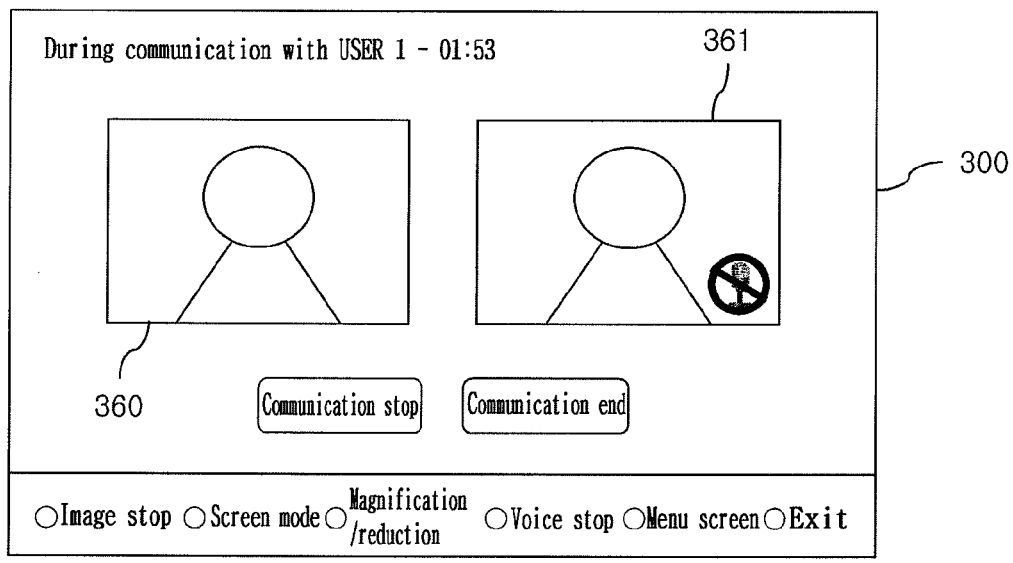

The user may select the 'communication stop' button on the image communication screen 300 to stop or pause the currently progressing video communication for a desired time, as shown in FIGS. 15 to 17.

Figure 18:
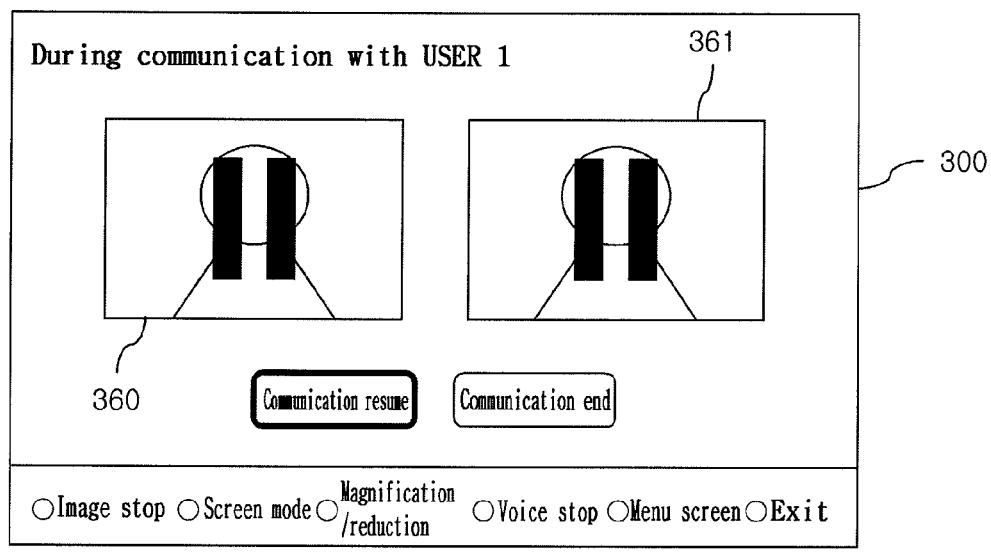

Referring to FIG. 18, when the user selects the 'communication stop', the communication image 360 of opponent and the communication image 361 of the user are stopped and the image indicating that the communication is stopped may be displayed in each of the communication images 360 and 361. The communication images in this example or other examples are preferably images of the parties involved in the video communication, which may be real-time image/video of the parties or may be snap shots of the parties previously stored or taken at the beginning of the current video communication.

In this case, the operations of the camera 141 and the mike 142 may be stopped or the transmission and reception of the video communication data, e.g., transmission/reception of the AV data of the user and the AV data of the other party may be stopped Further, the user may select a 'communication resume' button shown in FIG. 18 to start the stopped video communication as described above or to resume the video communication.

Meanwhile, the user selects the 'audio communication' button on the screen 300 as shown in FIG. 14, thereby making it possible to perform the voice communication with the 'user 1'.

Figure 19:
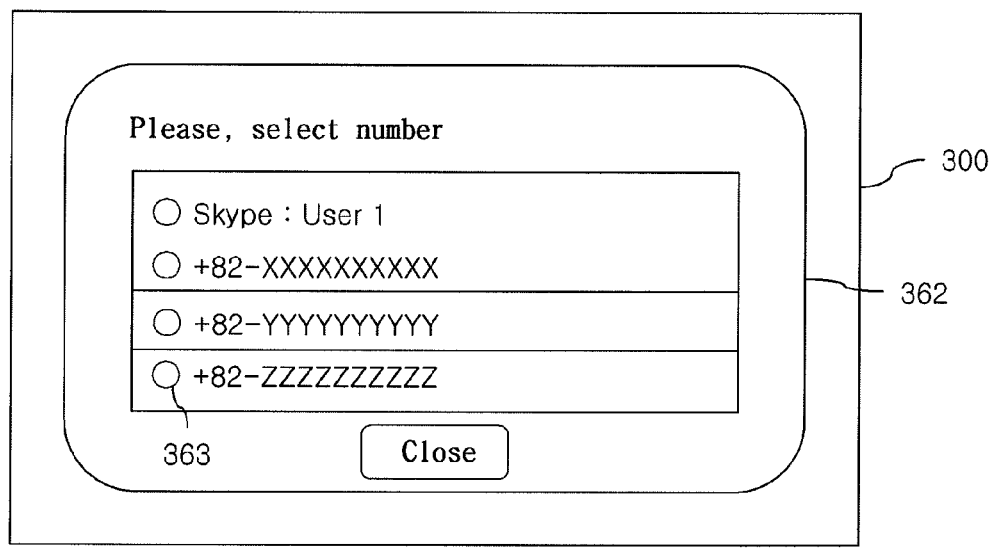

Referring to FIG. 19, when the user selects the 'audio communication' with the 'user 1', the selection window 362 capable of selecting the contact address that wants to try the voice communication among the contact addresses related to the 'user 1' may be displayed on the screen 300.

For example, the selection window 362 may include the contact addresses stored in the storage unit 130 corresponding to the 'user 1', which corresponds to the user ID of the video communication service. In this example, 'Skype', and '+82-XXXXXXXXXX', '+82-YYYYYYYYYY', and '+82-ZZZZZZZZZZ' are displayed as selectable voice telephone numbers associated with the 'user 1'.

Meanwhile, the icons 363 corresponding to each of the displayed contact addresses may be displayed on the selection window 362 and the user may easily identify the contact addresses by using the icons 363.

When the user selects '+82-YYYYYYYYYY' among the contact addresses, the voice communication is established and connected by the '+82-YYYYYYYYYY' number, thereby making it possible to perform the voice communication with the 'user 1'.

Figure 20:
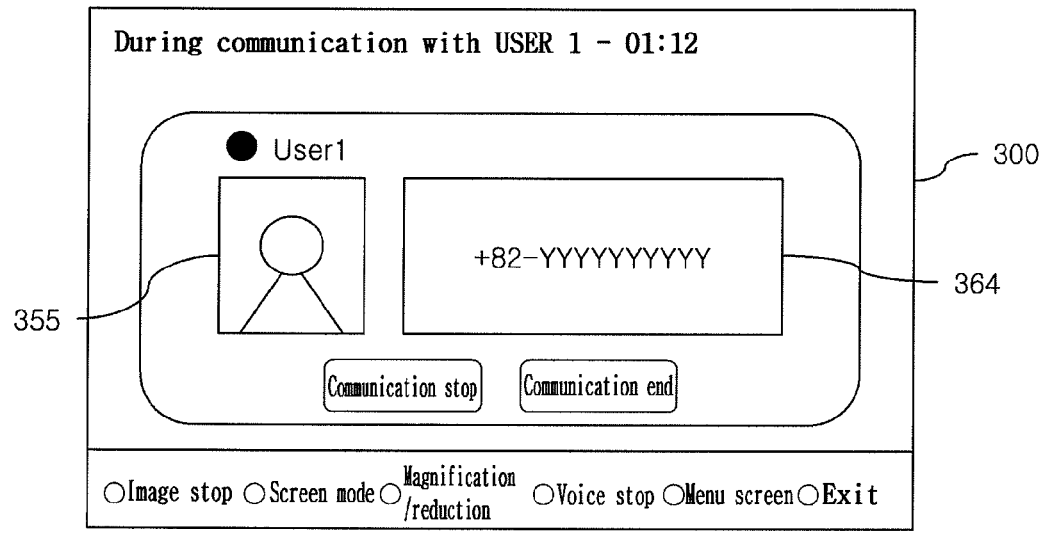

Referring to FIG. 20, the icon 355 corresponding to the other party ('user 1') involved in the communication, 'and the information window 364 for the currently connected voice telephone number may be displayed on the screen 300 during the voice communication.

Figure 21:
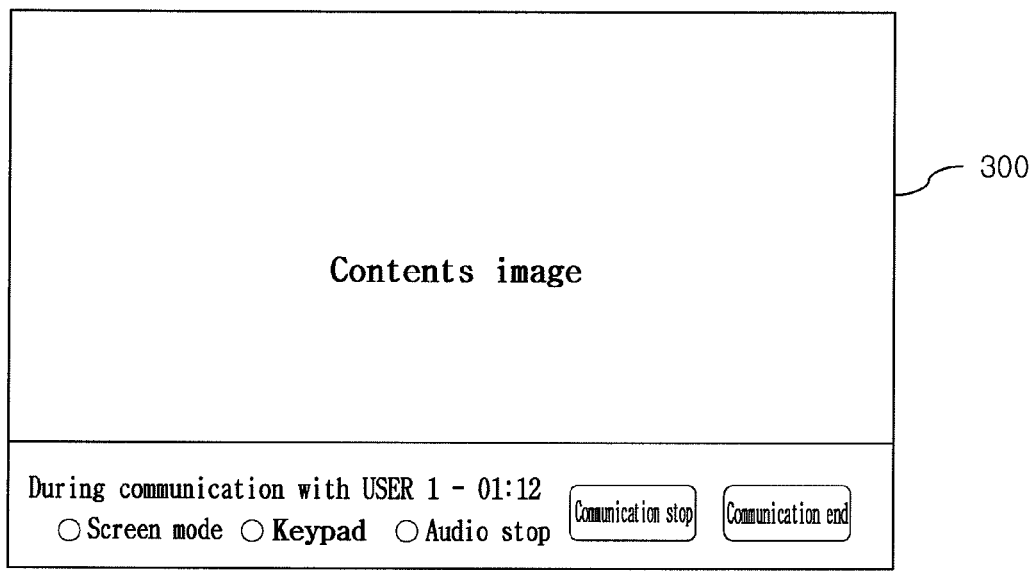

Meanwhile, as shown in FIG. 21, the image of contents input from an external source or stored in the display device 10, for example, the image of the broadcasting received through the tuner 105 may be displayed on the screen 300 while the voice communication is progressed.

For example, when the user selects the 'screen mode' item on the lower portion of the screen 300 shown in FIG. 20, the voice communication may be progressed by the configuration of the screen 300 as shown in FIG. 21 while the contents image (e.g., broadcasting program or TV program) is displayed on the screen 300. In this case, the output of the voice of the contents, for example, the voice of the broadcasting received through the tuner may be stopped while the voice communication is performed.

Figure 22:
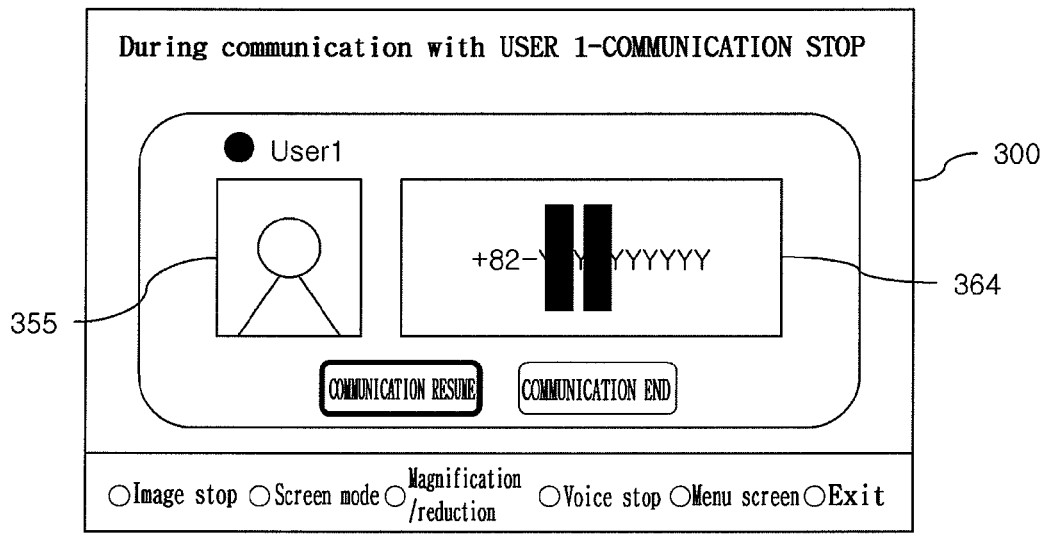
Figure 23:
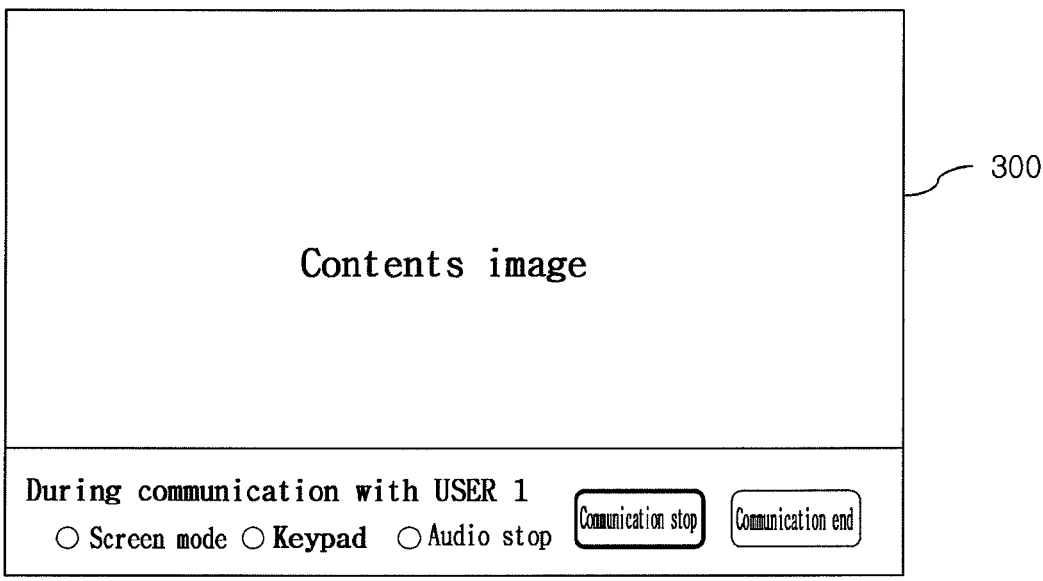

Further, as shown in FIGS. 22 and 23, the user selects the 'communication stop' during the voice communication, thereby making it possible to stop or pause the voice communication with the currently communicating 'user 1' for a predetermined time.

Figure 24:
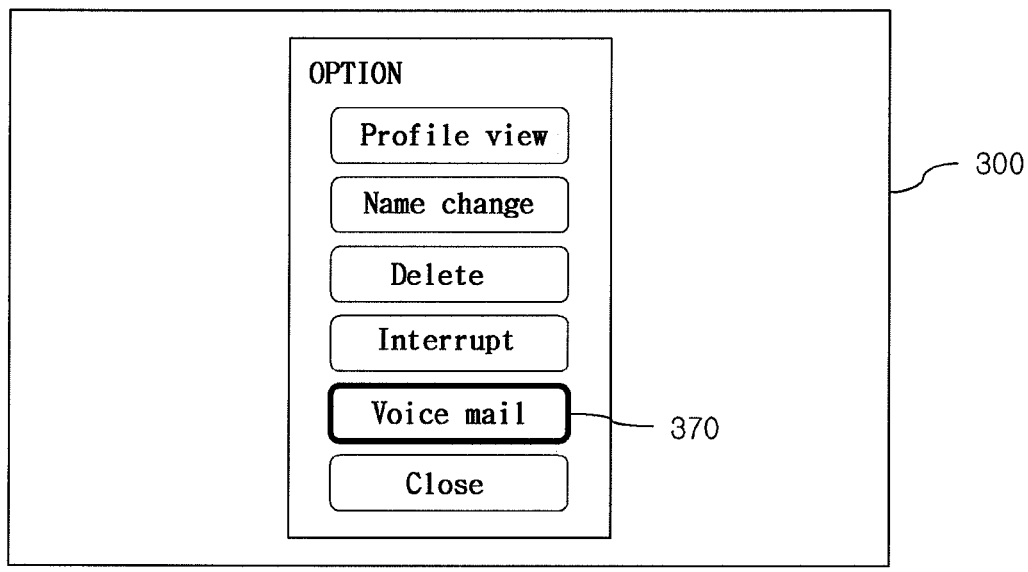

When the user selects an 'option' item on the screen 300 shown in FIG. 14, optional operations may be provided as shown in FIG. 24. For example, the user can select a 'profile view' item among the items displayed on the screen 300, thereby making it possible to confirm the profile for the 'user 1', e.g., information such as name, birth date, age, sex, address, and using language, or the like.

The user can select a 'name change' item, thereby making it possible to change the name of the 'user 1' displayed on the screen 300.

In addition, the user can select a 'deletion' item, thereby making it possible to delete the 'user 1' from the registered contact addresses and can select an 'interrupt' item, thereby making it possible to interrupt the image/video communication or the voice/audio communication received from the 'user 1'.

According to the exemplary embodiment of the present invention, the user can select a 'voice mail' item among the items displayed on the screen 300, thereby making it possible to transmit the voice mail (voice message) to the 'user 1'.

Figure 25:
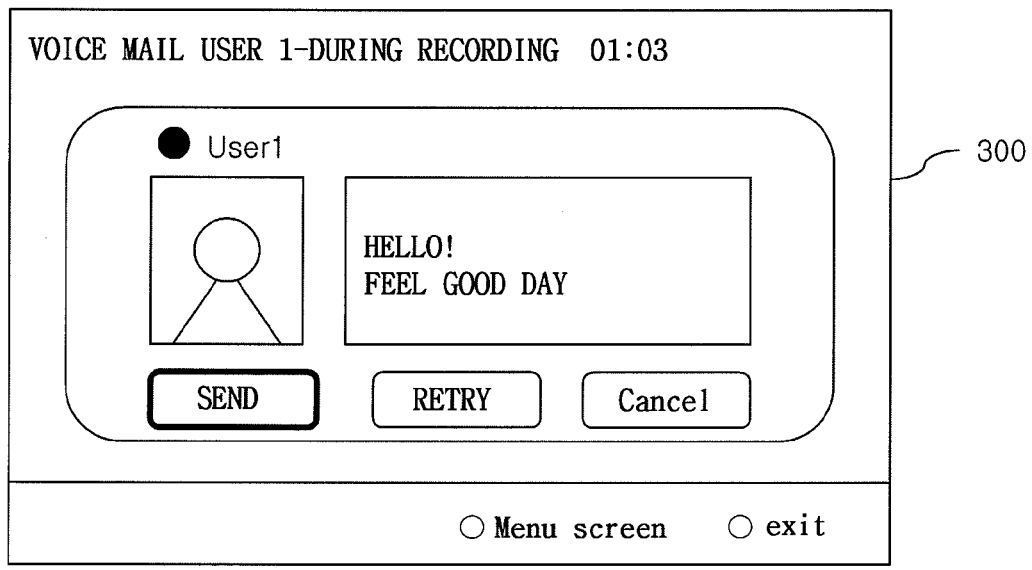

In that example, referring to FIG. 25, the voice of the user is recorded by the mike 142 to acquire the corresponding audio data and when the user selects a 'send' button, the acquired audio data (e.g., recorded voice message) of the user may be transmitted to the display device or other device of the 'user 1' through the server.

The user can select an 'exit' item displayed on the bottom portion of the screen 300, thereby making it possible to end the video communication services.

Figure 26:
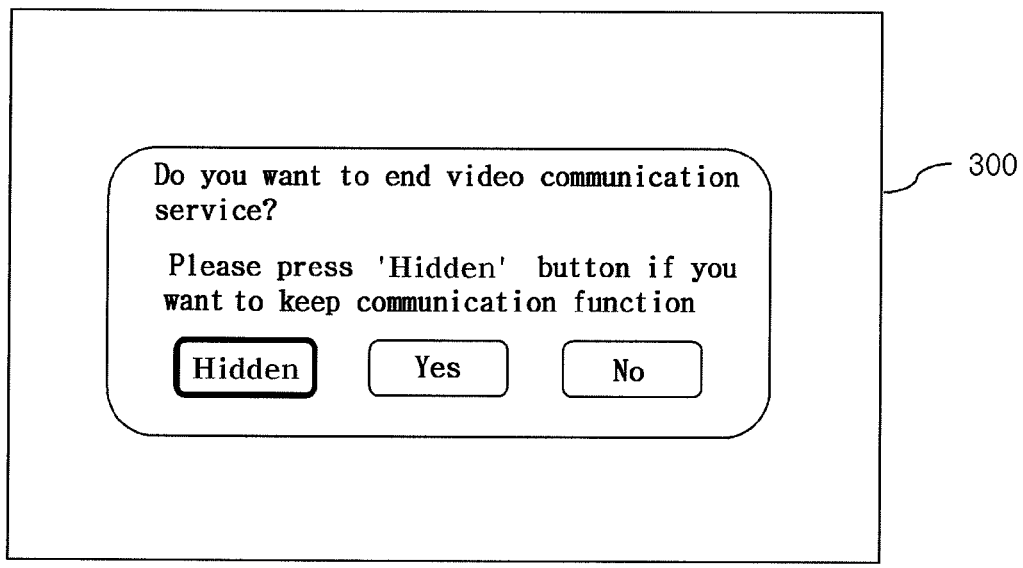

Referring to FIG. 26, when the user selects the 'exit' button, buttons such as 'hiding', 'yes', and 'no' may be displayed on the screen 300.

When the user selects the 'hiding' item, the user ID logged-in in the current video communication service, for example, the communication function for the 'name 1' is maintained, thereby making it possible to receive the image communication and the voice communication for the 'name 1'. Thereafter, when the user selects the video communication services of the user, the 'name 1' may be displayed by the currently logged-in ID as shown in FIG. 7.

Figure 27:
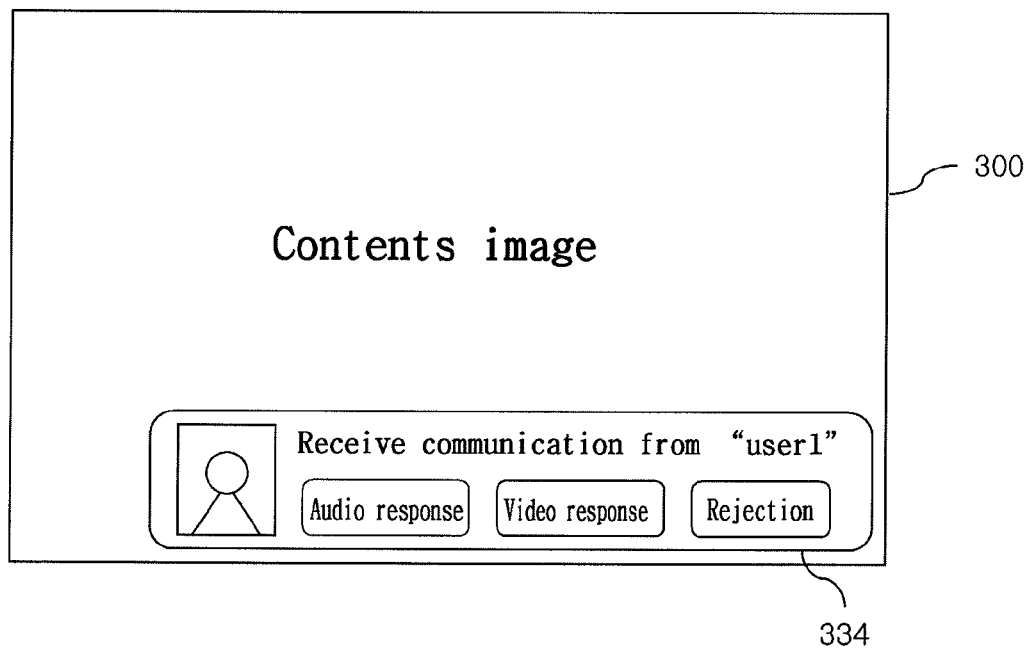

Meanwhile, when the user selects the 'hiding', the contents image, for example, the broadcasting image received through the tuner 105 may be displayed on the screen 300, as shown in FIG. 27.

In this case, when the communication is received by the 'name 1' that is currently logged-in, the pop up window 334 informing the reception of communication may be displayed on the screen 300.

The user may select any one of the buttons displayed on the pop up window 334, e.g., 'audio/voice response', 'vide/image response', and 'rejection' and when the user selects the 'rejection', he/she may not respond to the communication received from the 'user 1'.

Meanwhile, the user can select the 'audio response', thereby making it possible to perform the voice communication in response to the communication received from the 'user 1'. For example, when the image communication is received from the 'user 1', the user selects the 'audio response', thereby making it possible to reject the image communication with the 'user 1' and communicate with the 'user 1' by using only the voice or audio.

Further, the user can select the 'video response', thereby making it possible to perform the image/video communication with the 'user 1'.

When the user selects the 'audio response' or 'video response' for the communication received from the 'user 1' to perform the communication, the user interface provided to the user may be the same as one described with reference to FIGS. 15 to 26. As such, the user can continue with the communication with the 'user 1' while viewing the contents image such as broadcast images, downloaded images, online images, videos from DVDs or other storage devices, etc. Further, the contents image can be other images such as documents, texts, pictures, etc.

Figure 28:
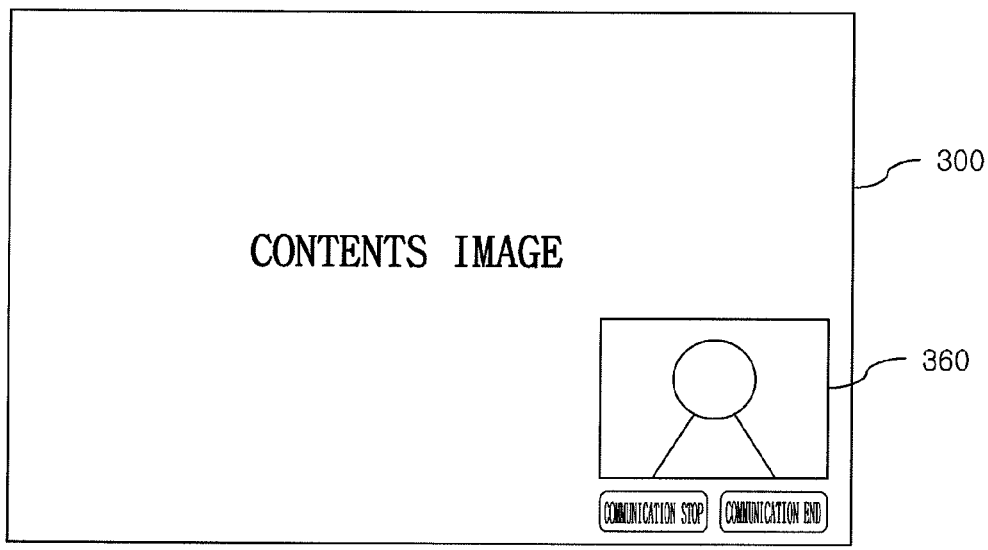

Referring to FIG. 28, the contents image and the communication image, for example, the communication image 360 of the other party may be displayed on the screen 300 together.

For example, the AV processor 115 may simultaneously process the video communication data input from the video communication processor 120 and the image and audio data of the contents input from the tuner 105, such that the user can perform the video communication while watching the contents using the same single screen of the display unit 143.

As the exemplary embodiment of the present invention, any one of the contents image and the communication image may be displayed on the screen 300 in a picture in picture (PIP) format.

For example, as shown in FIG. 28, the contents image, for example, the broadcasting image is displayed on the entire (or main) region of the screen 300 as the main screen and the communication image 360 may be displayed in a part of the screen 300 as the sub screen.

Alternately, the communication image is displayed in the entire (or main) region of the screen 300 as the main screen and the contents image being watched by the user may be displayed in a part of the screen 300 as the sub screen.

In another variation, the contents image is displayed in the entire/main region of the screen 300 as the main screen and the communication image 360 of the other party and the communication image 361 of the user may be each displayed as the sub screen.

Further, the position or size, or the like, in which the contents image or the communication image is displayed may be changed according to the request of the user or the characteristics of the image to be displayed.

In more detail, the sub screen may be positioned in an empty region of the image displayed on the main screen, for example, a full white or a full black region of the displayed image.

As described above, when any one of the contents image and the communication image is displayed in a PIP format, the image of the main screen may be covered by the image displayed by the sub screen. In this case, the transparency of the image displayed as the sub screen may be controlled and thus, the contents image and the communication image may be simultaneously displayed in the region of the sub screen, while overlapping with each other. For example, in the case shown in FIG. 28, the transparency of the communication image 360 displayed in the sub screen may be controlled according to the request of the user and the contents image may be displayed in the main screen while the communication image 360 overlaps with the communication image 360.

According to the above-mentioned exemplary embodiment, since the communication image 360 may be displayed transparently over the contents image or may be displayed in a background area of the contents image, the phenomenon that a part of the contents image being watched by the user is not visible due to being covered by the communication image 360 during the video communication can be prevented or minimized.

Therefore, the user may continuously watch without maximally losing the previously watched contents, while responding to the video communication, even when the video communication is received during the viewing of the contents, such that the viewing of the contents and the video communication may be simultaneously and effectively performed using a single screen or display unit at the same time.

As another exemplary embodiment of the present invention, the contents image and the communication image may be displayed on the screen 330 in the PIP format. For example, the contents image and the communication image may each be displayed in other regions in which they do not overlap with each other. For example, the contents image is displayed in the first region of the screen 300 and the communication image 360 of the other party may be displayed in the second region that does not overlap with the first region. The first and second regions may not overlap but may touch each other.

In addition, the communication image 361 of the user may be displayed in a third region that does not overlap with the first and second regions in the screen 300.

The size, position, etc., of each of the displayed contents image and communication images 360 and 361 may be changed according to the request of the user.

Figure 29:
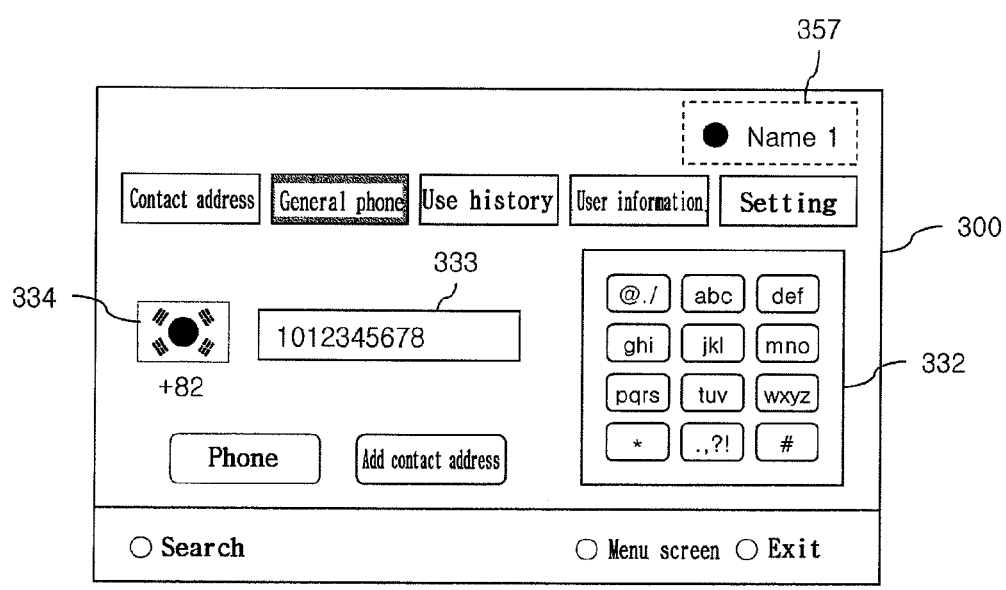

Referring to FIG. 29, when the user selects the 'general phone' among the video communication service items displayed on the screen 300, he/she can communicate with the other party by inputting the general telephone number of the other party.

As shown in FIG. 29, when the user selects the 'general phone', the input windows 333 and 334 for inputting a country and a telephone number, respectively, may be displayed on the screen 300.

After the user inputs the country of the other party with whom he/she wants to communicate, the user inputs the desired telephone number by using the keypad 332 and selects the phone button, thereby making it possible to request the communication by the corresponding telephone number. As a result, the user can make general phone calls or video calls using the display device 10.

Figure 30:
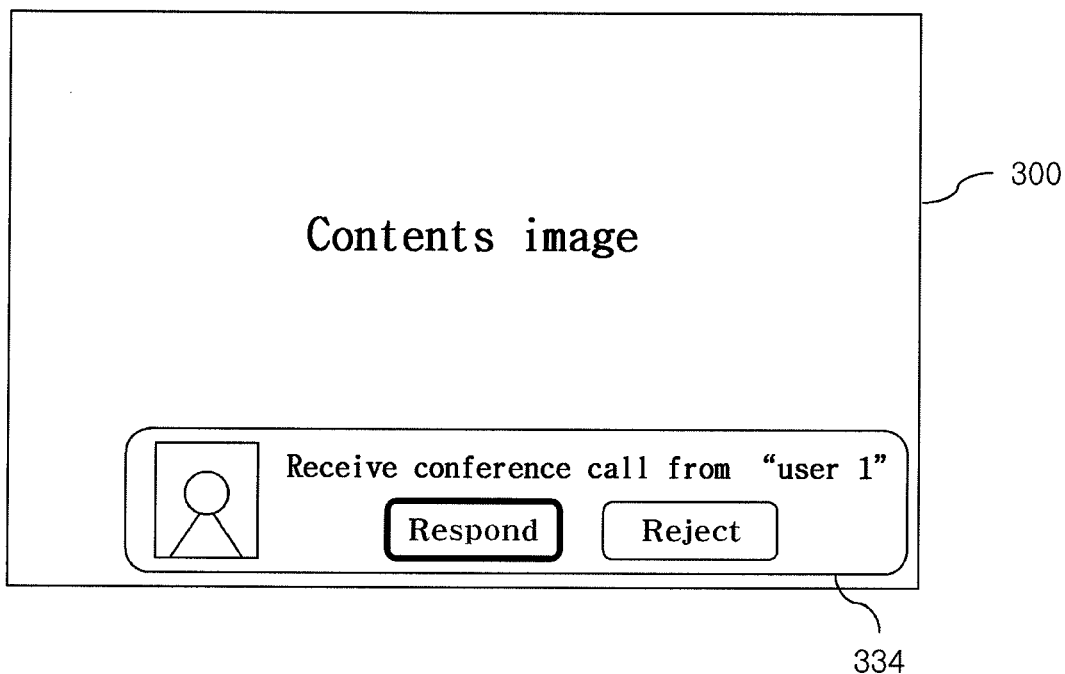

According to an exemplary embodiment of the present invention, the user may perform a conference call with a plurality of users simultaneously by using the display device 10. Referring to FIG. 30, when a conference call is received by the 'name 1' (user) that is currently logged-in, a pop up window 334 informing the call reception (call from 'user 1') may be displayed on the screen 300.

The user may select any one of the buttons displayed on the pop up window 334, e.g., 'respond' and 'reject' and when the user selects the 'reject', he/she may not respond to the conference call received from the 'user 1'.

Meanwhile, the user can instead select the 'respond' item, thereby making it possible to participate in the conference call in response to the conference call received from the 'user 1'.

Figure 31:
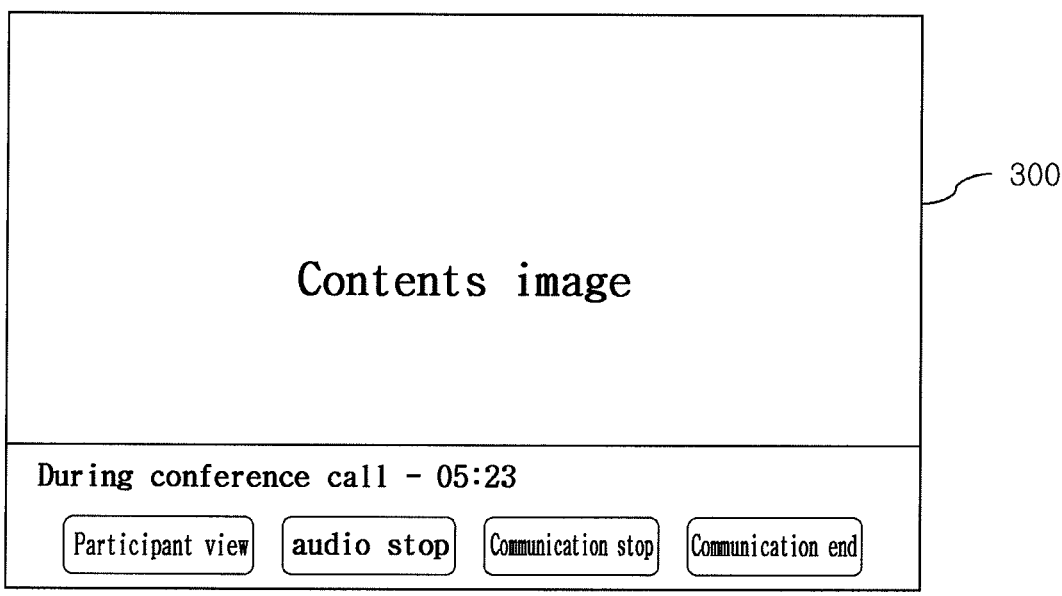

Referring to FIG. 31, the information on the progressing conference call (on-going conference call) may be displayed on a specific region of the screen 300, for example, the bottom portion thereof.

Figure 32:
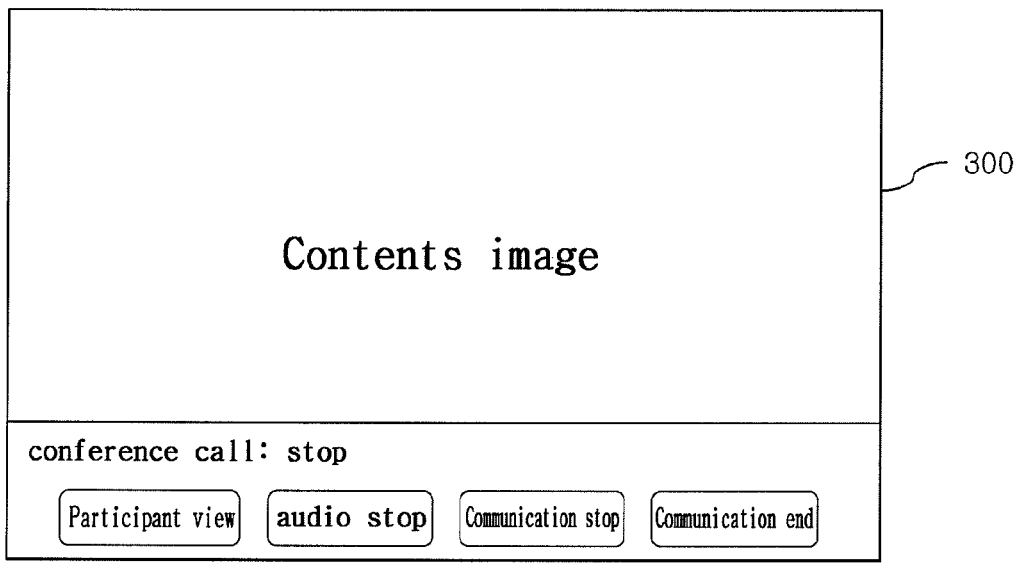

Meanwhile, when the user selects the 'audio stop' button displayed on the bottom portion of the screen 300, the conference call may be stopped or the audio may be stopped/muted as shown in FIG. 32, such that the voice of the user may not be transmitted to the other parties and/or the conference call may be stopped. In variations, the 'communication stop' button may be used to stop/pause the audio and video communication, and 'communication end' may be used to end the communication.

Figure 33:
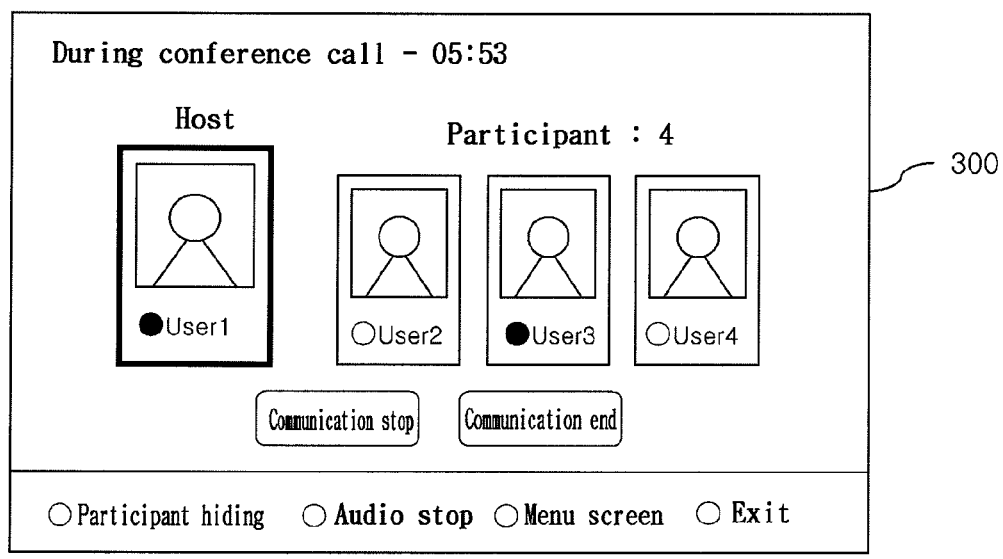

When the user selects a 'participant view' button on the bottom portion of the screen 300, the information on the other parties participating in the currently progressing conference call, for example, the information on each of the 'user 1', 'user 2', 'user 3', and 'user 4' and the total number of participants, or the like, may be displayed on the screen 300 as shown in FIG. 33.

The information on each of the other parties displayed on the screen 300 may include an icon, a name, a user ID, and a log-in state, or the like, corresponding to the corresponding user.

In addition, a 'host' holding a conference call among the other parties participating the conference call may be displayed or identified, for example, the 'user 1' among the other parties may be displayed as a 'host'.

Figure 34:
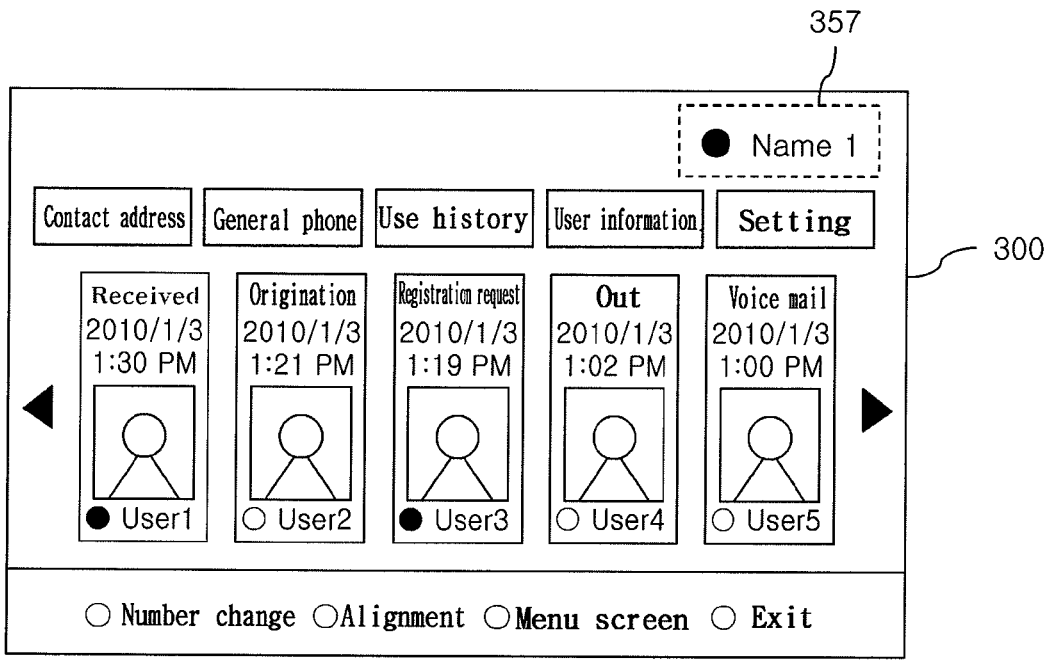

Referring to FIG. 34, when the user selects the 'use history' item among the video communication service items displayed on the screen 300, the information on the video communications recently performed by the user may be displayed on the screen 300. That is, the information on the history of previous communications may be stored and displayed to the user.

For instance, when the user selects the 'use history' button, the information on the recently performed receiving communication, originating communication, communication during absence, contact address registering request from the other users, received or originated voice mails, or the like, may be displayed on the screen 300.

Meanwhile, each of the communication/usage histories displayed on the screen 300 may include information on the corresponding other party, for example, the user icon, the name, the ID, and the log-in state, or the like.

The user may select any one of the communication/usage histories displayed on the screen 300 and thus, may be provided with more detailed information for the selected history.

Figure 35:
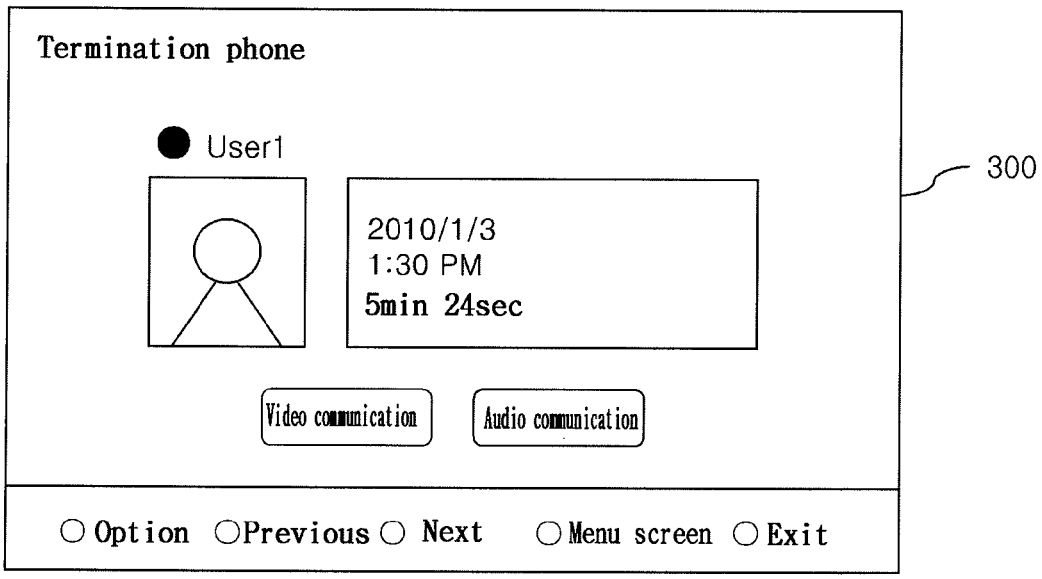

When the user selects the receiving communication history among the use histories displayed on the screen 300, for example, when a 'received' item for the 'user 1' shown in FIG. 34 is selected, the detailed information on the selected history may be displayed on the screen 300 as shown in FIG. 35. There, the receiving date, time, and communication time, or the like, may be displayed on the screen 300, together with the log-in state, name, and icon of the originator of the selected history for the 'user 1'.

Further, the user may select any one of the 'video communication' (video and audio) button and the 'audio communication' button displayed on the screen 300 to request the communication with the 'user 1'.

Figure 36:
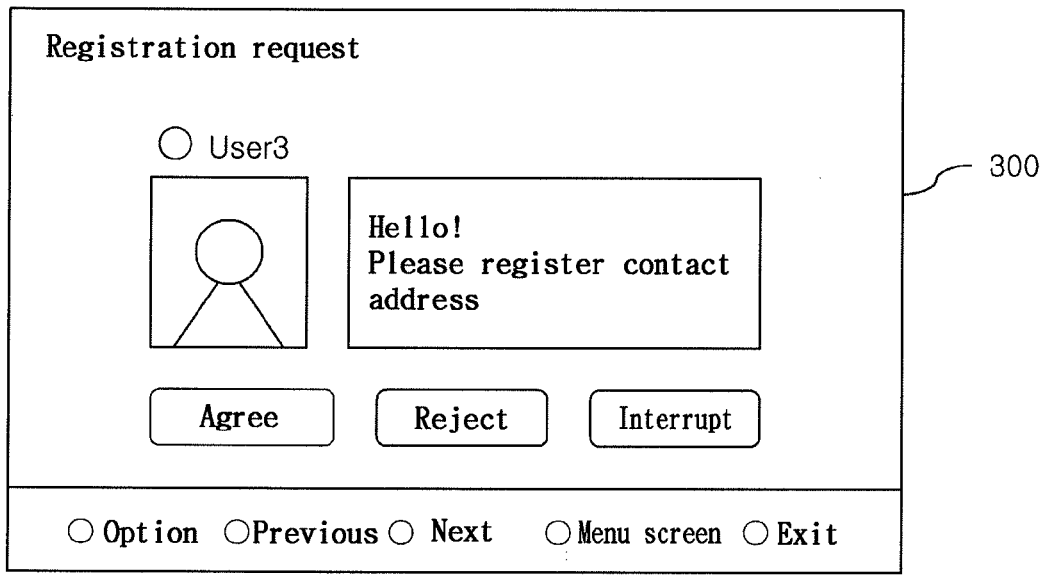

Returning to FIG. 34, when the user selects the registration requesting history, for example, when the 'registration request' item shown in FIG. 34 is selected, the detailed information on the selected 'registration request' may be displayed on the screen 300 as shown in FIG. 36.

Referring to FIG. 36, the registration requesting message prepared by the 'user 3' may be displayed on the screen 300, together with the current log-in state, name, and icon of the requestor of the selected 'registration request', that is, the 'user 3'.

Further, the user may select any one of the 'agree', 'reject', and 'interrupt' buttons displayed on the screen 300 to selectively respond to the registration request from the 'user 1'.

Figure 37:
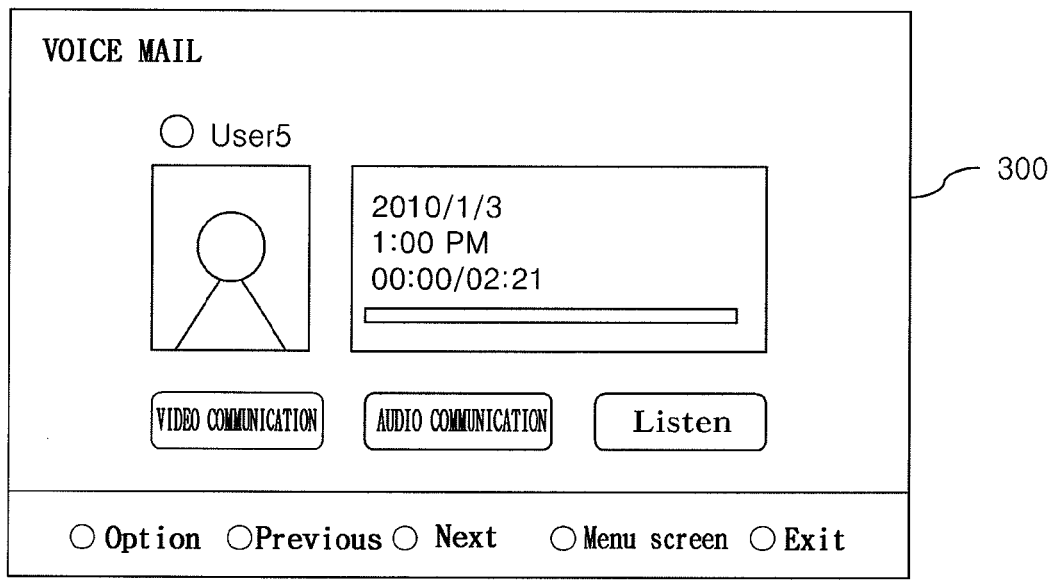

Meanwhile, when the user selects the voice mail history, for example, when the 'voice mail' button shown in FIG. 34 is selected, the detailed information on the selected 'voice mail' may be displayed on the screen 300 as shown in FIG. 37.

Referring to FIG. 37, the receiving date, time, and recording time, or the like, of that voice mail may be displayed on the screen 300, together with the log-in state, name, and icon of the originator of the selected 'voice mail', that is, the 'user 5'.

The user may select a 'listen' button displayed on the screen 300 to listen thea voice mail received from the 'user 5'. Further, the user may select any one of the 'video communication' button and the 'audio communication' button displayed on the screen 300 to request the communication with the 'user 5' originating the voice mail.

Figure 38:
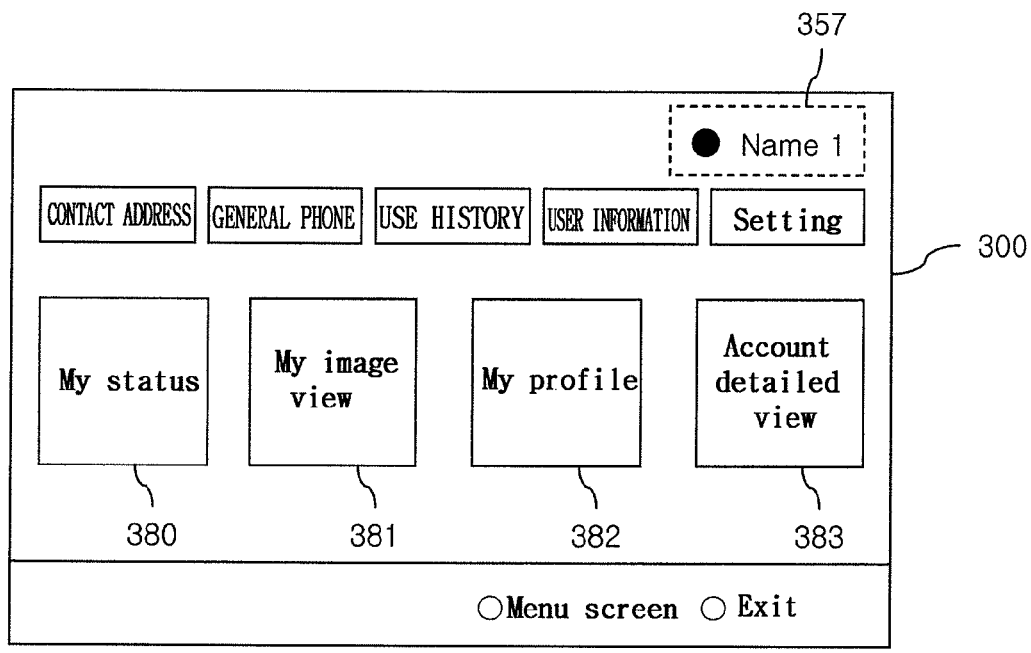

Referring to FIG. 38, when the user selects the 'user information' button among the video communication service items displayed on the screen 300, the information on the currently logged-in user may be displayed on the screen 300.

As shown in FIG. 38, when the user selects the 'user information' button, the user information menu items, for example, buttons 380 to 383 corresponding to 'my status', 'my image view', 'my profile', and 'account detailed view' may be displayed on the screen 300 of the display device 10 of the user.

Figure 39:
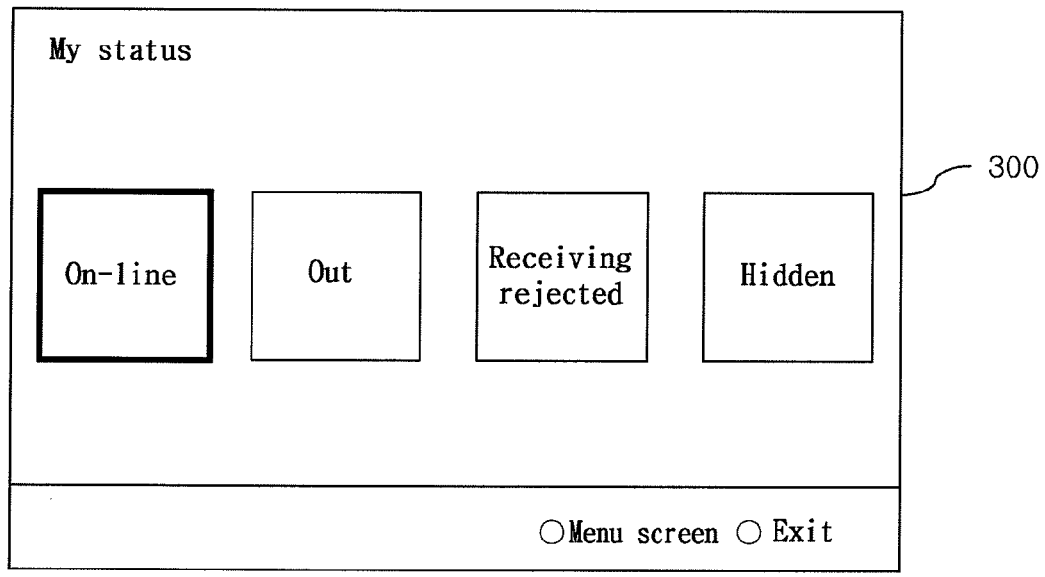

When the user selects the 'my status' button 380, current statuses settable by the user, for example, 'online', 'out', 'receiving rejected', and 'hidden' items may be displayed on the screen 300 as shown in FIG. 39.

The user may select any one of the 'online', 'out', 'receiving rejected', and 'hidden' item to set his/her current status and the set current status of the user may be displayed in the video communication apparatus of the other party. For instance, when the user sets the current status as the 'out', the current status of the user, i.e., the 'name 1' may be displayed on the video communication service screen of the 'user 1' as the 'out' status. The 'on-line' item may indicate that the user is currently on-line or logged-in, the 'receiving rejected' item may indicate that the user is not receiving any communication or contents from the external devices, and the 'hidden' item may indicate that the user is on-line but is hidden (desired not to be detected by others).

Figure 40:
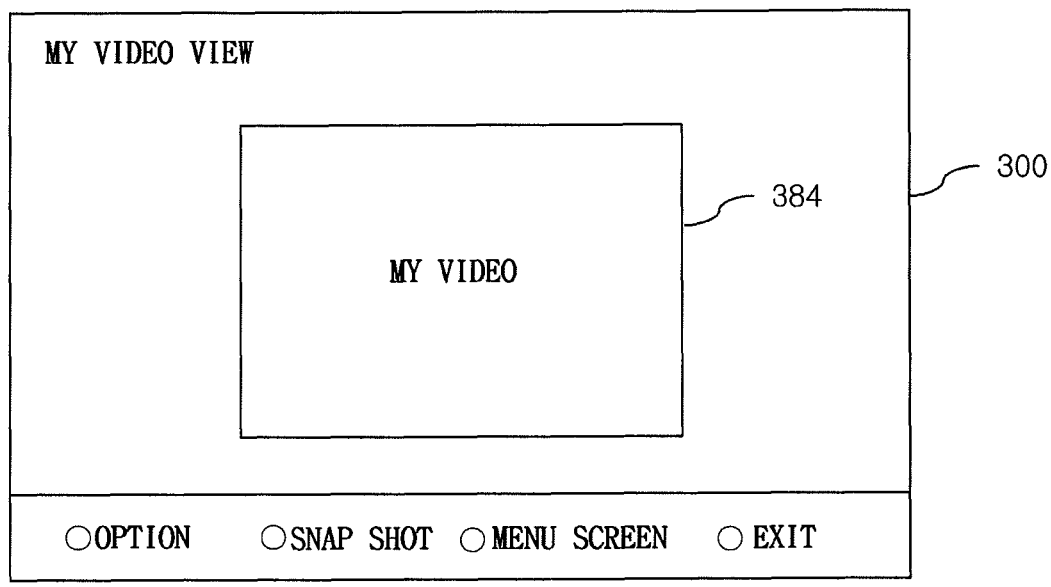
Figure 41:
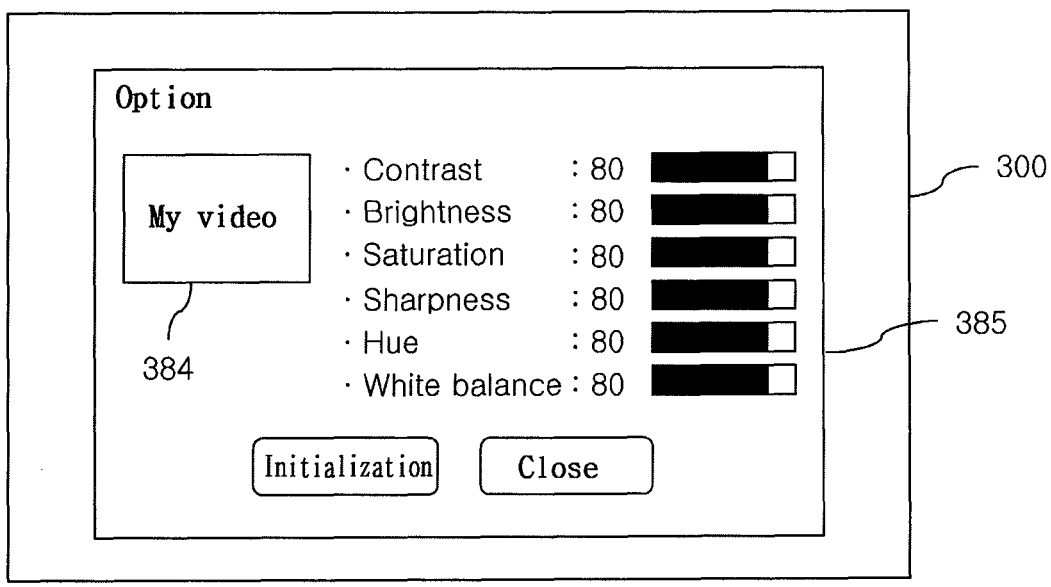

When the user selects "my image view" button 381 in FIG. 38, the user's image 384 (e.g., user's face) acquired through the camera 141 may be displayed on the screen 300 as shown in FIG. 40.

In addition, the user selects the 'option' item on the bottom end of the screen 300, thereby making it possible to control the image quality of the communication image. For instance, referring to FIG. 41, when the user selects the 'option' item, a plurality of image quality control items, for example, 'contrast', 'brightness', 'saturation', 'sharpness', 'hue', and 'white balance', etc., may be displayed on the screen 300.

For instance, the user can use the user input unit 145 to control or change any of the above-mentioned image quality control items and therefore, the communication image displayed on the screen 300, i.e., the image quality of the communication image of the user and the communication image of the other party can be controlled. As such, the communication images of the user and/or the other parties can be displayed on the user's device and/or the other party's device in a manner that is preferred by the user.

Further, the image quality of the user's image currently displayed on the specific region of the screen 300, for example, the left of the screen 300 may be controlled according to the control values of the image quality control items. For instance, the image 384 of the user currently displayed on the screen may be adjusted (e.g., real time or with some delay) while the user changes the various image quality control items such as 'contrast', 'brightness', 'saturation', 'sharpness', 'hue', and 'white balance', etc. As such, the user can immediately see how his image 384 is changed by the user changing the control values of the image quality control items, and find the desired settings for his image 384 for displaying on the user's screen and the other party's screen. An 'initialization' button may be used to implement the set control values.

Accordingly, during or before the video communication (e.g., video call or video conference) with one or more other parties, the user can selectively adjust one or more characteristics of the image associated with the user (e.g., the image of the user captured by the camera at the display device 10) so that the adjusted image associated with the user can be displayed on the user's screen 300 and on the screen of the other parties. For instance, the adjusted image of the user can be transmitted to the screens of the other parties. Similarly, the user can control or adjust one or more characteristics of the image(s) associated with the other parties once the images are received by the display device 10, so that the images of the other parties are displayed on the user's device in a manner that is desired by the user.

Further, the user can also control or change the various image quality control items for the contents images displayed on the screen 300 and/or on the screen of the other party.

In another variation, according to the exemplary embodiment of the present invention, the control of the image quality for the communication image controlled as described above in FIG. 41 may not affect the image quality of the contents image which will be or are displayed. That is, the setting values related to the image quality of the communication image (e.g., image of the user's face) and the setting values related to the image quality of the contents image (e.g., broadcast programs or downloaded web images) displayed on the display device 10 may be controlled or changed independently from each other, and the control values for them may be stored separately in the storage unit 130. As a variation, however, the same display setting values may be used to control simultaneously both the communication image and the contents image.

Returning to FIG. 40, in addition, when the user selects a 'snapshot' item on the bottom end of the screen 300, the image 384 of the user displayed on the current screen 300 (e.g., a snapshot of the user) may be stored in the storage unit 130 and the stored user image 384 may be set to be tied to the above-mentioned icon, that is, an icon corresponding to the user ('name 1').

Figure 42:
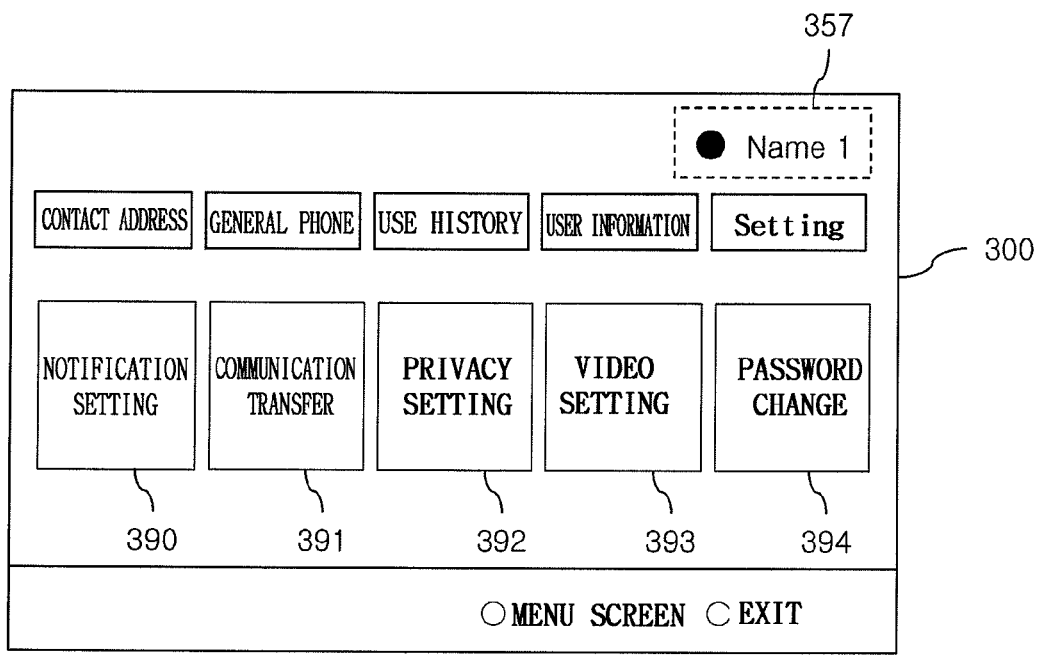

In FIG. 40, when the user selects the 'menu screen' item, then the main menu screen (e.g., the screen displaying main menus as shown in FIG. 42) may be displayed.

In the main menu screen, when the user selects the 'setting' item among the video communication service items displayed on the screen 300, the setting items 390-394 related to the video communication may be displayed on the screen 300 as shown in FIG. 42. Examples of the setting items can include the buttons 390 to 394 corresponding to 'notification setting', 'communication delivery/transfer', 'privacy setting', 'video/image setting', and 'password change'.

Figure 43:
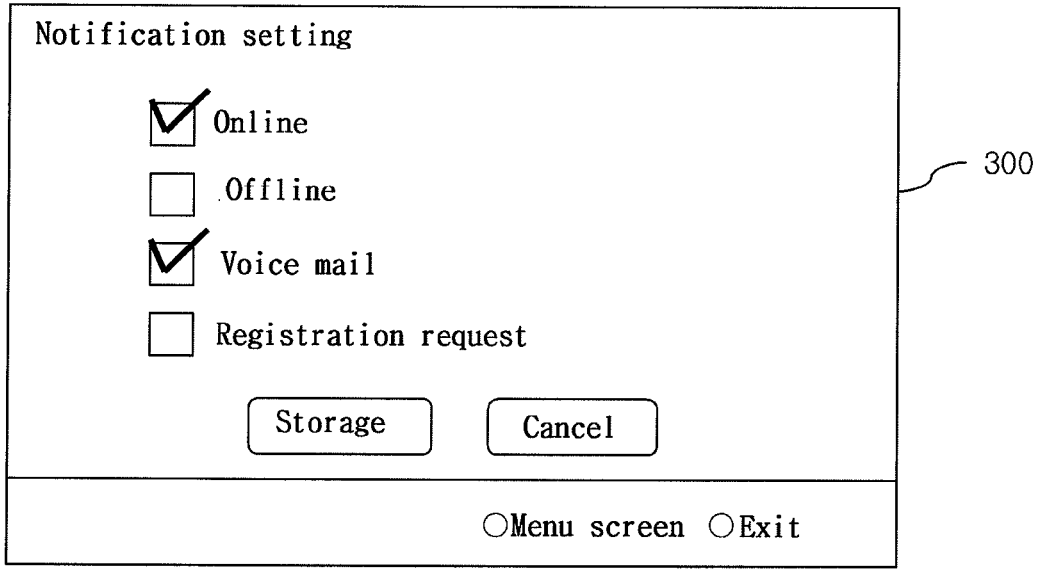

When the user selects the 'notification setting' button 390, alarm items selectable by the user, for example, 'online', 'offline', 'voice', 'mail' and 'registration request' may be displayed on the screen 300 as shown in FIG. 43.

Figure 44:
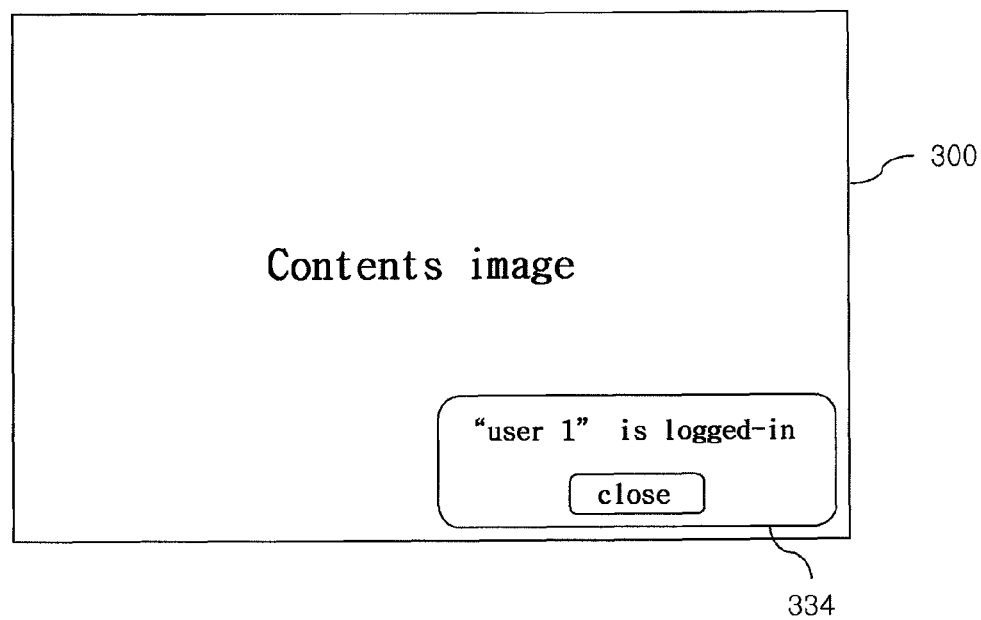

The user can select the 'online' item. Then in response, the display device 10 displays the log-in information on the screen 300 by using the popup window 334 when the registered user is logged-in as shown in FIG. 44, thereby making it possible to notify the user of the log-in information. For instance, the 'online' item under the notification setting is for alerting the user of all online (currently logged-in) parties, and the 'voice mail' item may be for alerting the user if any voice mails are received.

In the example of FIG. 44, when the registered user, 'user 1' is logged-in, the popup window 334 notifying to the user that the 'user 1' (the other party) is logged-in in the video communication service may be displayed on the screen 300.

The user can select the 'offline' item in FIG. 43 to display the log-out information on the screen 300 by using the popup window 334, whenever the registered user is logged-out, thereby making it possible to notify the user of the log-out information of other parties.

In addition, the user can select the notification of the "voice mail," which may be set to display the reception of any voice mail on the screen 300 by using the popup window 334 at the time of receiving the voice mail.

Meanwhile, the user can select the notification of the 'registration request', which may be set to notify the user of the registration request by using the popup window 334 whenever the registration of the contact address is requested from other user(s). For instance, under this setting, referring to FIG. 45, when the registration of the contact address is requested from the 'user 6', the popup window 334 notifying the user that the 'user 6' requests the registration for the user may be displayed on the screen 300 of the user.

Figure 45:
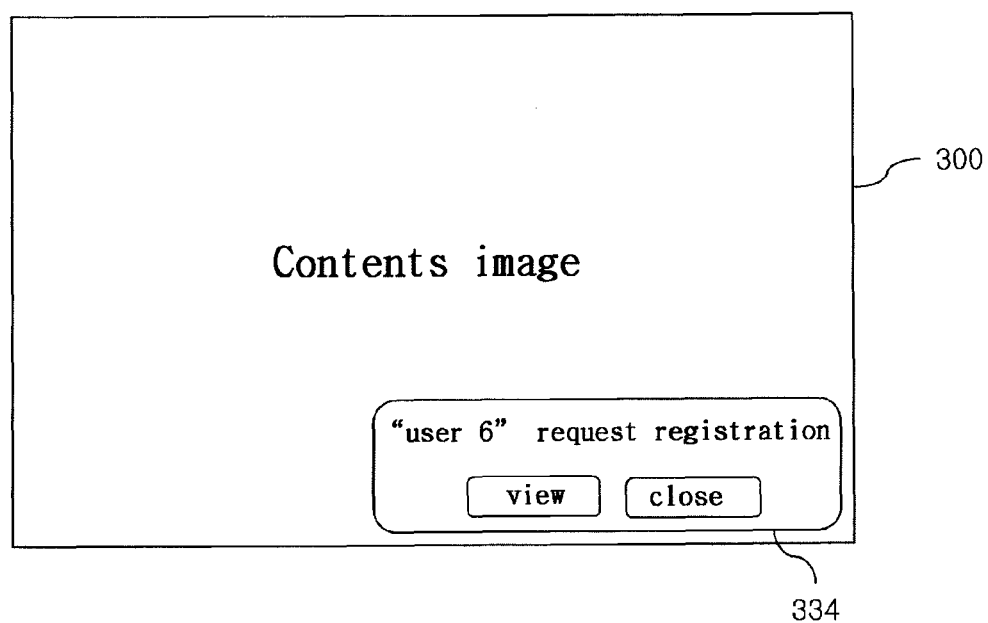

When the user selects the 'view' in FIG. 45, the screen 300 may be displayed as shown in FIG. 36 and thus, the user may perform agree, reject, or interrupt operations for the registration request.

Figure 46:
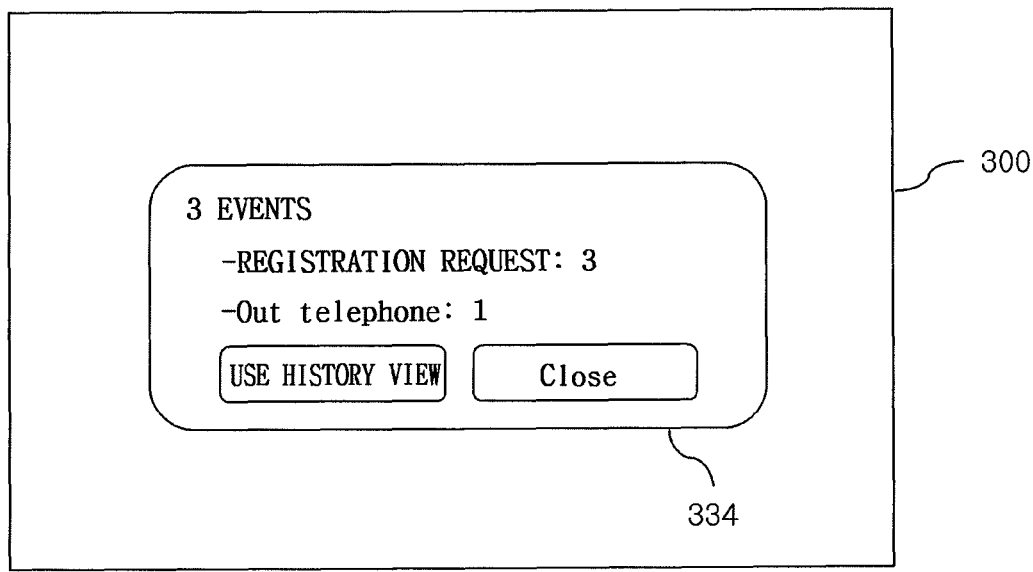

Referring to FIG. 46, when a specific ID for the video communication service is logged-in, the popup window 334 notifying the event occurring for the corresponding ID may be displayed on the screen 300.

For example, when the 'name 1' is logged-in, the information on the registration request (e.g., 3 requests) and an out telephone received as the 'name 1' may be displayed on the popup window 334 for the period of the log-out state and may be transferred to the user. The 'out telephone' may indicate the number of communications associated with the 'name 1'.

The user selects the 'use history view' item to confirm the detailed information on each of the events displayed on the popup window 334 and the method of confirming the use history may be the same as one described with reference to FIGS. 34 to 37.

Meanwhile, while the video communication is being performed, the specific function of the display device 10, when the events are generated according to, for example, a previously set off time, slim timer, or record reservation, or the like, the communication may end to perform the corresponding function. The 'record reservation' preferably can be a function of reserve-recording a content, e.g., reserving a recording of a content according to certain conditions.

Figure 47:
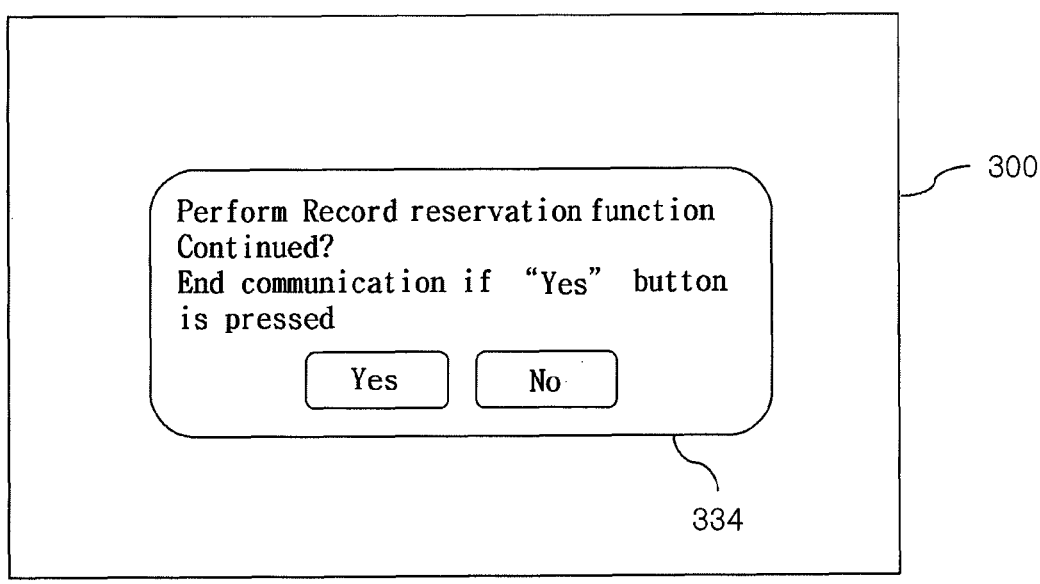

For example, when the previously set record reservation is performed while the video communication is performed, the popup window 334 for receiving a user input indicating whether or not the in-progress communication should end to perform the record reservation, may be displayed on the screen 300 as shown in FIG. 47.

When the user selects the "Yes" button displayed on the popup window 334, the in-progress communication ends and the previously set record reservation function may be performed.

Meanwhile, when the 'No' button is selected, the communication is continuously progressed and the previously set record reservation function may not be performed.

According to another exemplary embodiment of the present invention, the record reservation function and the communication function may be simultaneously performed. For example, when the previously set record reservation is performed during the video communication, the broadcasting signal received through the tuner 105 may be stored in the storage unit 130 (e.g., memory, DVD, disc, USB, etc.) during the video communication.

In addition, when the video communication or the audio communication is received while the user views contents input from the external device using the display device 10, the contents input during the video/audio communication (e.g., video conference, video call, etc.) in response to the received communication may be stored in the storage unit 130.

Figure 48:
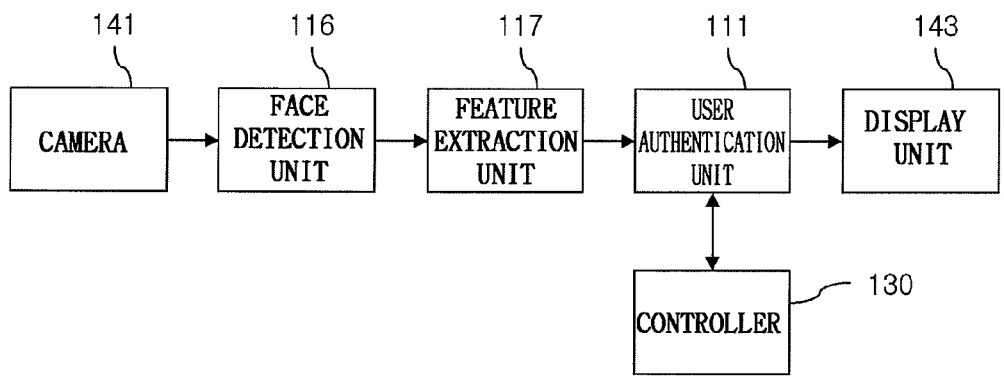
FIG. 48 is a block diagram showing a configuration of a display device according to a second exemplary embodiment of the present invention.

FIG. 48 is a block diagram showing the configuration of a display device according to a second embodiment of the present invention, in which the display device may include a camera 141, a face detector 116, a feature extractor 117, a storage unit 130, a user authentication unit 111, and a display unit 143. In the display device shown in FIG. 48, the same or similar components as the ones described with reference to FIG. 2 can be included, which will not be described below. All components of the display device according to this embodiment are operatively coupled and configured.

Referring to FIG. 48, the camera 141 photographs a region in which the user is positioned and obtains the corresponding video data, and the face detector 116 uses the acquired video data to detect a face region of the user within the photographed region.

The display device 10 may include a pre-processor that performs pre-processing, such as improving the image quality of the video data acquired by the camera 141 or adjusting the video data to be suitable to a specific purpose, and outputs them to the face detector 116. For example, the pre-processor may perform video processing such as contrast readjusting, noise removal, smoothing, sharpening, etc.

The feature detector 117 may extract features of the detected face region, for example, extract a face feature vector that can differentiate a face difference for each user from the detected face region.

According to the exemplary embodiment of the present invention, the face detector 116 and the feature extractor 117 may be configured to be included in the AV processor 115 shown in FIG. 2.

The storage unit 130 may store information on the registered face region, for example, store the feature information on the face region of various users of the display device 10.

In more detail, the image for or of a user is photographed by the camera 141 and the video data acquired by the camera 141 passes through the above-mentioned face detector 116, and feature extractor 117 to extract the feature information of the face region of the user, which may be in turn stored in the storage unit 130. The feature information may include specific information on the face features of the user's face captured by the camera 141. As a variation, instead of the face, another part of the body of the user may be photographed, processed and stored in association with the user for identifying the user.

The user authentication unit 111 compares the feature information of the face region extracted from the feature extractor 117 with the information stored in the storage unit 130 to perform the user authentication for the detected face region. For example, when the two pieces of information match with each other, the user authentication unit 111 may permit the current user to access the display device 10, that is, allow a log-in of the user.

According to the exemplary embodiment of the present invention, the operation of the user authentication unit 111 may be performed by the controller 110 shown in FIG. 2.

A user authenticating method according to an exemplary embodiment of the present invention is described hereafter in detail with reference to FIGS. 49 to 58.

Figure 49:
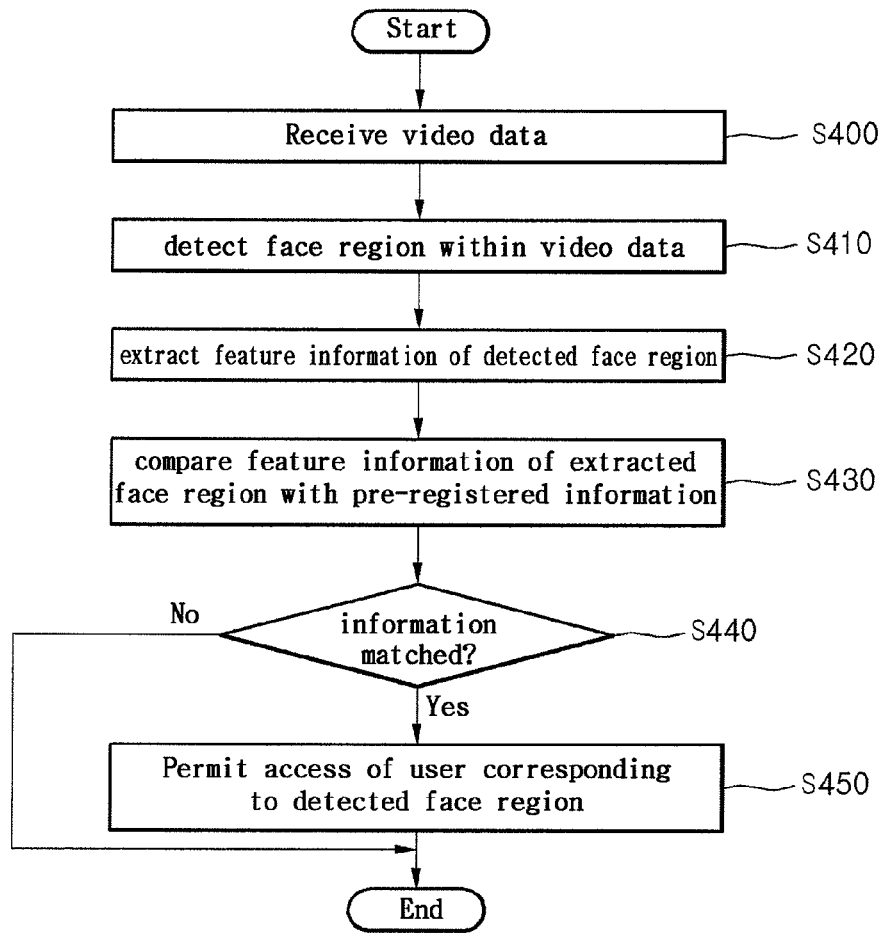
FIG. 49 is a flow chart showing a user authentication method according to an exemplary embodiment of the present invention.

FIG. 49 is a flow chart of a user authenticating method according to the exemplary embodiment of the present invention, in which the user authenticating method will be described in combination with a block diagram shown in FIG. 48. The method of FIG. 49 can be implemented in the device of FIG. 48, 2 or 1, or can be implemented in other suitable device. Further, any method discussed in the present application may be implemented in any device/system discussed in the present application.

Referring to FIG. 49, the face detector 116 receives the video data acquired by the camera 114 (S400) and uses the input video data to detect the face region existing in the region in which the video data is acquired (S410).

For example, the face detector 116 segments the input video data into a region for each subject by contour detection, labeling, structure analysis, or the like, and extracts features of each region from the segmented video data to detect the face region by comparing the extracted features with the face feature vector. Meanwhile, the face feature vector may be stored in the storage unit 130. In order to detect the face region, the face detector 116 applies the mathematical, structural, conversion method, etc., such that it may use feature vectors generated by extracting and processing features such as color, shape, texture, etc. The face detecting operation used herein can use any known face detecting technique.

The feature extractor 117 extracts the feature information of the detected face region (S420). For example, the feature extractor 117 may generate the face feature vector capable of differentiating the difference in the individual faces from the detected face region and compare the generated face feature vector with the user face feature vector stored and registered in the storage unit 130.

For example, the feature extractor 117 extracts the features of the unique face region for each person based on the difference(s) in face for each person. In other words, the feature extractor 117 may extract the features of the corresponding face region, for example, the size or interval of eyes, the color of pupil, the size or position, length, and with of ears, the shape and size of lip, jaw, the entire contour of face, hair style, etc.

In extracting the features of the face region, the mathematical model may generate the feature vectors by directly using the numerical values obtained by measuring the entire face or the specific portion or the inter-specific portion interval of the face, etc., or processing them by the statistical process, etc.

Meanwhile, the feature extractor 117 may extract the feature information of the face region by using Hotelling (or Eigen vector, main component, discontinuous Karhunen-Loeve) transform, Fourier transform, DCT transform, Walsh function transform, Wavelet transform, etc. For example, the above-mentioned method may be used to analyze the texture for the detected face region.

Further, the feature extractor 117 may use an artificial nerve network such as a self-organized feature mapping (SOFM) network, etc, of Kohonen in order to extract the feature of the face region.

The SOFM algorithm makes a vector quantizer by adjusting the connection weight value from the input node to the output node. The output node is generally arranged in a two-dimensional lattice shape and may magnify the connection state by locally connecting between neurons upon learning. Therefore, the SOFM algorithm can efficiently convert from a high-dimensional input vector into a low-dimensional feature vector and the output of the artificial nerve network may be as the feature vector of the face region.

However, the present invention is not limited to the method of detecting the face region and the method of extracting feature information as described above and therefore, other known technologies may be used.

The user authentication unit 111 compares the feature information of the face region extracted at step S420 with the pre-registered information stored in the storage unit 130 (S430) to confirm whether two pieces of information match or correspond with each other (S440).

For example, the user authentication unit 111 compares the similarity or correlation between the feature information of the extracted face region with the face feature information of the stored registration users to perform the user authentication.

The user authentication unit 111 compares the face feature vectors to perform the above-mentioned user authentication, e.g., uses the artificial nerve network using a back propagation (BP) algorithm to compare and analyze the feature information of the extracted face region with the face feature information of the stored registration user(s).

Meanwhile, the user authentication unit 111 mathematically calculates the correlation between the feature information of the extracted face region and the face feature information of the stored registration user to determine whether two pieces of information match or correspond with each other according to the calculated results.

As the determination result, when the feature information of the extracted face region corresponds with the face feature information of the stored registration user, the user authentication unit 111 permits the access of the user corresponding to the detected face region (S450). For instance, when the two pieces of information match or correspond with each other, the user authentication unit 111 permits the user to log-in to the display device 10, for example, executing the application programs for video communication.

Meanwhile, matching two pieces of information may include the case where the two pieces of information are completely matched to each other as well as the case where they have similarity of preset a reference value or more. Further, the extracted face feature information may be compared with the stored face feature information of the current user (if known) or with all stored face feature information of the all registered users.

Figure 50:
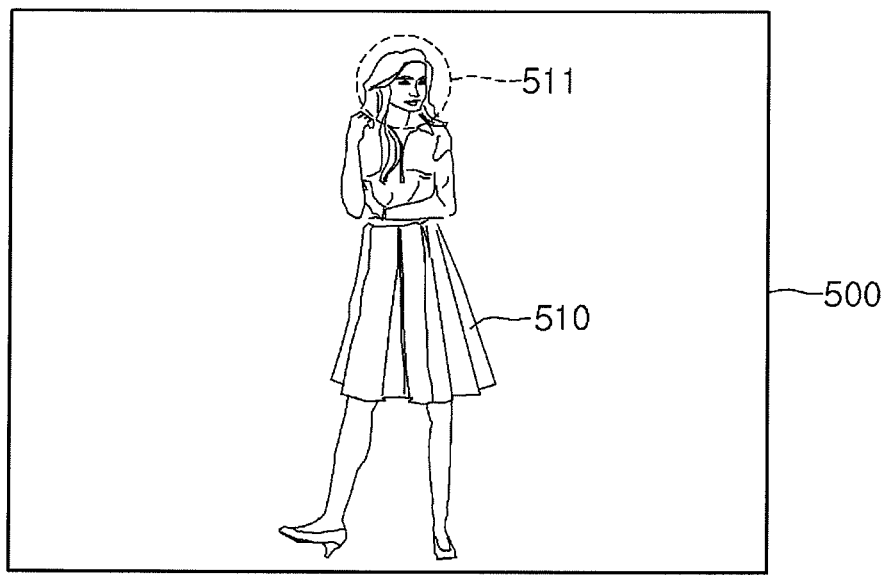
FIG. 50 is a diagram for explaining a user authentication method according to a first exemplary embodiment.

FIG. 50 shows a first exemplary embodiment for the user authentication method, which shows the images acquired by the camera 141 of the display device 10.

Referring to FIG. 50, the entire image 500 corresponding to the image data output from the camera 141 may include the image 510 corresponding to the user and the user is a person wanting to log-in to the display device 10. For instance, when the user who wants to log-in to the display device 10 is positioned in front of the camera 141 associated with the display device 10, the camera 141 photographs the user (e.g., user's face or body) and thereby generate the image such as the image 510.

The feature detector 116 of the display device 10 uses the video data output from the camera 141 to detect the face region 511 of the user among the videos 500. The feature detector 117 may extract the feature information from the detected face region 511, for example, the face feature vector.

In addition, the user authentication unit 111 compares the feature information of the face region 511 output from the feature extractor 117 with the face region feature information of the user stored and registered in the storage unit 130 to perform the user authentication as described above.

The storage unit 130 may store the face region feature information for each of the plurality of registered users and the user authentication unit 111 may determine whether any of the stored information matches the feature information of the face region 511.

If it is determined that any of the stored information matches the feature information of the face region 511, the user authentication user 111 permits access of the display device (e.g., for video communication) to the user corresponding to the image 510 existing in the video 500, e.g., the user wanting to log-in in the current display device 10, such that the display device 10 may enter a mode in which the display device 10 can perform the video/audio communication for the user.

Meanwhile, if it is determined that any of the stored information does not match the feature information of the face region 511, the user authentication unit 111 does not permit the device access by the user and at the same time, may perform an operation for registering the user as a new user.

Each operation of the face detector 116, the feature extractor 117, and the user authentication unit 111 may be the same as one described with reference to FIGS. 48 and 49.

In addition, as described above, when the user authentication is completed to permit the access by the user, the camera 141 may perform the photographing based on the face region 511 of the user and the photographed video data (e.g., face image of the user of the device 10) may be transmitted to the apparatus of the other party through the network for display or other processing.

According to an exemplary embodiment of the present invention, a plurality of users may be positioned in front of the camera 141 associated with the display device for being photographed by the camera 141.

For example, the plurality of users may view the broadcasting by using the display device 10 according to the exemplary embodiment of the present invention and when the users want to perform the video communication when or while they view the broadcasting, the plurality of users may be positioned in the region photographed by the camera 141.

In this case, the display device 10 according to the exemplary embodiment of the present invention may perform the user authentication method as described above on each of the plurality of users with reference to FIGS. 48 to 50 and may permit the device access by at least one of the plurality of users according to the user authentication results.

Hereinafter, a user authentication method according to a second exemplary embodiment of the present invention will be described with reference to FIGS. 51 to 58.

Figure 51:
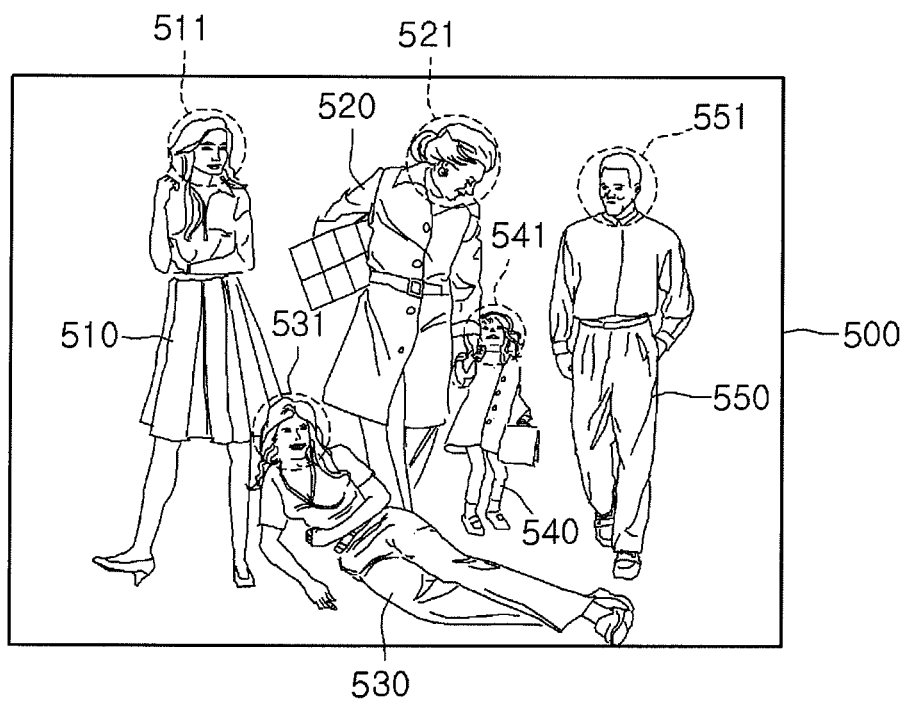
FIGS. 51 to 58 are diagrams for explaining a user authentication method according to a second exemplary embodiment.

Referring to FIG. 51, at least two users may be positioned at a region photographed by the camera 141 of the display device 10 for user authentication. That is, the entire image 500 according to the video data acquired by the camera may include at least two images 510, 520, 530, 540, and 550 corresponding to each of at least two users and thus, the face detector 116 may detect two or more face regions 511, 521, 531, 541, and 551 of the users who desire to log-in or use the display device, e.g., for video communication.

For example, there may be two or more regions matching the face feature vector stored in the storage unit 130 within the image data acquired by the camera 141.

Meanwhile, the feature extractor 117 performs the above-mentioned feature information extracting process on each of the detected at least two face regions 511, 521, 531, 541, and 551 such that it can extract the face feature vector of each of the face regions 511, 521, 531, 541, and 551.

In addition, the user authentication unit 111 compares the feature information of each face region 511, 521, 531, 541, 551 output from the feature extractor 117 with the face region feature information of the user(s) stored and registered in the storage unit 130 to perform the user authentication as described above.

For example, the user authentication unit 511 may determine whether it has the face feature information matching or corresponding to the stored face feature information for each of the plurality of extracted face regions 511, 521, 531, 541, and 551.

If it is determined that there is a face region having the feature information matching the stored information among the detected face regions 511, 521, 531, 541, and 551, the user authentication unit 111 permits the device access to that user corresponding to the face region matching the feature information, such that the display device 10 may enter the video communicable mode.

If it is determined that there is no face region having the feature information matching the stored information among the detected face regions 511, 321, 331, 341, and 351, the user authentication unit 111 may not allow access to any of the users.

The operations of performing the face detector 116, the feature extractor 117, and the user authentication unit 111 on the detected face regions 511, 521, 531, 541, and 551 may be the same as one described with reference to FIGS. 48 and 49.

That is, the display device 10 according to the exemplary embodiment of the present invention may repeatedly perform steps S420 to 450 described with reference to FIG. 49 for each of the plurality of detected face regions 511, 521, 531, 541, and 551.

According to the exemplary embodiment of the present invention, the display unit 143 may display the face region 511 detected by the face detector 116 on the screen.

Figure 52:
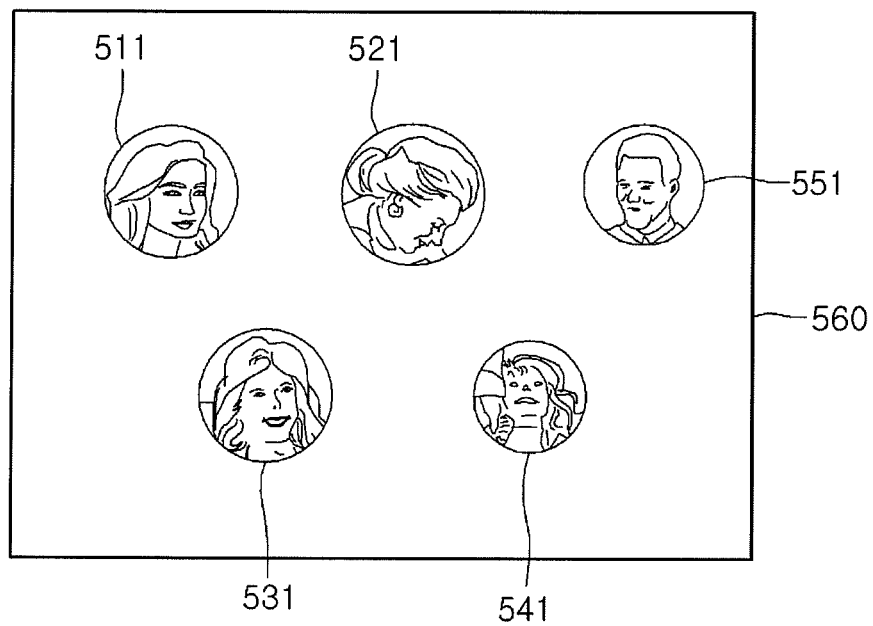

Referring to FIG. 52, when at least face regions 511, 521, 531, 541, and 551 are detected in the image data acquired by the camera as described above, the display unit 143 may display the detected face regions 511, 521, 531, 541, and 551 on the screen 560 of the display unit 143 of the display device.

In addition, the display unit 143 may display the user authentication results performed on each of the detected face regions 511, 521, 531, 541, and 551 on the screen 560. For example, the face regions 511, 521, 531, 541, and 551 displayed on the screen 560 may be represented by being divided into the authenticated user and the unauthenticated user such that the users that can be logged-in and the users that cannot be logged-in among the users positioned in front of the display device 10 (or at a photographing region of the camera 141 associated with the display device) may be easily identified on the screen 560. The camera 141 may be part (e.g., built-in) of the display device 10 or may be a separate device merely connected to the device 10.

Figure 53:
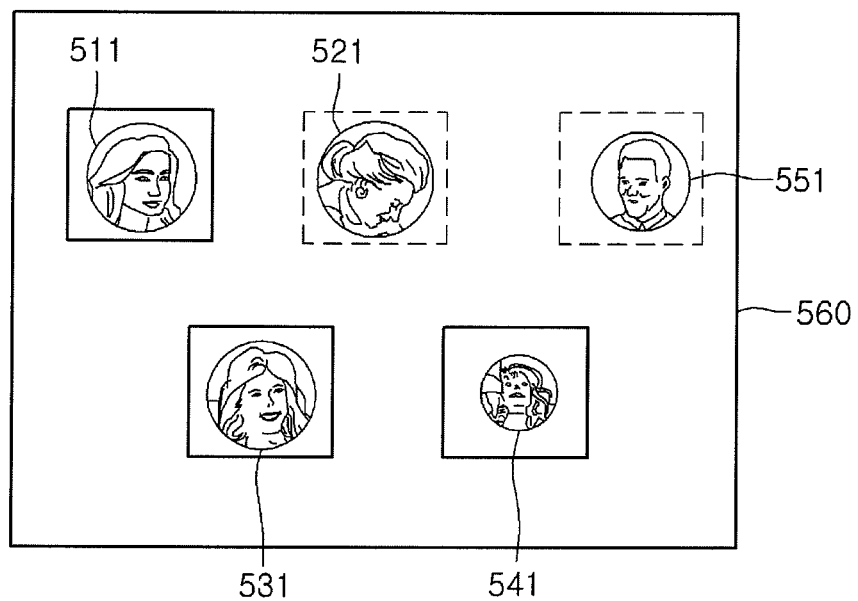

Referring to FIG. 53, the specific shape, for example, the quadrangle may be displayed on the screen 560 in order to correspond to each of the detected face regions 511, 521, 531, 541, and 551 and the user authentication results may be displayed by the shapes displayed on the screen 560.

For example, the face regions 511, 531, and 541 represented by a solid-line quadrangle among the face regions 511, 521, 531, 541, and 551 displayed on the screen 560 are the authenticated users, e.g., a user that can be logged-in according to the user authentication operation as described above and the face regions 521 and 551 represented by a dotted-line quadrangle may be the unauthenticated users, e.g., the user that cannot be logged-in.

As shown in FIG. 53, each user uses the information displayed on the screen 560 by the user interface to easily confirm whether the user can be logged-in in his/her own video communication service.

Meanwhile, the displaying method as shown in FIG. 53 is only an example of the present invention and therefore, the present invention is not limited thereto. In the user authentication method according to the present invention, various methods of dividing and displaying the detected face regions 511, 521, 531, 541, and 551 according to the user authentication results can be used, other than the method showing in FIG. 53.

In addition, the user may select any one of the face regions 511, 521, 531, 541, and 551 displayed on the screen 560 and perform the process corresponding to the selected face region.

For example, when any one of the face regions represented by the user that can be logged-in on the screen 560, for example, the face regions 511, 531, and 541 represented by the solid-line quadrangle is selected, the access of the user corresponding to the selected face region to the display device is allowed such that the display device 10 enters the video communicable mode to execute the application programs therefor.

Meanwhile, when any one of the face regions represented by the user who cannot be logged-in on the screen 560, for example, the face regions 521 and 551 represented by the dotted line quadrangle is selected, the information that the access to the display device 10 is not permitted and the log-in cannot be made may be displayed on the screen 560.

Figure 54:
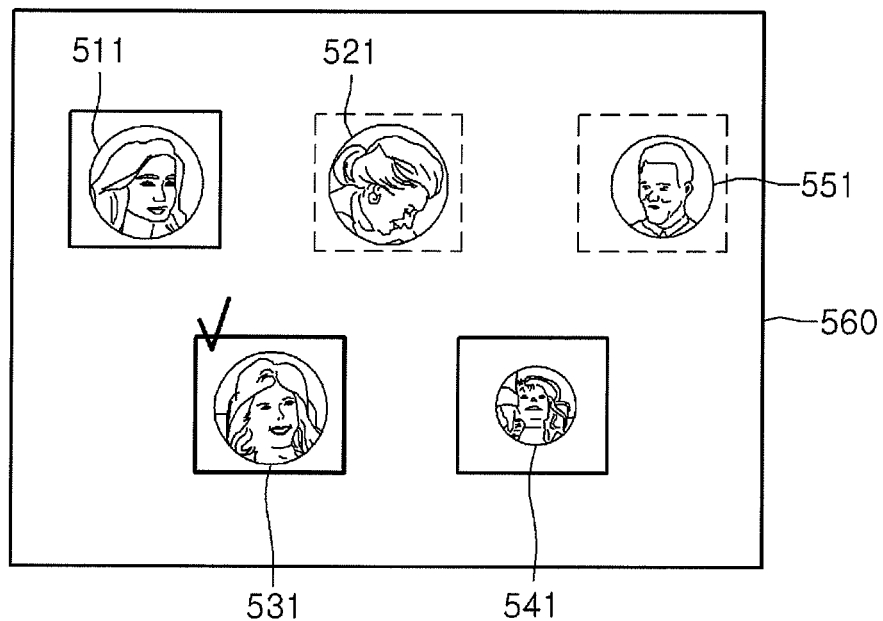

Referring to FIG. 54, the user uses the key buttons included in the display device 10 or the remote control apparatus (e.g., a TV remote controller) for controlling the same to select the face region 531 represented by the user that can be logged-in on the screen 560 such that the solid-line quadrangle may be displayed in the selected face region 531.

Figure 55:
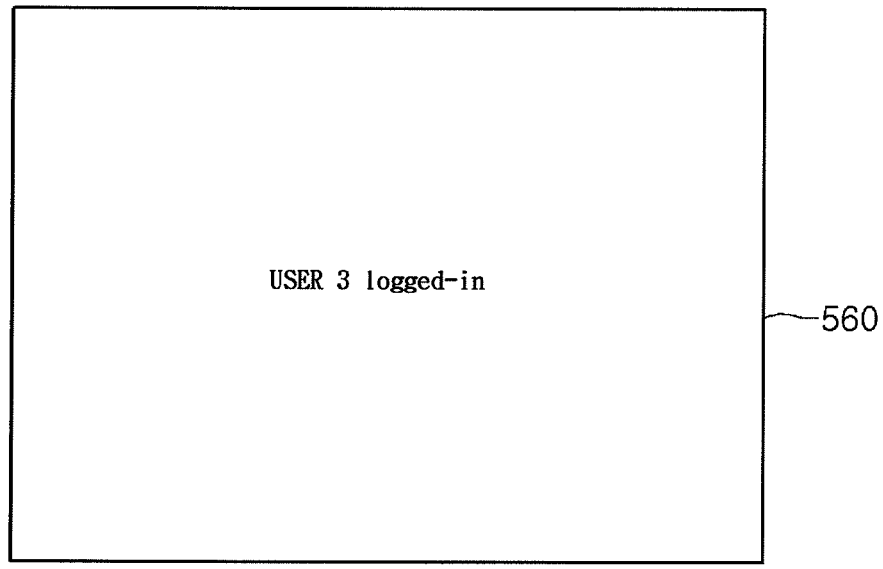

In this case, if the access to the display device 10 of the user 3 corresponding to the selected face region 531 is permitted, as shown in FIG. 55, the information that the user 3 is logged in may be displayed on the screen 560.

Figure 56:
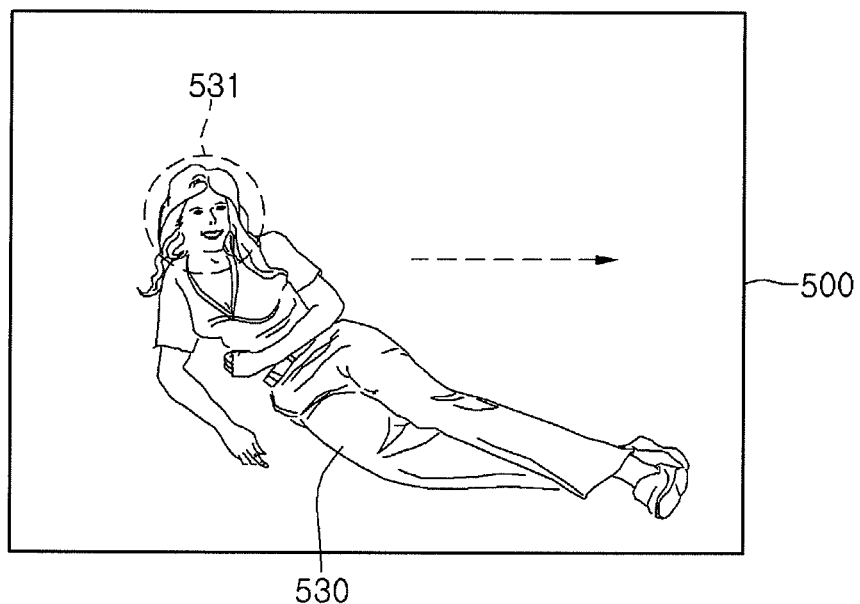

Thereafter, as shown in FIG. 56, the camera 141 can photograph the image 500 based on the image 530 corresponding to the logged in user 3 and as described above, the video data acquired based on the user 3 may be transmitted to the other party's device by using the wired/wireless network. For example, the camera 141 can capture the image of the user 3 positioned in front of the camera 141 for transmission to the other party, or the prestored image of the user 3 can be retrieved for transmission to the other party.

Meanwhile, the display device 10 uses the face region 531 of the logged-in user 3 to change the direction of the camera 141 according to the motion of the user 3 and may further include a camera driver for moving the image capturing direction of the camera 141 under control of the display device 10.

For example, the camera driver can receive the image data acquired by the camera 141 to detect the position of the face region 531 in the photographed image 500 and automatically adjust the photographing direction of the camera 141 so that the face region 531 is positioned in the image 500.

For instance, when the logged-in user 3 moves in an arrow direction in FIG. 56, e.g., a right direction while he/she performs the video, communication, the camera driver may move the photographing direction of the camera to the right according to the moving direction of the face region 531 so as to continuously capture the image of the user 3.

Meanwhile, as described above, a part of the operations of the camera driver may be performed by the face detector 116, the feature extractor 117, or the user authentication unit 111.

According to another exemplary embodiment of the present invention, the controller 110 of the display device 10 may collect the information on the video communication history of the logged-in user 3, for example, communication time point, communication time, or information on the other party and store them in the storage unit 130.

As described above, the collected video communication history may be stored in the storage unit 130 to correspond to the corresponding user and the stored video communication history for each user may be used in combination with a business model providing the customized information according to the user, for example, education, goods, or medical information, etc.

Figure 57:
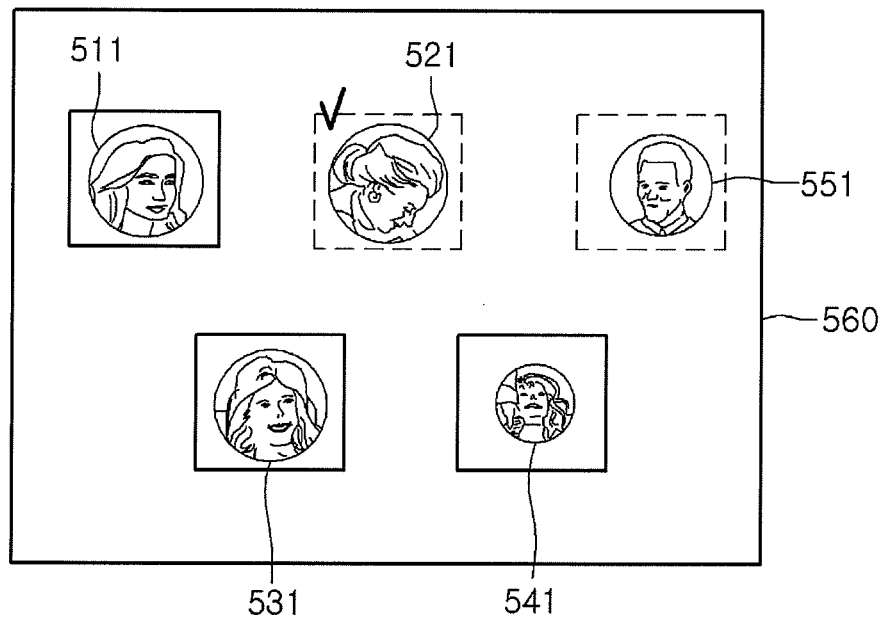

Referring to FIG. 57, the user may use the key buttons included in the display device 10 or the remote control device/apparatus for controlling the same to select the face region 521 represented by the user who cannot be logged-in on the screen 560.

In this case, the user registration process for the user corresponding to the selected face region 521 may be performed, for example, the extracted feature information for the selected face region 521 from the feature extractor 117 may be stored in the storage unit 130, together with other user information in the storage unit 130. Therefore, the user may be registered as the user that can be logged-in in the display device 10.

Figure 58:
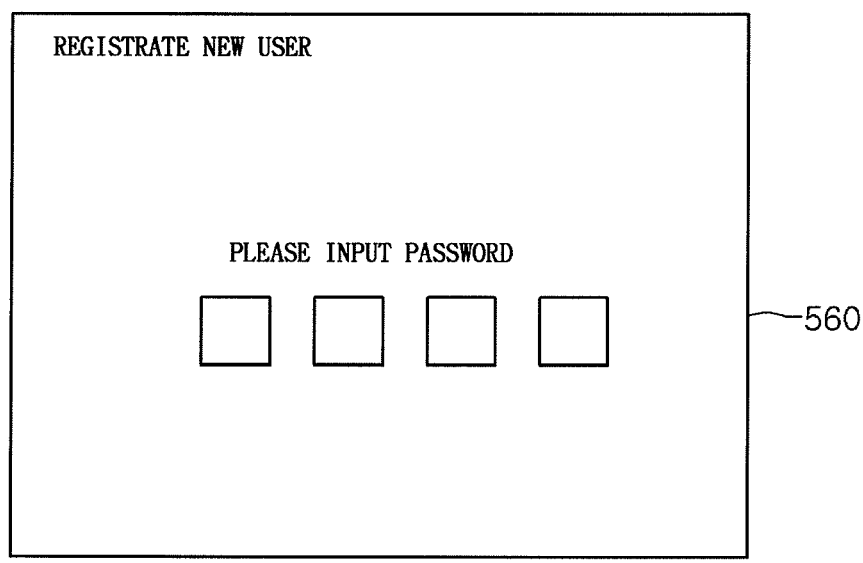

Meanwhile, when wanting to register the user for the face region 521 represented by the user who cannot be logged-in, as shown in FIG. 58, an input of a password may be requested on the screen 560 of the display device 10.

According to another exemplary embodiment of the present invention, the display device 10 may transmit the user authentication results acquired according to the user authentication method to the external devices as described above. For example, the display device 10 may transmit the information on the registered users, the users positioned in front of the current display device, the logged in user, and the non-registered users positioned in front of the current display device 10 to the external devices.

In the case shown in FIG. 54, the display device 10 may transmit the information that the user 1 (511), user 3 (531), and user 4 (541) among the registered users are positioned in front of the current display device 10 to the external devices.

Meanwhile, the external device may display the received user authentication results on the screen and the user of the external device may search the users positioned in front of the display device 10, e.g., the users that can perform the current video communication.

Therefore, the user of the external device (e.g., other devices of the current user or devices of the other parties) may select any one of the users positioned in front of the display device 10 to try the video communication and at the same time, confirm the position of the specific user.

The display device 10 may use the method as described with reference to FIGS. 49 to 58 to perform the user authentication and may transmit the user authentication results to the external device, for example, the server or the display device of the other party for the video communication service.

In more detail, the display device 10 transmits the user authentication results to the server of the contents provider providing the video communication service and the video communication device of the other party may receive the user authentication results for the display device 10 from the server.

Meanwhile, the video communication device of the other party may display the received user authentication results such that the other party can determine whether the users of the network TV 1 540 can be the video communicator or can determine the position of the users, etc.

Figure 59:
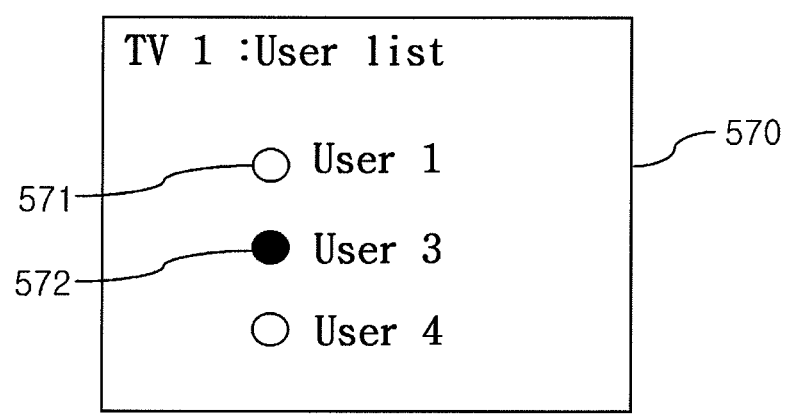
FIGS. 59 to 61 are diagrams showing a method for displaying user authentication results according to exemplary embodiments.

Referring to FIG. 59, the video communication apparatus of the other party may display the user list window 570 including the information on the user authentication results of the display device 10 on the screen of the display device 10.

The information on the users positioned in front of the current display device 10 among the users registered in the display device 10, e.g., the user 1, the user 3, and the user 4 may be displayed on the user list window 570.

The user information displayed on the user list window 570 may include the text or the image, in more detail, the ID, on-line ID, icon, etc., of the corresponding user.

When the display device 10 transmits the detected face region image by the above-mentioned method, the currently photographed face image for the corresponding user may be displayed on the user list window 570.

Figure 60:
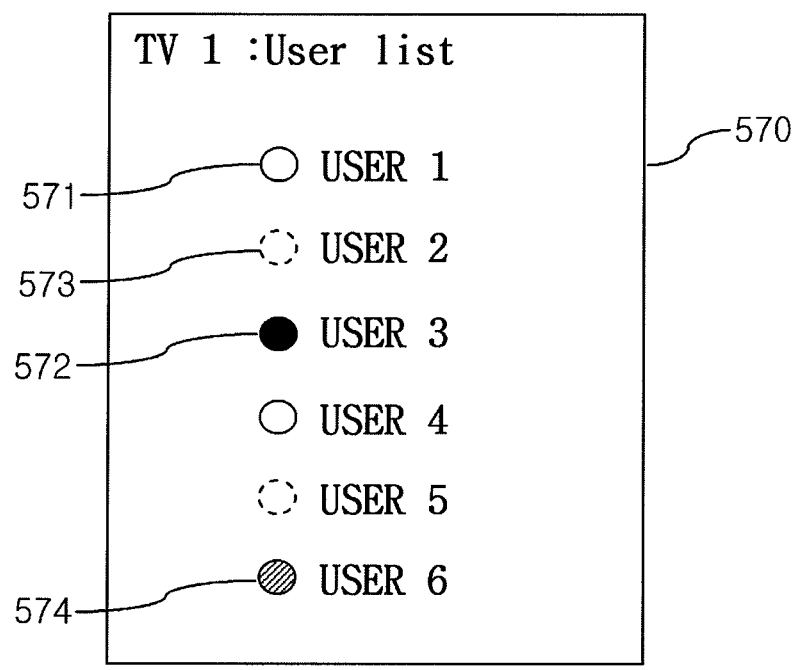

Meanwhile, the images 571 and 572 representing the current state of the user may be displayed on the user list window 570. For example, as shown in FIG. 60, the user represented by the first image 571 is positioned in front of the current display device 10 but when he/she is not logged-in, whereas the user represented by the second image 572 is positioned in front of the current display device 10 and is a logged-in user. For example, the user 1, user 3, and user 4 are positioned in front of the current display device 10 where the user 3 is logged-in.

The information on the registered user who is not positioned in front of the current display device 10 and the non-registered user who is positioned in front of the current display device 10 may be displayed on the user list window 570. For example, the registered user that is not positioned in front of the display device 10 is a user that does not have any detected face region among the registration users, and the non-registration user that is positioned in front of the current display device 10 may be the user that is not authenticated among the users of which the face region is detected.

The information may be included in the user authentication results transmitted from the display device 10.

Referring to FIG. 60, the user represented by the third image 573 is a non-registered user who is positioned in front of the current display device 10 and the user represented by the fourth image 574 may be the registered user who is not positioned in front of the current display device 10. As a result, the user(s) at the display device 10 can know the status of other users.

Further, the other party can use the user list window 570 to confirm that the users 1 to 5 are positioned in front of the current display device 10 and the users 1, 3, and 4 are the registered users, the user 3 is currently registered, and the registered user, the user 6 is not positioned in front of the current display device 10. For instance, the other party's device can display the user list window 570 on its screen. Therefore, the other party may select any one or more the registered users positioned in front of the current display device 10 to try the video communication with the selected user(s).

Figure 61:
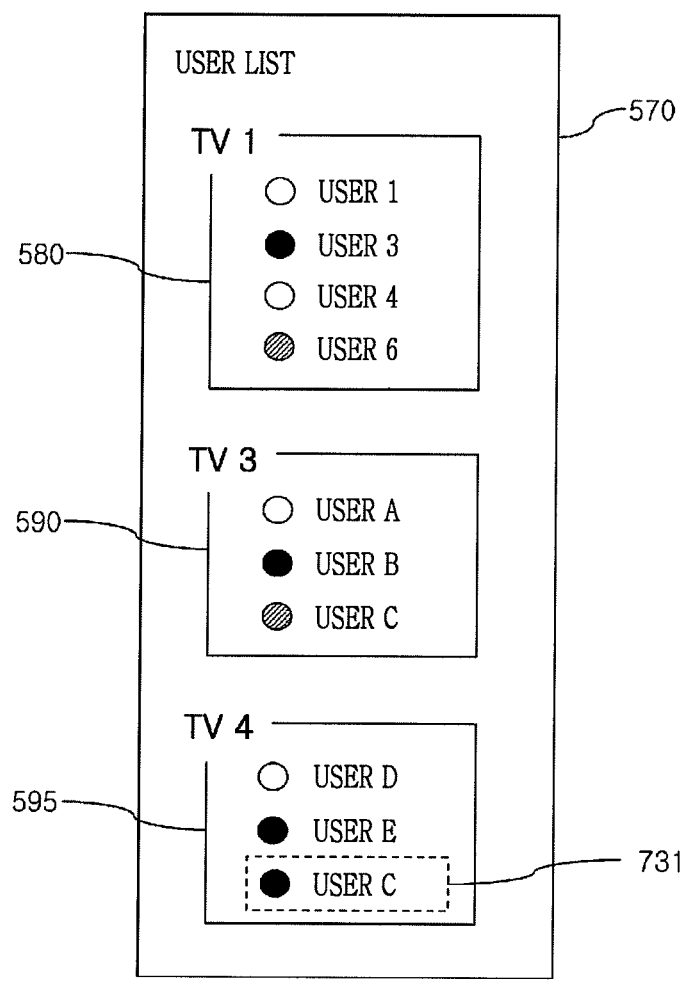

In addition, the video communication device of the other party may receive the user authentication results for each of the plurality of display devices and display the transmitted user list for the plurality of display devices together. Referring to FIG. 61, the video communication apparatus TV 2 of the other party receives information on the plurality of display devices, for example, the user authentication results for each TV 1, TV 3, and TV 4 and display the user list for each display device. For instance, the user list window 570 includes sub lists 580, 590, and 595 corresponding to each of the display devices and each sub list may display the user authentication results of the corresponding display device.

For example, the sub list 580 for the TV 1 may represent the user 1, 3, and 4 are positioned in the current TV 1 among the registered users to perform the video communication, the user 3 is logged-in, and the user 6 is not positioned in front of the current TV 1.

In addition, the sub list 590 for the TV 3 may represent that the users A and B among the registered users are positioned in front of the current TV 3 to perform the video communication, the user B is logged-in, and the user C is not positioned in front of the current TV 3.

Meanwhile, the sub list 595 for the TV 4 may represent that the users D, E, and C among the registered users are positioned in front of the current TV 4 to perform the video communication and the users E and C are logged-in.

As shown in FIG. 61, the user at the TV 2 (which displays the user list of FIG. 61) can easily determine the position of the users of each TV and whether the video communication can be performed by using the user list window 570.

For example, when the user of the TV 2 wants to perform the video communication, with the user C, the user at the TV 2 can confirm that the user C is not positioned in front of the current TV 3 and is positioned in front of the TV 4 by using the user list window 570 such that the user at the TV 2 can select the user C 731 of the TV 4 to try the video communication with.

Although the exemplary embodiments describe the performance of the user authentication by detecting the face region of the user, the user authentication method according to the exemplary embodiments of the present invention may be similarly performed by photographing other body portions of the user, the user identifiable portions, such as, for example, fingerprint or iris, etc.

Figure 62:
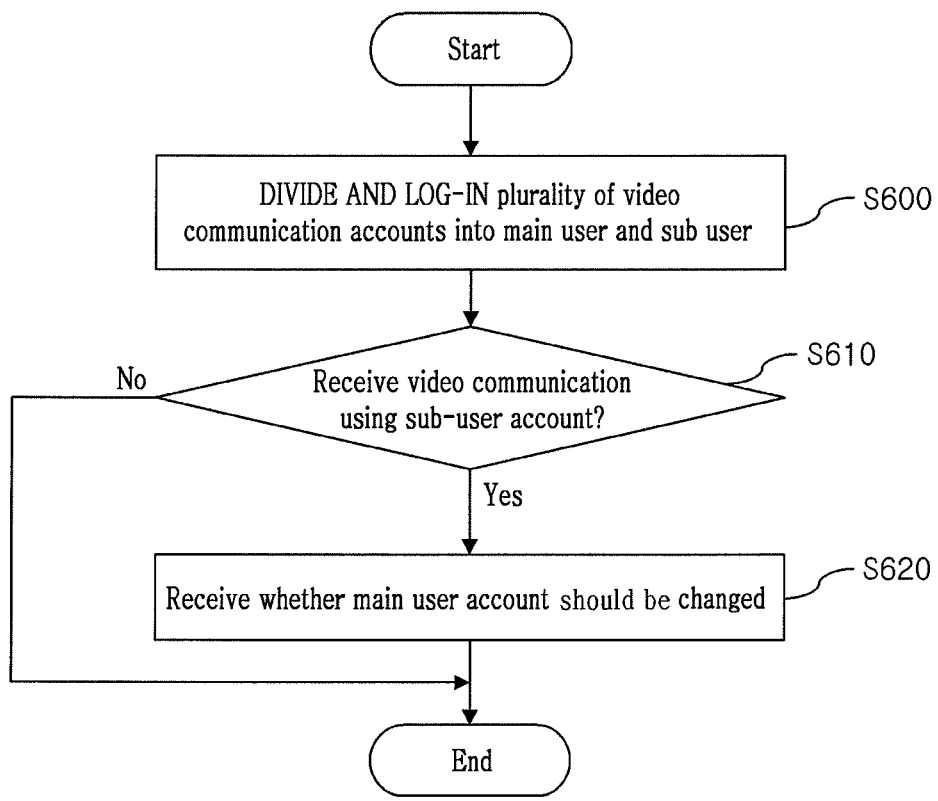
FIG. 62 is a flowchart showing a method for managing a video communication account according to a first embodiment of the present invention.

FIG. 62 shows a flow chart of the video account management method according to the exemplary embodiment of the present invention and the video communication account management method shown will be described in combination with block diagram shown in FIG. 2.

Referring to FIG. 62, the controller 110 logs-in a plurality of accounts for video communication by dividing the users of the display device 10 into main user(s) and sub-user(s). For example, the controller 110 logs-in to the registration accounts stored in the storage unit 130 together and can manage them in an on-line state capable of receiving the video communication or message.

For example, the communication unit 100 receives the control of the controller 110 to confirm the video communication or the message received for each of the plurality of accounts in the on-line state by being logged-in.

Meanwhile, the plurality of accounts may be divided into the main user account and the sub-user account(s), for example, one of the plurality of accounts is set as the main user account and the remaining accounts may be set as the sub-user accounts.

In addition, the storage unit 130 may store whether or not an account for each of the plurality of accounts is a main user account or a sub-user account and the controller 110 divides and logs-in the plurality of registered user accounts into the main user account(s) and the sub-user account(s) by using the account information, which may be managed by different priority or use limited conditions. As a result, different users of the display device 10 (e.g., various family members) may be registered into the display device, and can be set up as main and sub users of the display device 10. As a variation, a single person (user) can have multiple user accounts which can be divided into main and sub user accounts according to the person's preference.

According to an exemplary embodiment of the present invention, it is possible to respond to the video communication received by the user account logged-in as the main user and to confirm the reception for the video communication received as the user account logged in as the sub-user.

According to one example, both the reception of the video communication and the corresponding reception notification can be made for each of the plurality of logged-in accounts, without the main user or the sub-user, but performing the actual video communication with the other party in response to the received video communication can be made by the main user account.

According to another example, other response to the received video communication, other functions, for example, the confirmation of the received message, etc., can be made only for the main user account and may be limited for the remaining sub-user account.

Returning to FIG. 62, when the communication unit 100 receives a video communication from the other party, the controller 110 confirms whether the received video communication is called for the main user account or for the sub-user account (S610).

If the video communication is directed to the sub-user account (e.g., user 4), the controller 110 receives from the current user whether the user 4 needs to be designated as the main user account of the display device through the user input unit 145 (S620). In other words, as described above, in the case of the video communication called by the sub-user account, the reception can be made through the communication 100 but the performance of the video communication with the other party may be limited in response to the received video communication, Therefore, when the video communication is received by the sub-user account, the controller 110 notifies the user of the reception of the video communication and changes the sub-user account receiving the video communication as the current main user account of the display device 10 according to the user request/input, so as to control the display unit 143 or the user input unit 145, or the like, to respond to the video communication.

As described above, when the user changes the sub-user account receiving the video communication through the user input unit 145 into the main user account, he/she can respond to the received video communication in view of the account change and perform the actual video communication received by the sub-user account through the above-mentioned process. As a result, by changing the account status from being the sub-user account to be the main user account, the video communication can be carried out.

Hereinafter, the method for managing the video communication account according to the exemplary embodiment of the present invention will be described in more detail with reference to FIGS. 63 to 73.

Figure 63:
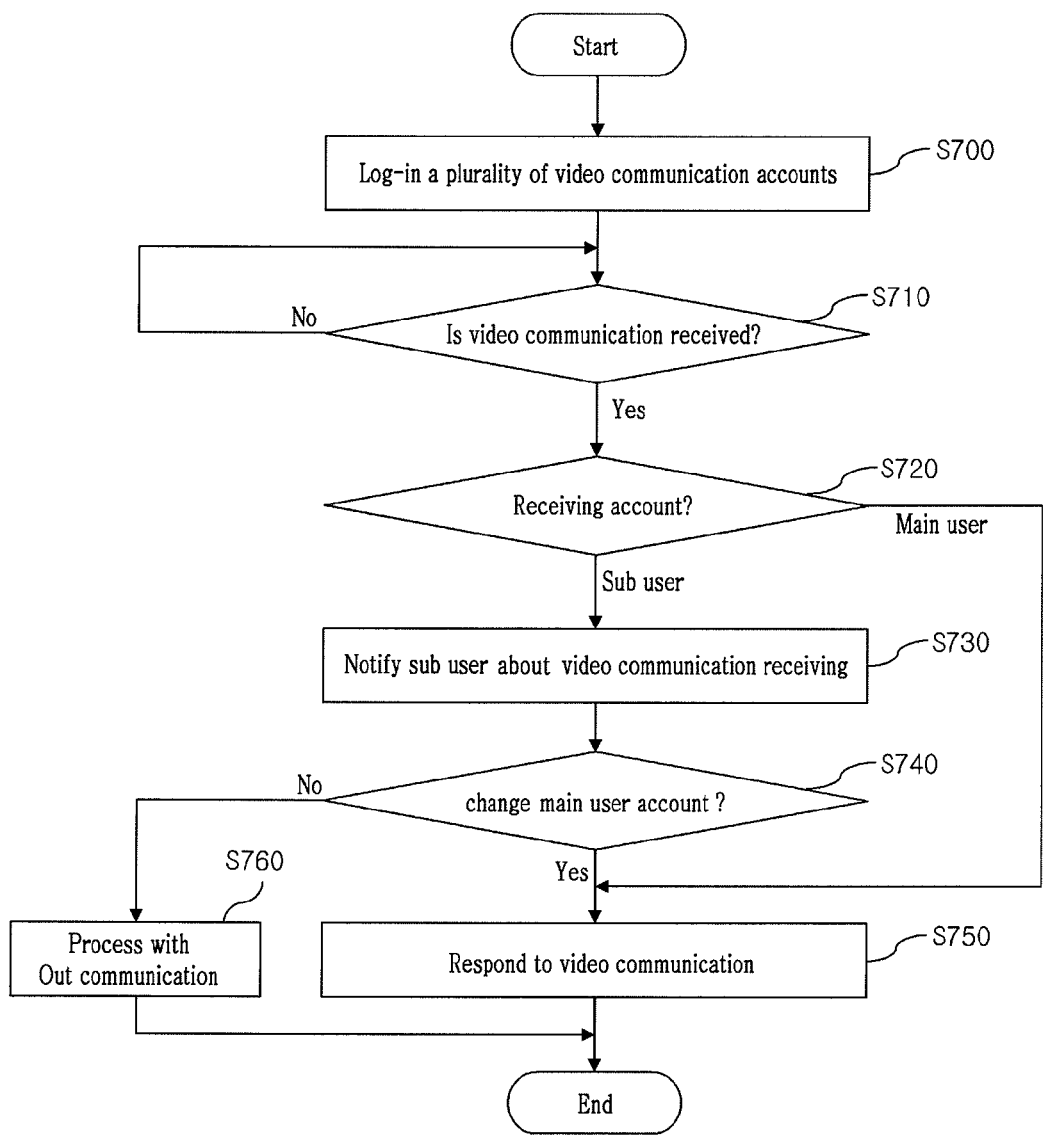
FIG. 63 is a flowchart showing a method for managing a video communication account according to a second exemplary embodiment of the present invention.

FIG. 63 show a flow chart of a method for managing a video communication account according to another exemplary embodiment of the present invention. The description of the same contents as described with reference to FIG. 62 among the method shown in FIG. 63 will be described below.

Referring to FIG. 63, the controller 110 logs-in the plurality of accounts registered for the video communication (S700).

As described above, the plurality of accounts managed by the controller 110 in the on-line state by being logged-in may be configured to include the main user account and the remaining sub-user accounts. The method for setting the main user account may be as follows.

For example, when the account registered for the video communication is one, the account is set as the main user account and logged-in.

In addition, when the account registered for the video communication is two or more, the account last set as the main user account at the time of the previous operation of the display device 10 among the accounts may be designated continuously as the main user account.

Meanwhile, the controller 110 may select the account to be set as the main user among the plurality of registered accounts based on the user input through the menu for setting the main user account.

Figure 64:
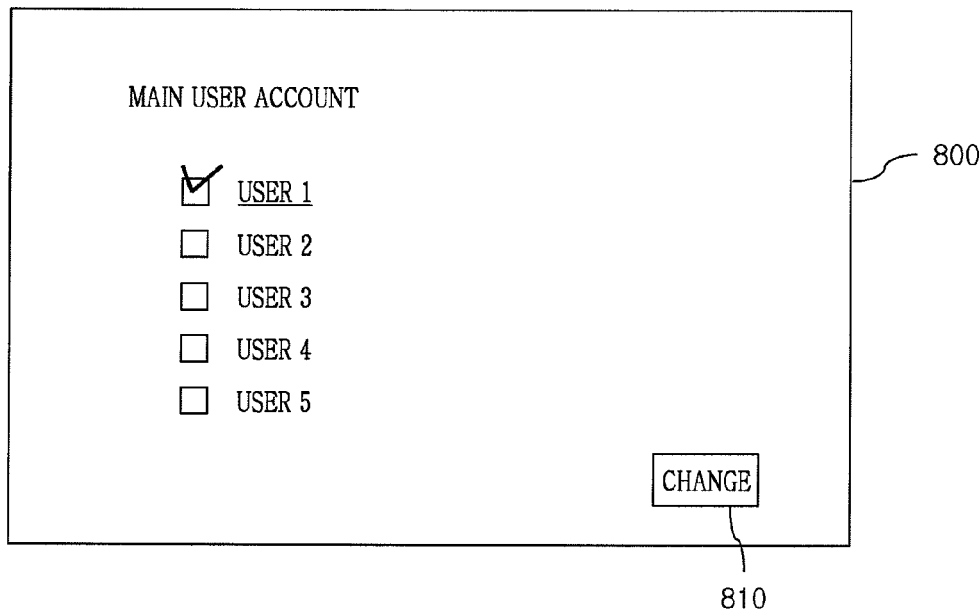
FIGS. 64 to 73 are diagrams for explaining the method for managing video communication account according to the exemplary embodiments.

Referring to FIG. 64, the controller 110 may display a screen 800 for setting the main user account through the display unit 143.

For example, the information on the plurality of registered user accounts, in more detail, the name or ID of each account, etc., may be displayed on the screen 800 and the account (for example, user 1) set as the current main user account may be displayed thereon.

The user selects any one of the plurality of accounts displayed on the screen 800 and then selects the change button 810, thereby making it possible to change the main user account into the desired account.

Figure 65:
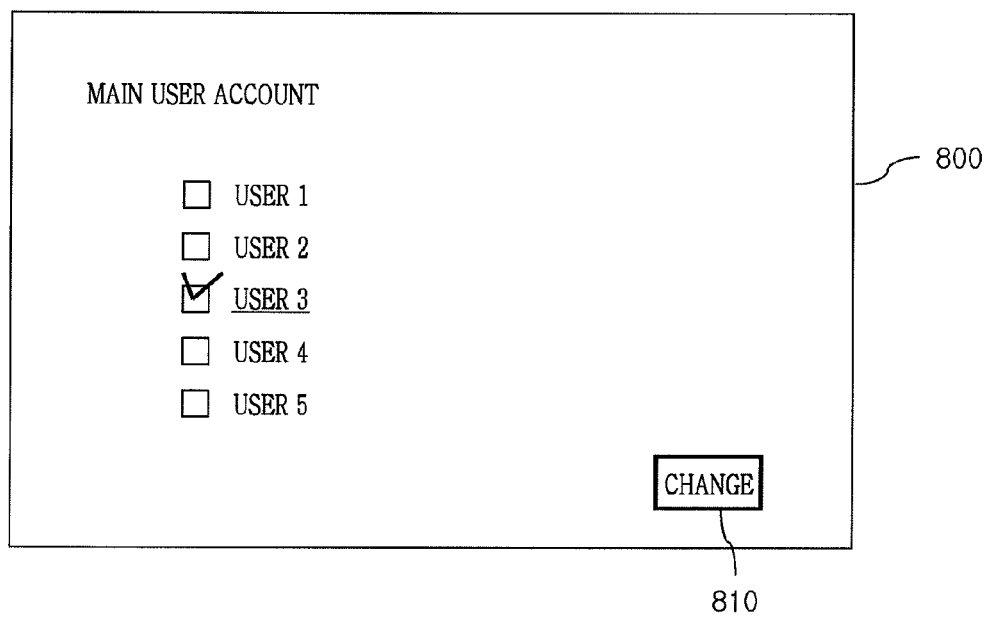

Referring to FIG. 65, when wanting to change the main user account into the user 3, the user selects the user 3 among the plurality of accounts displayed on the screen 800 and then, presses the change button 810, thereby making it possible to change the main user account.

Therefore, the user 3 is set as the main user account among the plurality of accounts and the remaining accounts, e.g., the user 1, 2, 4, and 5 accounts are set as the sub-user account and may be managed by the controller 110.

Whether or not each of the plurality of accounts is the main user account or the sub-user account may be stored in the storage unit 130.

Meanwhile, as described above, in order to manage the plurality of accounts together through the log-in, the controller 110 can separately generate 'main user account task' for managing the main user account and 'sub-user account task' for managing the sub-user accounts, such that each task may process the log in of each account and the management, etc. thereby processing the log-in of accounts and the corresponding management.

For example, after the 'main user account task' first performs the log-in of the main user account, the status information of the main user account may be confirmed. Next, after the 'sub-user account task' performs the log in of the sub-user accounts, the current status of the sub-user accounts can be confirmed.

The status of the account may be information related to the corresponding account stored in the storage unit 130, for example, may includes the communication history, incoming or outgoing communication and message, friend list, etc.

As described above, referring to FIG. 63, when all the plurality of accounts are logged in at the display device 10 (S700), the controller 110 confirms whether the video communication is received through the communication unit 100 (S710). For example, the controller 110 can confirm whether or not the video communication or the message is periodically received for each of the logged-in main user account and the sub-user accounts, and can first confirm and process whether the main user account receives the communication than whether the sub-user account receives the communication.

In more detail, the controller 110 receives and confirms the video communication or message for the main user account by using the 'main user account task' and since the process for the video communication or message for the main user account has a highest priority, when the event is generated, the controller 110 may first perform the event.

When the video communication or the message receiving event for the main user account is not generated, the 'main user account task' confirms whether or not the status information on the main user account needs to be changed to update the status information.

When the event for the above-mentioned main user account is not generated, the controller 110 uses the 'sub-user account task' to confirm the reception of the video communication or the message for the sub-user account by using the 'sub-user account task'.

The controller 110 may periodically repeatedly perform the task confirming whether the video communication for each of the main user account and the sub-user accounts is received according to the priority.

When the video communication is received, the controller 110 confirms whether the received video communication calls for any of the main user accounts and the sub-user accounts (S720).

When the account receiving the video communication is the main user account, the controller 110 responds to the received video communication (S750). For example, the controller 110 determines whether or not to respond to the received video communication based on the user's input from the user input unit 145 and when the user requests the video communication response, the controller 110 may transmit and receive the AV data with the other party's video communication device through the communication unit 100 and thereby carry out the video communication (e.g., video conference).

In more detail, the controller 110 acquires the AV data corresponding to the image and voice of the user by using the camera 141 and the mike 142 of the display device 10 and then transmits it to the other party's video communication device through the communication unit 110, and receives the AV data transmitted from the video communication device of the other party through the communication 100 and then may output the image and voice of the other party through the display unit 143 and the audio output unit 144 of the display device 10 and may perform the received video communication between the users.

Figure 66:
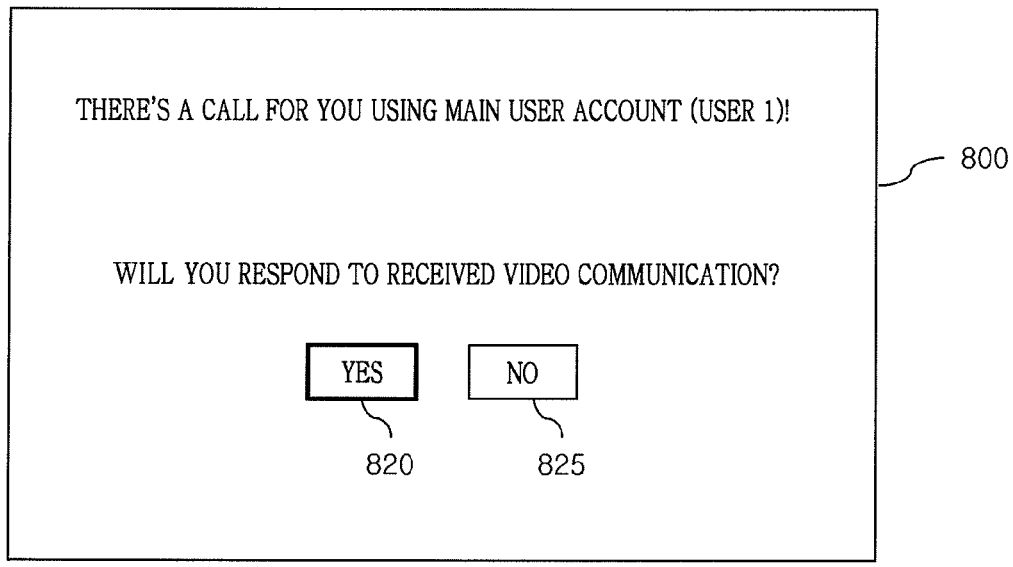
Figure 67:
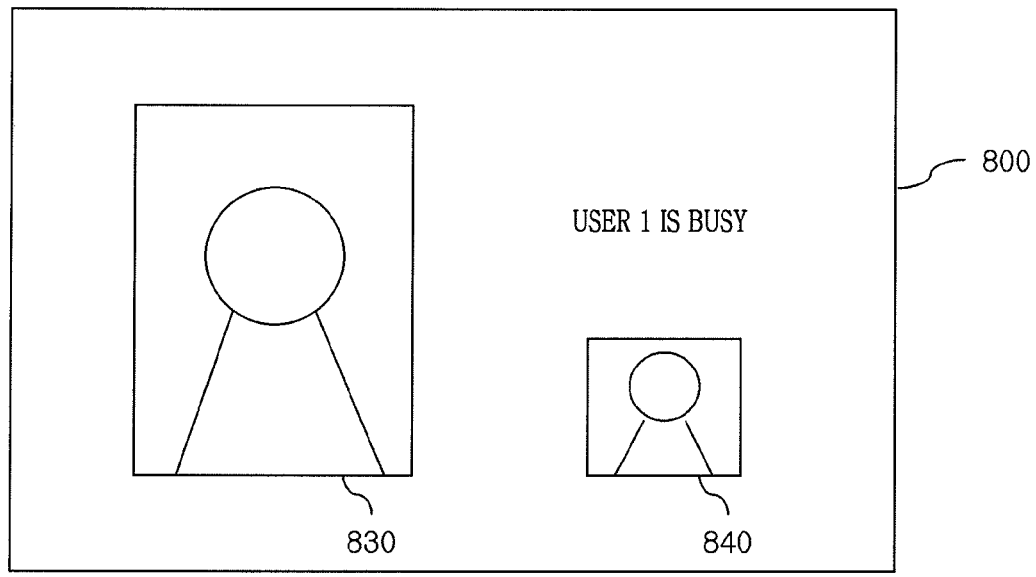

Referring to FIG. 66, when the video communication is received for the main user account, the display unit 143 may display that the main user account, for example, the video communication directed to the user 1 as the current main user on the screen 800

In addition, the display unit 143 may confirm whether or not to respond to the video communication received for the main user account on the screen 800, such that the user may select whether or not to respond to the video communication through the user input unit 145.

For example, if the user selects the Yes button 820 through the user input unit 145, the user's image 830 and the other party's image 840 may be displayed on the screen 800 of the user's display device 10 and the video communication may be performed between the user and the other party.

Meanwhile, when the user selects the No button 825, the response to the received video communication may be rejected (e.g., the video communication is declined) and the rejected communication is processed as the 'out communication' to the corresponding information, for example, receiving date, time, originator information, etc., in the storage unit 130.

Returning to FIG. 63, when the account receiving the video communication is the sub-user account at step S720, the controller 110 notifies the user of the reception of the video communication of the sub-user account (S730).

For example, the controller 110 displays that the video communication calling the sub-user account through the display unit 143, or the like is received and thereby notifies the user of it.

In more detail, when the video communication calling the sub-user account is received, the 'sub-user account task' transfers the message notifying the reception of the video communication of the sub-user account to the 'main user account task' and the 'sub-user account task' may allow the display unit 143 to display the popup window notifying the reception of the video communication of the sub-user account Thereafter, the controller 110 confirms whether the main user account needs to be changed (S740) and when the called sub-user account is changed into the main user account, the controller 110 responds to the received video communication (S750). If not, the method proceeds to step S760 where the controller 110 can perform an out communication process, e.g., indicate the communication is not possible since the user is not available (S760).

As described above, since the video communication response (e.g., accepting the request for video communication) is allowed by the main user account (and may not be allowed by the sub-user account, e.g.), the called sub-user account should be changed into the main user account in order to respond to the received video communication.

Therefore, the controller 110 may request the user if the change of the main user account is desired through the user input unit 145 in order to respond to the received video communication.

Figure 68:
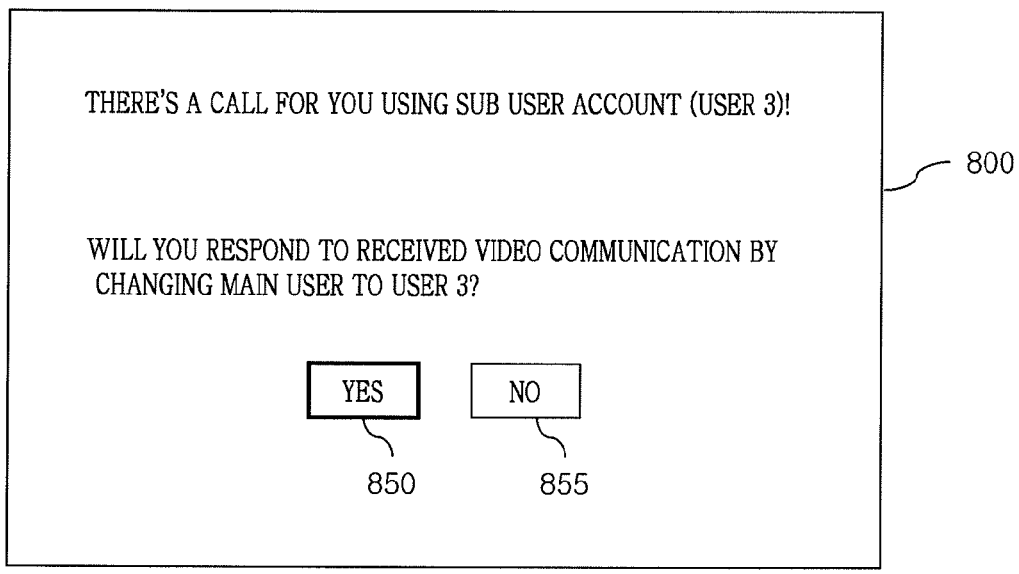

Referring to FIG. 68, when the video communication is received by the sub-user account, the display unit 143 receives the control of the controller 110 to display on the screen 800 that the sub-user account, for example, the video communication calling the user 3 is received.

In addition, the display unit 143 may confirm whether or not to change the main user into the user 3 in order to respond to the received video communication on the screen 800 for the user, such that the user may select whether or not to change the main user through the user input unit 145.

For example, when the user selects the Yes button 850 through the user input unit 145, the controller 110 may change the user 3 into the main user account and change the previous main user account, the user 1 into the sub-user account. As described above, the information on the changed main user account may be stored in the storage unit 130.

Meanwhile, according to an embodiment, when the user requests the change of the main user, the controller 110 may perform the authentication for the change of the main user account. For example, when the user inputs the encryption corresponding to the main user account and the input encryption matches the encryption stored in the storage unit 130, the change of the requested main user account may be performed.

Figure 69:
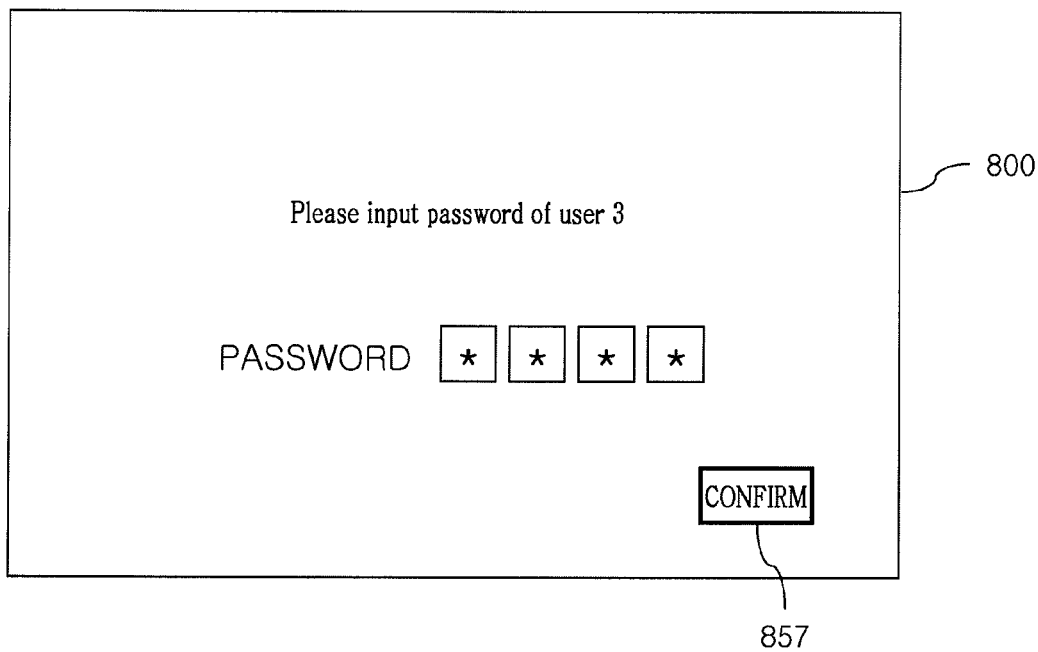

Referring to FIG. 69, when the user changes the user 3 into the main user account and responds to the received video communication, a window for inputting a password for the user 3 can be displayed on the screen 800.

When the user inputs the correct password for the user 3 through the user input unit 145, the video call with the other party by the user 3 on the display device 10 can be started in response to the received video communication.

Meanwhile, when the main user account is not changed, the controller 110 processes the received communication as a missed call or the like. For example, when the user changes the called sub-user account into the main user account and does not want to respond to the video communication or the password input for changing the main user does not correct match the stored password, the received video communication may be rejected and the rejected received communication is processed as a 'missed call', such that the corresponding information, for example, the received data and time, and the sender information, can be stored in the storage unit 130.

Meanwhile, the contents of the received call that has been processed as a 'missed call' as described above can be provided for the corresponding user, after the corresponding sub-user account is changed into the main user account.

Figure 73:
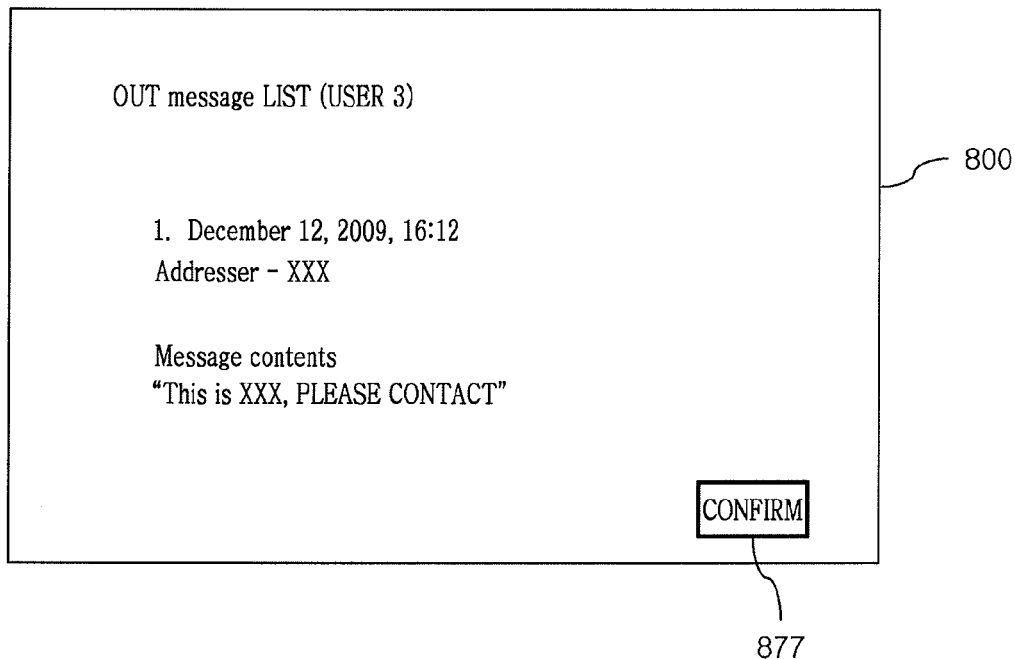

For example, when the user selects the NO button 855 on the screen 800 shown in FIG. 68, the received video communication is processed as a 'missed call' and the corresponding information is stored in the storage unit 130. Thereafter, when the user 3 is changed into the main user account, as shown in FIG. 73, information on the 'missed call' for the user 3 can be displayed on the screen 800.

Figure 70:
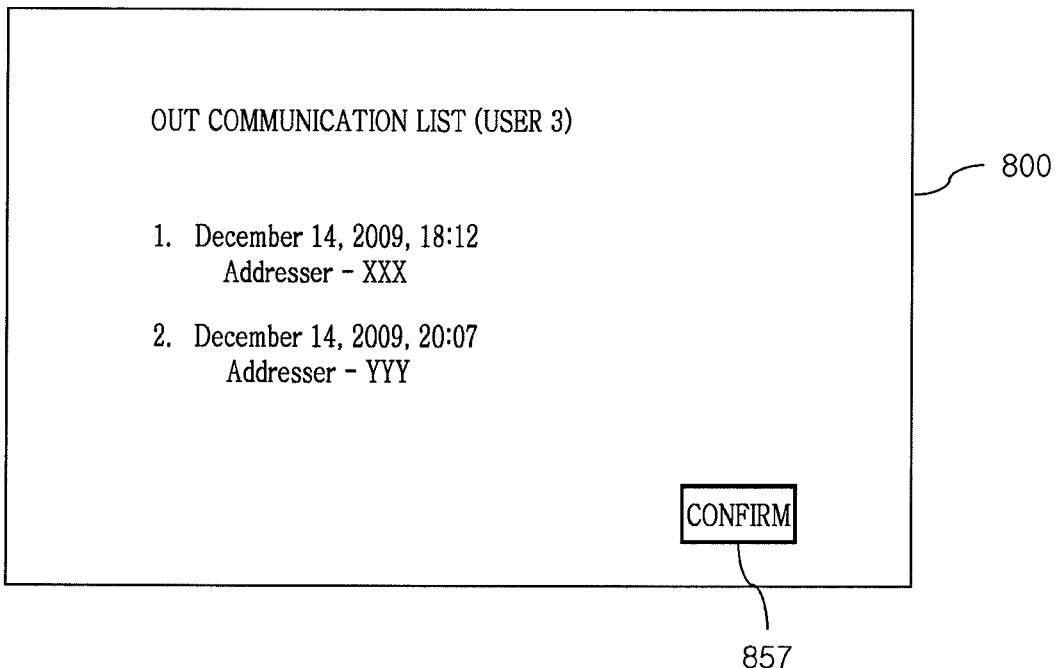

In other words, referring to FIG. 70, when the user 3 is changed into the main user account, the controller 110 reads out the account information stored in the storage unit 130 in connection with the user 3 and can control the display unit 143 to display the information of the 'missed call' previously received, for example, the received data and time, and the sender information, on the screen 800, on the basis of the read-out account information on the user 3, to inform the user.

Meanwhile, when the user selects the OK/confirm button 857 on the screen 800 displaying the list of missed calls, the 'missed call' information on the user 3 stored in the storage unit 130 can be deleted.

According to another embodiment of the present invention, the method of managing a user communication account, as described above with reference to FIGS. 63 to 70, can be performed in the same way for a received message as well as the video communication. In other words, the communication unit 100 can receive messages for a plurality of log-in accounts, but confirming the received messages is possible only for the main user account.

Figure 71:
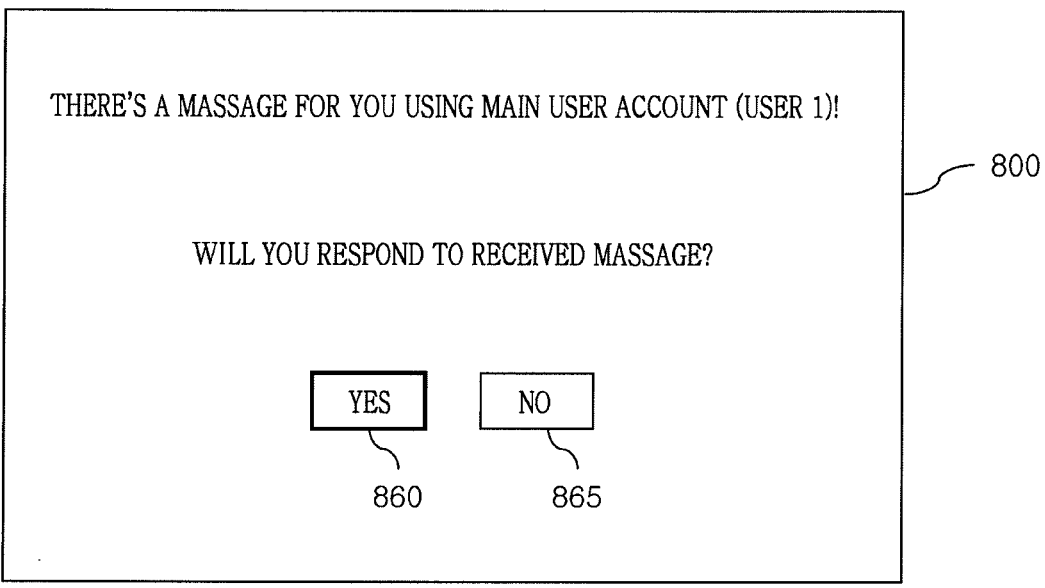

Referring to FIG. 71, when a message is received to the main user account, for example, the user 1, the controller 110 controls the display unit to display that a message has been received to the main user account (user 1) on the screen 800 to inform the user, and receives a confirmation for the received message from the user.

When the user selects the 'YES' button 860, the message received to the main user account (user 1) can be directly displayed on the screen 800.

On the other hand, when the user selects the 'NO' button 865, the message received to the main user account (user 1) is processed as a 'missed message', and the information on the received message, for example, the received date and time, the sender, and the contents of the message, can be stored in the storage unit 130.

Figure 72:
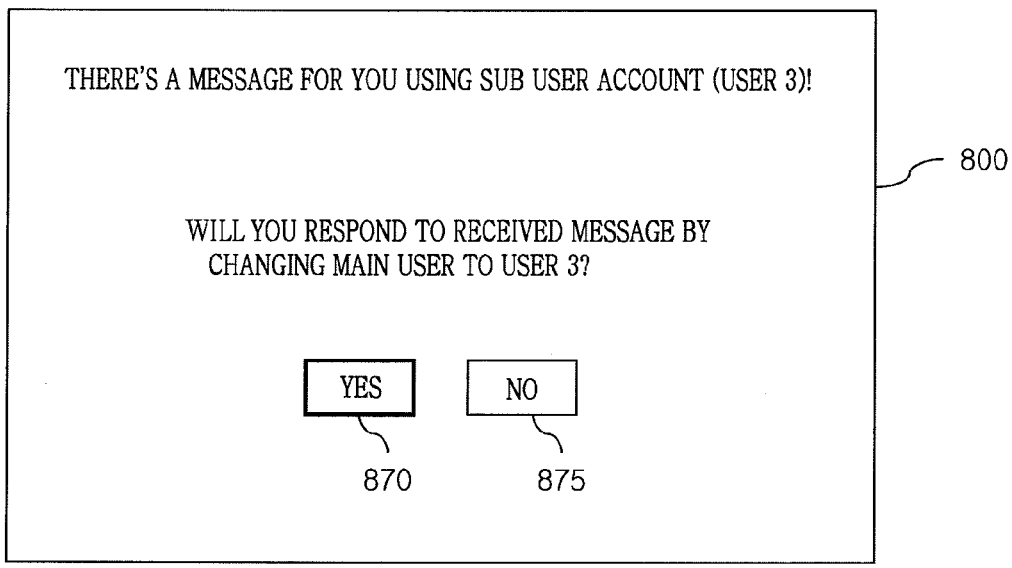

Referring to FIG. 72, when a message is received to the sub-user account, for example, the user 3, the controller 110 controls the display unit to display that a message has been received to the sub-user account (user 3) on the screen 800 to inform the user.

Further, the display unit 143 can confirm the user whether to change the main user to the user 3 in order to confirm/access the received message on the screen 800, and accordingly, the user can select whether or not to change the main user account through the user input unit 145.

For example, when the user selects the YES button 870 through the user input unit, the controller 110 can change the user 3 into the main user account and the user 1 that is the former main user can be changed into the sub-user account. Information on the main user account change as described above can be stored in the storage unit 130.

Meanwhile, according to an embodiment of the present invention, when the user requests for changing the main user, as described with reference to FIG. 69, the controller can perform authentication for changing the main user account.

When the user 3 is changed into the main user account, the message received to the user 3 can be displayed on the screen 800.

Meanwhile, when the user 3 is not changed to be the main user account, the controller can process the received message as a missed message. For example, when the user does not change the sub-user account receiving the message into the main user account or a password for changing the main user account is input incorrectly, the received message is processed as a 'missed message' and the corresponding information, for example, the received data and time, the sender, and the contents of the message can be stored in the storage unit 130.

Meanwhile, the contents of the received message that has been processed as a 'missed message' as described above can be provided for the corresponding user, after the corresponding sub-user account is changed into the main user account.

For example, when the user selects the NO button 875 on the screen 800 shown in FIG. 72, the received message is processed as a 'missed message' and the corresponding information is stored in the storage unit 130. Thereafter, when the user 3 is changed into the main user account, as shown in FIG. 73, a list of 'missed messages' for the user 3 can be displayed on the screen 800.

In other words, referring to FIG. 73, when the user 3 is changed into the main user account, the controller 110 reads out the account information stored in the storage unit 130 in connection with the user 3 and can control the display unit 143 to display the information of the 'missed message' previously received, for example, the received data and time, the sender, and the contents of the message, on the screen 800, on the basis of the read-out account information on the user 3, to inform the user.

Figure 74:
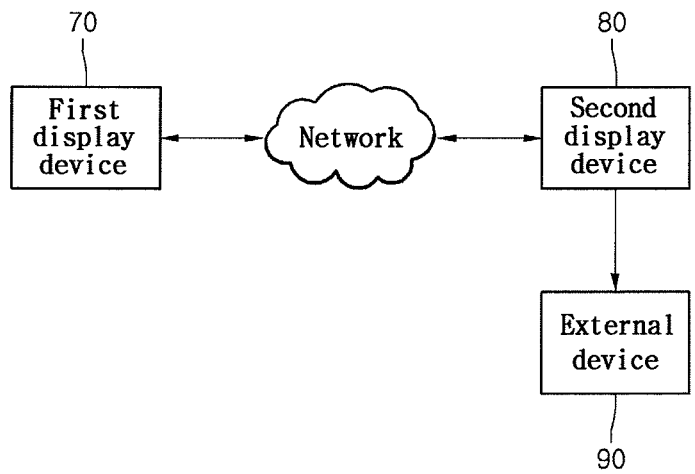
FIG. 74 is a block diagram showing a configuration of a video communication system according to another exemplary embodiment of the present invention.

FIG. 74 is a block diagram illustrating the configuration of a video communication system according to another embodiment of the present invention.

Referring to FIG. 74, the second display device 80 may be a digital TV that allows a user to make video communication and the first display device 70 may be a digital TV that allows the other party to make video communication.

Meanwhile, the external device 90 is another device that can make video communication, and according to an embodiment of the present invention, the external device 90 can receive vide communication switched from the first display apparatus 70 to the second display apparatus 80 or vice versa. Each of the devices 70, 80, 90 can have the configurations of the display device discussed in any other embodiment. All components of the system are operatively coupled and configured.

For example, the second display device 80 can switch video communication received from the first display device 70 to the external device 90, in accordance with a user's request, such that the user can make video communication with the counterpart of the first display apparatus 70. That is, in this embedment, the second display device 80 is where the current user is at, and the first display device 70 is where the other party for the video communication with the current user is at. The external device 90 is another device of the current user and is configured to communicate with the second display device 80. As a result, when the first display device 70 sends a video communication request to the second displayed evict 80, the video communication can be routed to the external device 90 as needed. For instance, the user can pre-set up so that any communication directed to the second display device 80 is routed to the external device 90.

In more detail, the second display apparatus 80 can be requested for switching the video communication to the external device 90, configure connection for transmitting/receiving data to/from the external device 90 in accordance with the request, and transmit/receive the user's video/voice data and the other party's video/voice data to/from the external device 90, using the configured connection.

The first display apparatus 70, the second display device 80, and the external device 90, as described with reference to FIG. 1, may be various devices that can make video communication, such as a mobile phone, a PDA or a notebook computer, a PC or a display apparatus.

The communication unit 100 of the second display device 80 can transmit a transmission stream including AV data corresponding to the user's video and voice to an external device, for example, the first display device 70 of the other party, through a wire/wireless network. The communication unit 100 can also receive a reception stream including AV data corresponding to the counterpart's video and voice in the visual communication, from the first display apparatus 70.

For example, the communication unit 100 of the second display device 80 is connected with the first display device 70 by Ethernet or wire/wireless network, such as IEEE 802.3, IEEE 802.11 and can transmit/receive video communication data to/from the first display apparatus 70. Further, the communication unit 100 of the second display device 80 can be connected with the external device 90 by a wire/wireless network and transmit/receive the AV data to/from the external device 90 through the wire/wireless network, when it is requested to switch the video communication.

For example, the communication unit 100 of the second display device 80 and the external device 90 can transmit/receive the AV data, using wireless communication standards, such as WiHD (Wireless HD), WHDi (Wireless Home Digital Interface) or WiFi (Wireless Lan). In more detail, as it is requested to switch the video communication to the external device 90, the communication unit 100 can transmit AV data corresponding to the video and voice of the other party which are received from the first display apparatus 70 to the external device 90, while it can receive AV data corresponding to the video and voice of the user from the external device 90.

Meanwhile, the AV data of the user received from the external device 90 can be transmitted to the first display device 70 through the communication unit 100 of the second display device 80.

Although the configuration of a display apparatus according to an embodiment of the present invention was described by exemplifying when the communication 100 is connected with the first display device 700 and the external device 90, the communication 100 may be divided into a first communication unit connected with the first display device 70 and a second communication unit connected with the external device 90.

Hereafter, a method for connecting video communication according to an embodiment of the present invention is described in detail with reference to FIGS. 75 to 87.

Figure 75:
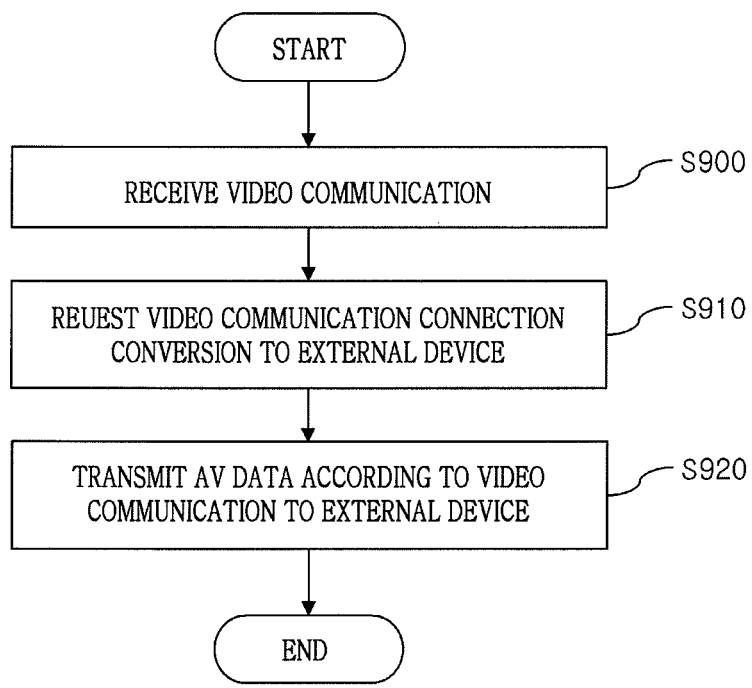
FIG. 75 is a flowchart showing a method for connecting video communication according to a first embodiment of the present invention.

FIG. 75 is a flowchart showing a method for connecting video communication according to a first exemplary embodiment of the present invention, the method for connecting video communication is described in connection with the block diagram shown in FIGS. 2 and 74.

Referring to FIG. 75, the communication unit 100 of the second display device 80 receives video communication from the first display device 70 (S900).

Thereafter, the communication unit 100 of the second display device 80 is requested to switch the video communication to the external device 90 (S910). For example, the second display device 80 may be a digital TV in the dining room of the user and the external device 90 may be a portable terminal of the user. In this case, the user receives video communication from the other party through the TV at the dining room and can set up to switch the received video communication to his/her portable terminal so that the user may receive the video communication in another room in the house.

The switching of the video communication implements switching the video communication received by the second display device 80 to another communication apparatus, e.g., the external device 90 such that the user (who has moved to another location) can perform the received video communication with the external device 90.

In step S910, the user can request for switching the video communication to the external device 90, by using the second display device 80, or request for switching the video communication, by using the external device 90, which is the desired destination of that video communication.

The communication unit 100 transmits video communication data of the video communication to the external device 90 in response to the request for switching (S920). For example, the communication unit 100 of the second display device 80 can configure network connections for transmitting/receiving data to/from the external device 90 by control of the controller, and can transmit/receive video communication data to/from the external device 90, using the connected network. In other words, the communication unit 100 can allow the user to watch and listen to the video and the voice of the other party (from the first display device 70) at the external device 90 by transmitting the video communication data received from the video communication apparatus of the other party, that is, the first display device 70.

Meanwhile, the communication unit 100 of the second display device 80 receives video communication data of the video communication (e.g., the user's video and voice) from the external device 90, and the communication unit 100 can transmit the video communication data received from the external device 90 to the first display device 70, and accordingly, the other party can watch and listen to the video and voice of the user.

Figure 76:
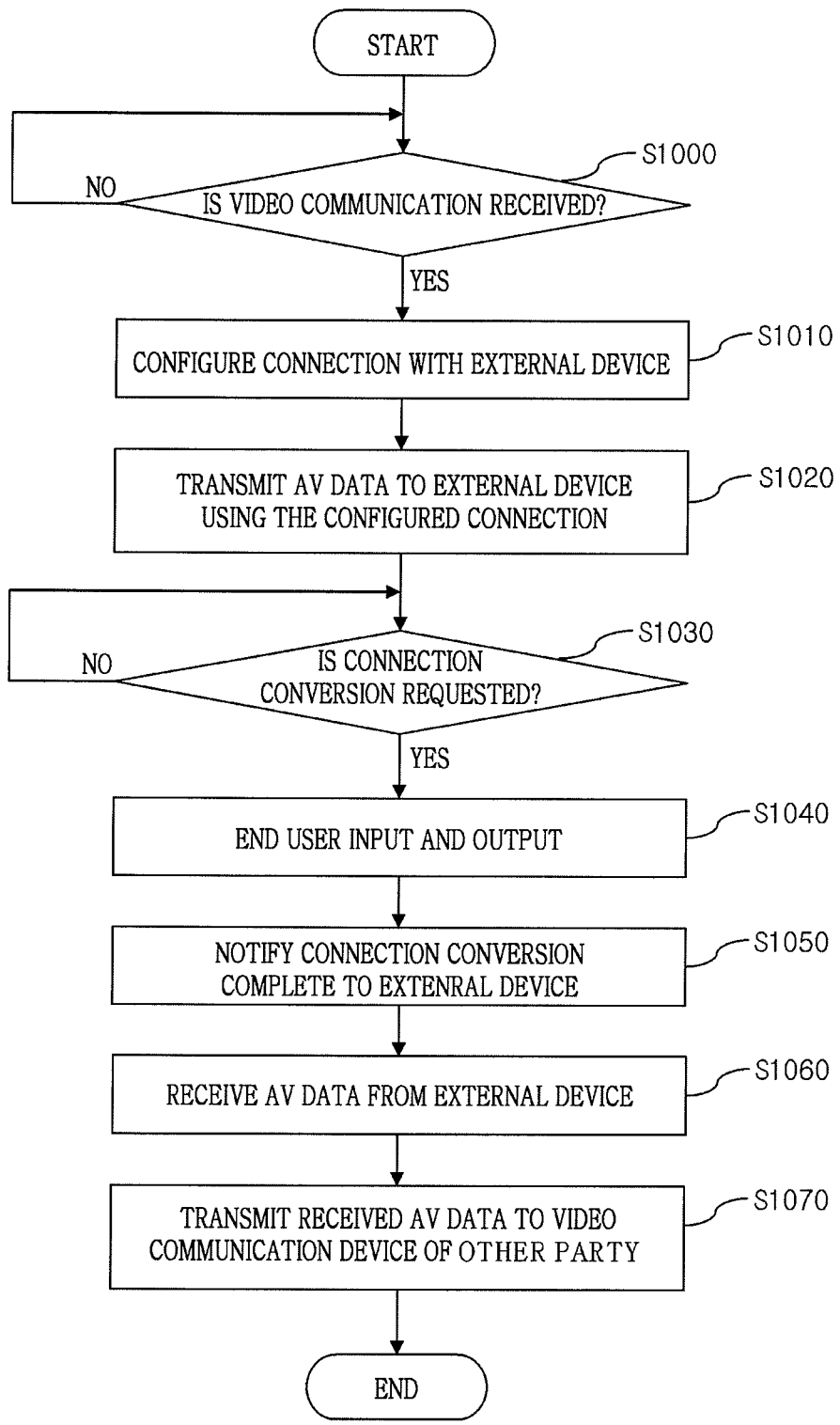
FIG. 76 is a flowchart showing a method for connecting video communication according to a second exemplary embodiment of the present invention.

FIG. 76 is a flowchart illustrating a method of connecting video communication according to a second embodiment of the present invention and, in the method illustrated in FIG. 76, the same portions as those described in connection with FIGS. 74 and 75 are not described below.

Referring to FIG. 76, when a video communication is received from the other party (S1000), the communication unit 100 configures connection with the external device 90 (S1010) and transmits the received video communication data to the external device 90, using the configured connection (S1020).

For example, the controller 110 can controls the communication unit 100 such that the network connection for transmitting/receiving the video communication data to/from the external device 90 can be configured, when the video communication is received even before it is requested to switch the video communication to the external device 90.

Meanwhile, the step of configuration the connection with the external device 90 may include a step of requesting connection to the external device 90 from the communication unit 100 and a step of asking for approval of the requested connection from the external device 90.

Further, the controller 110 can control the communication unit 100 to transmit the vide communication data received from the first display device 70 of the other party to the external device 90, using the configured network connection.

As described above, it is possible to rapidly switch the video communication to the external device upon receiving the request for switching, by configuring the connection with the external device 90 in advance before the user requests for switching the video communication and transmitting the video communication data received from the first display device 70 to the external device 90, such that it is possible to provide video communication service without disconnection.

However, in one example, the external device 90 may not produce AV data included in the received video communication data, before switching is requested. In other words, the external device 90 only receives the AV data from the second display device 80, not produces the AV data, before the user requests for switching the video communication to the external device 90, such that the user may not watch and listen to the video and voice of the other party with the external device 90 before the switching is requested. In such a case, the video communication switching for the second display device 80 is possible to the external device 90 (or any other external device) since the external device has already been registered with the second display device 80 to be able to perform the video switching. The device registration process is discussed in more detail referring to FIG. 77.

Figure 77:
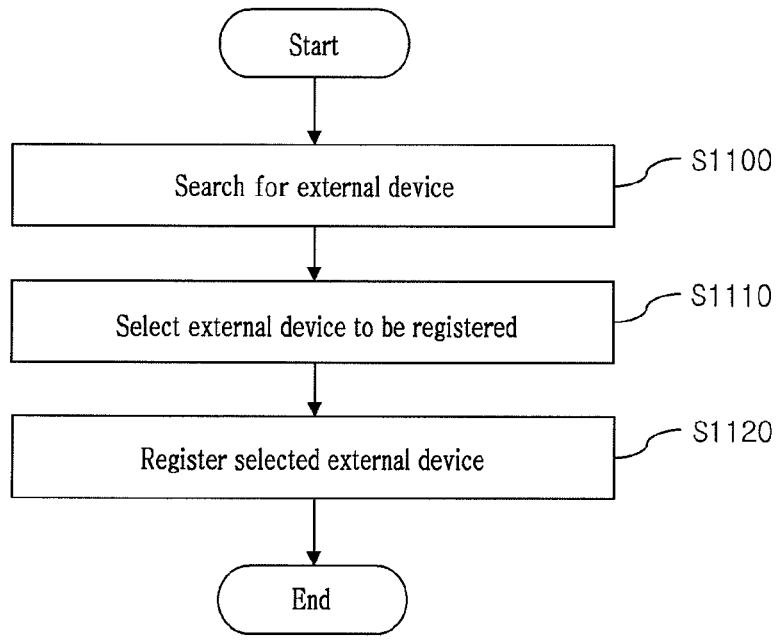
FIG. 77 is a flowchart showing a method for registering external devices according to an exemplary embodiment

FIG. 77 is a flowchart showing an embodiment of a method for registering external devices, in which the communication unit 100 of the second display device 80 searches for connectable peripheral external devices (S1100).

For example, the controller 110 can control the communication unit 100 to search for possible external devices that can be connected in wired/wireless networks through multicasting or broadcasting of periodical search signals.

In more detail, the second display device 80 sends out a search signal including its own address information in multicasting or broadcasting and the external device 90 (or any other external device) receiving the search signal can respond by transmitting a signal including its own address information.

After an external device to be registered in the searched external devices is detected and selected (S1110), the controller 110 registers the selected external device (S1120). Here, if multiple external devices are detected, the user can select one or more external devices among the detected external devices for the registration. In this regard, if desired, the second display device 80 may route the video communication data of a video communication to one or more registered external devices, simultaneously.

As a variation, the user can directly specify the external device to register, by directly inputting the address of the external device 90 to register through the second display device 80.

In the step of registering the external device, the second display device 80 can request device information from the external device 90 and the external device 90 can transmit the device information to the second display device 80 in response to the request. Further, the display device 80 can transmit configuration information to the external device 90 and the external device 90 can select a configuration relating to the connection in accordance with the configuration information.

For example, the device information of the external device 90 can include information, such as AV codec, buffer size, and data bit rate, and the configuration information is information on the available configuration relating to the connection with the second display device 80, and for example, may include priority, whether there is only voice, and whether to permit multi-connection etc.

Further, the controller 110 can store the register-related items of the external device 90, as described above, in the storage unit 130 of the second display device 80.

Meanwhile, the external device 90 may be unregistered (or removed from the registered list) by a user's request through the second display device 80 and the external device 90, and accordingly, the register-related items of the external device 90 stored in the storage unit 130 may be deleted.

Returning to FIG. 76, after the connection with the external device 90 is configured as described above in step S1020, the controller 110 confirms whether there is a request for switching video communication to the external device 90 (S1030).

The communication unit 100 can continue with transmitting the AV data received from the first display device 70 to the external device 90 by using the configured connection, even before the user requests for switching the video communication.

Meanwhile, when it is requested to switch the video communication, the controller 110 ends the user input/output at the second display device 80 (S1040). When the user requests for switching the video communication to the external device 90, the second display device 80, in more detail, the display unit 143 of the second display device can display information that the video communication is requested to be switched to the external device 90 on the screen 1200.

Figure 78:
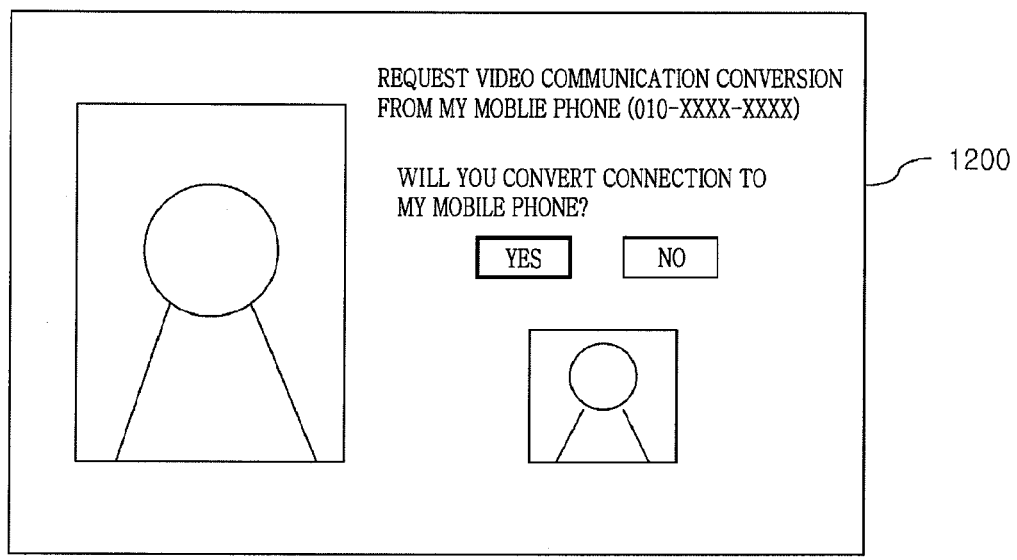
FIGS. 78 and 79 are diagrams for explaining a method for switching and connecting video communication to external devices according to an exemplary embodiment.

Referring to FIG. 78, the video of the user and the other party is displayed on the screen 1200 of the second display device 80, and when the device switching is requested, a sentence saying that it has been requested to switch the video communication to the external device 90 can be displayed on the screen 1200.

For example, when video communication is received to the 'dining room TV' that is the second display device 80, the user can request for switching the received video communication to his/her: mobile phone that is the external device 90, by using the mobile phone 90.

In this case, information on his/her mobile phone (the external device 90) that has been requested to receive the video communication is displayed on the screen 1200 of the second display device 80 that has been received the video communication, as shown in FIG. 78, and it is possible to select whether to permit the requested switching, using the key buttons.

Further, as described above, when the user requests the device switching for the video communication to the external device 90, the controller 100 can finish/end the input of the user's video and voice using the camera 141 and the microphone 142 of the second display device 80, and end the output of the other party's video and voice using the display unit 143 and the voice output unit 144 (S1040).

Accordingly, the video and audio according to the vide communication are not input/output any more in the second display device 80, but can be input/output by the external device 90, after the device switching.

Figure 79:
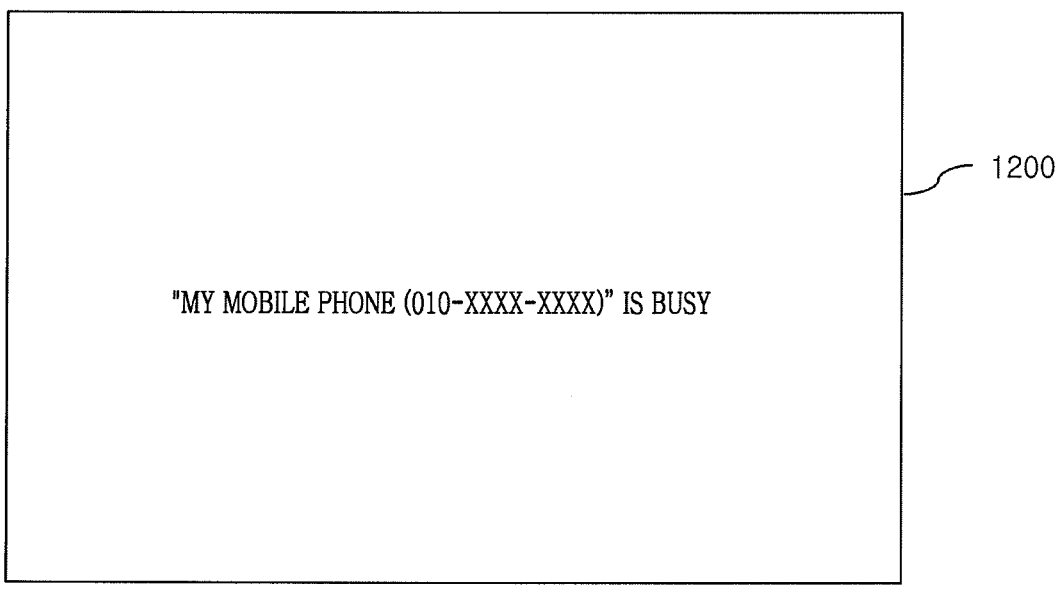

Referring to FIG. 79, when it is requested to switch the video communication to the external device 90, it can be displayed on the screen 1200 of the second display device 80 that the video communication has been switched to the external device 90 and the video communication is now currently performed on 'my mobile phone' (external device 90).

Meanwhile, according to an embodiment, only the user input/output operation described above is ended when there is a request for switching the video communication, and the second display device 80 can continue with receiving the video communication data from the first display device 70 and transmitting the data to the external device 90.

Returning to FIG. 76, when the user input/output is finished at the second display device 80, as described above, the communication unit 100 notifies the external device 90 that the switching of the video communication has been completed (S1050).

Meanwhile, the external device 90 that has been notified that the switching has been completed produces the AV data (of the other party) received from the second display device 80, and accordingly, the user at the external device 90 can now watch and listen to the video and voice of the other party through the external device 90.

During the video communication, the communication unit 100 of the second display device 80 receives the AV data (e.g., AV data of the user) from the external device 90 (S1060) and then transmits the received AV data to the video communication apparatus of the other party (first display device 70) (S1070) such that the video communication between the first display device 70 and the external device 90 is carried out through the second display device 80 functioning as a router.

For example, the external device 90 having been notified that the switching has been completed can generate AV data corresponding to the user's video and voice by using the camera and the microphone of the external device 90 and then transmit the generated AV data to the second display device 80.

Therefore, the other party of the first display device 70 can watch and listen to the video and voice of the user which were acquired through the external device 90, such that the user and the other party can have video communication, using the first display device 70 and the external device 90.

Figure 80:
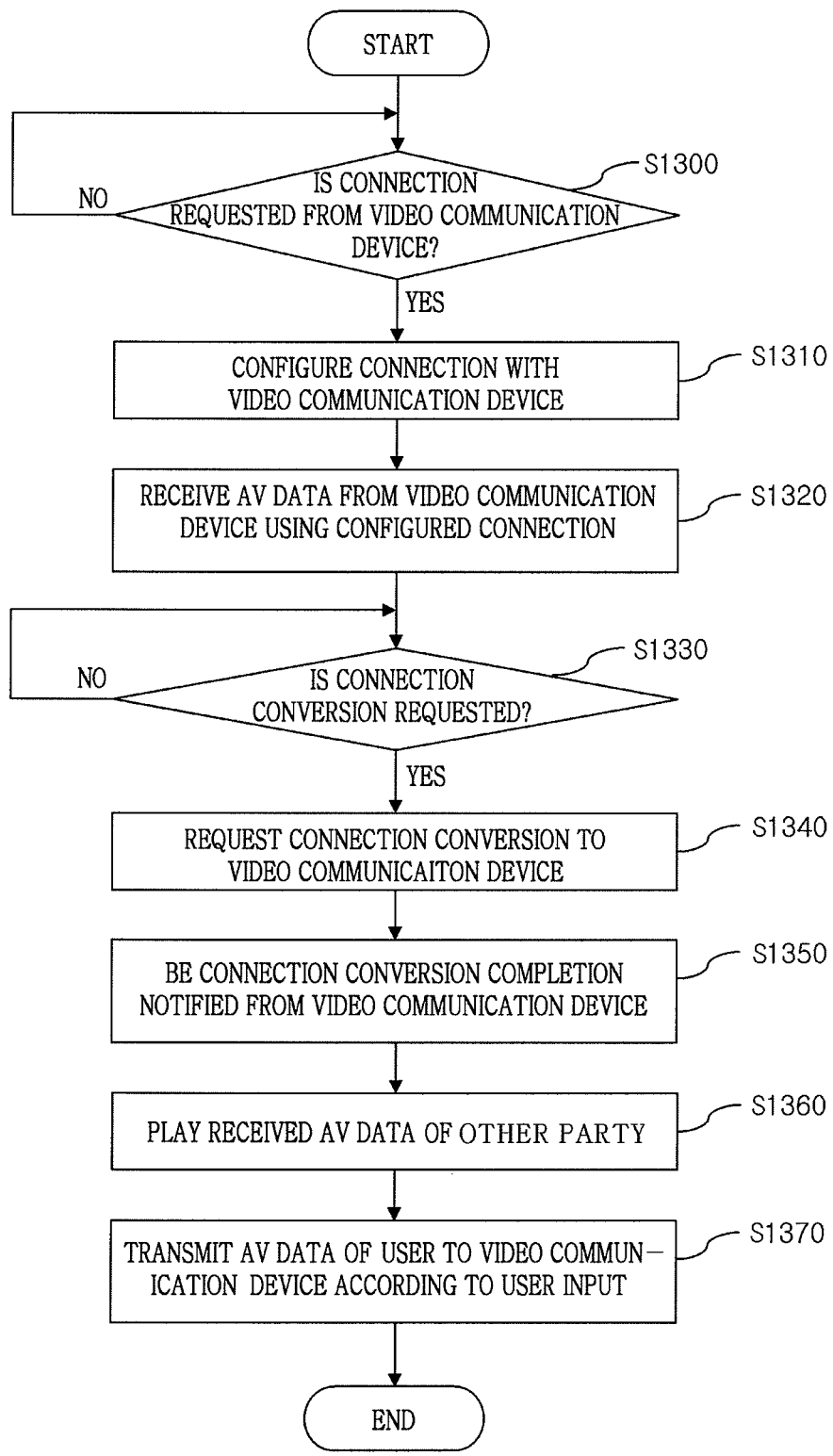
FIG. 80 is a flowchart showing a method for connecting video communication according to a third exemplary embodiment of the present invention.

FIG. 80 is a flowchart showing a method for connecting video communication according to a third exemplary embodiment of the present invention, in which an embodiment of a method for connecting video communication which is performed in the external device 90 is shown. The same features in the method for connecting video communication shown in FIG. 80 as those described with reference to FIGS. 74 to 79 may not be described hereafter.

Referring to FIG. 80, the external device 90 is requested for connection from the video communication device (S1300) and configures connection with the video communication device (S1310).

For example, when the video communication is received to the second display device 80 which in this example is the video communication device of the user, the external device 90 registered in the second display device can configure a wire/wireless network for data transmission/reception in accordance with a request from the second display device 80.

Thereafter, the external device 90 receives AV data (e.g., AV data of the video communication from the other party) from the video communication device (second display device 80), using the configured connection (S1320).

As described above, before the user's request for switching the video communication, the external device 90 can receive the AV data received from the first display device in the video communication, through the second display device 80, by configuring the connection with the second display device 80.

However, the external device 90 may not reproduce the received AV data (e.g., output it to the user), before switching is requested.

In other words, the external device 90 only receives the AV data from the second display device 80, and may not reproduce the AV data at the external device 90, before the user requests switching of the video communication to the external device 90, such that the user may not watch and listen to the video and voice of the other party with the external device 90 before the switching is requested.

Meanwhile, before switching of the video communication to the external device 90 is requested, the external device 90 may not transmit the AV data (e.g., AV data of the user such as the real-time image of the user at the external device 90) to the second display device 80 by using the configured connection.

In more detail, the external device 90 temporarily stores the AV data received from the second display device 80 in a buffer and decodes the temporarily stored AV data, but it may not reproduce it, and can delete the temporarily stored AV data in a FIFO (First Input First Output) way in order to prevent the overflow of the buffer of the external device 90.

When the user requests for switching of the video communication (S1330), the external device 90 transmits the request for switching to the video communication device (second display device 80) (S1340).

For example, the external device 90 can request for switching the video communication to the second display device 80, reproduce the AV data according to the video communication, and perform operations for the user input/output acquiring the user's video and voice.

Figure 81:
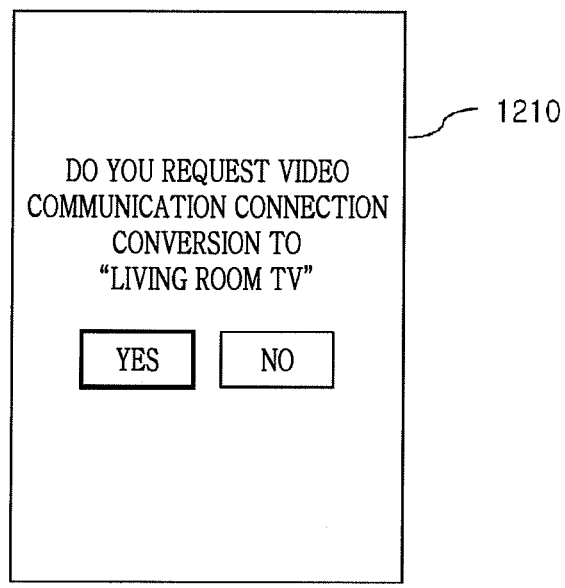
FIGS. 81 and 82 are diagrams for explaining a method for switching and connecting video communication according to an exemplary embodiment.

Referring to FIG. 81, the user at the external device 90 (e.g., mobile phone) can request for switching of the video communication received from the second display device 80 (e.g., the dining room TV), such that sentences and buttons for requesting the switching of the video communication can be displayed on the screen 1210 of the user's mobile phone (external device 90).

When being notified that the switching has been completed from the video communication device (second display device 80) in response to the request for switching (S1350), the external device 90 reproduces the received AV data of the video communication (S1360).

For example, the external device 90 plays the AV data, which has been received, e.g., the video and voice data of the other party which are received through the second display device 80 such that the user can watch it, after being notified that the switching of the video communication has been completed from the second display device 80.

In other words, after being notified that the switching has been completed, the external device 90 decodes the AV data received from the second display device 80 and temporarily stored in the buffer and can output the decoded data by using the display module and the voice output module of the external device 90.

Figure 82:
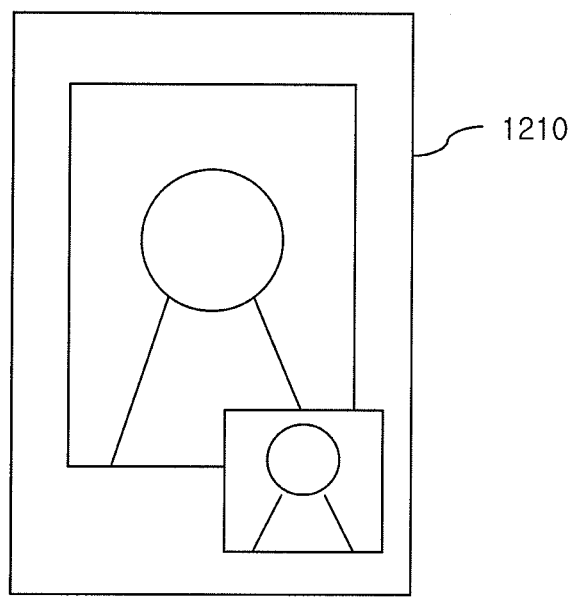

In step S1360, referring to FIG. 82, the user can be provided with the video of the other party and the video of himself/herself for video communication through the screen of the external device 90, for example, 'my mobile phone'.

Meanwhile, the external device 90 transmits AV data according to the user input to the video communication device (second display device 80) (S1370). For example, after being notified that the switching has been completed, the external device 90 can generate AV data corresponding to the user's video and voice by using the camera and the microphone of the external device 90 and then transmit the generated AV data to the second display device 80. Then, the AV data transmitted from the external device 90 to the second display device 80 can be transmitted and reproduced at the first display device 70 of the other party.

Although it was described that the connection between the second display device 80 and the external device 90 is configured before the user's request for device switching, with reference to FIGS. 76 to 82, the present invention is not limited thereto. For example, the second display device 80 may transmit/receive the video communication data by configuring connection with the external device 90 after the user's request for device switching.

In more detail, the connection between the second display device 80 and the external device 90 may be configured, after the user's requests for device switching, in consideration of signal transmission/reception performance or interference at the frequency band for transmitting/receiving data between the second display device 80 and the external device 90 or power consumed by the device.

Figure 83:
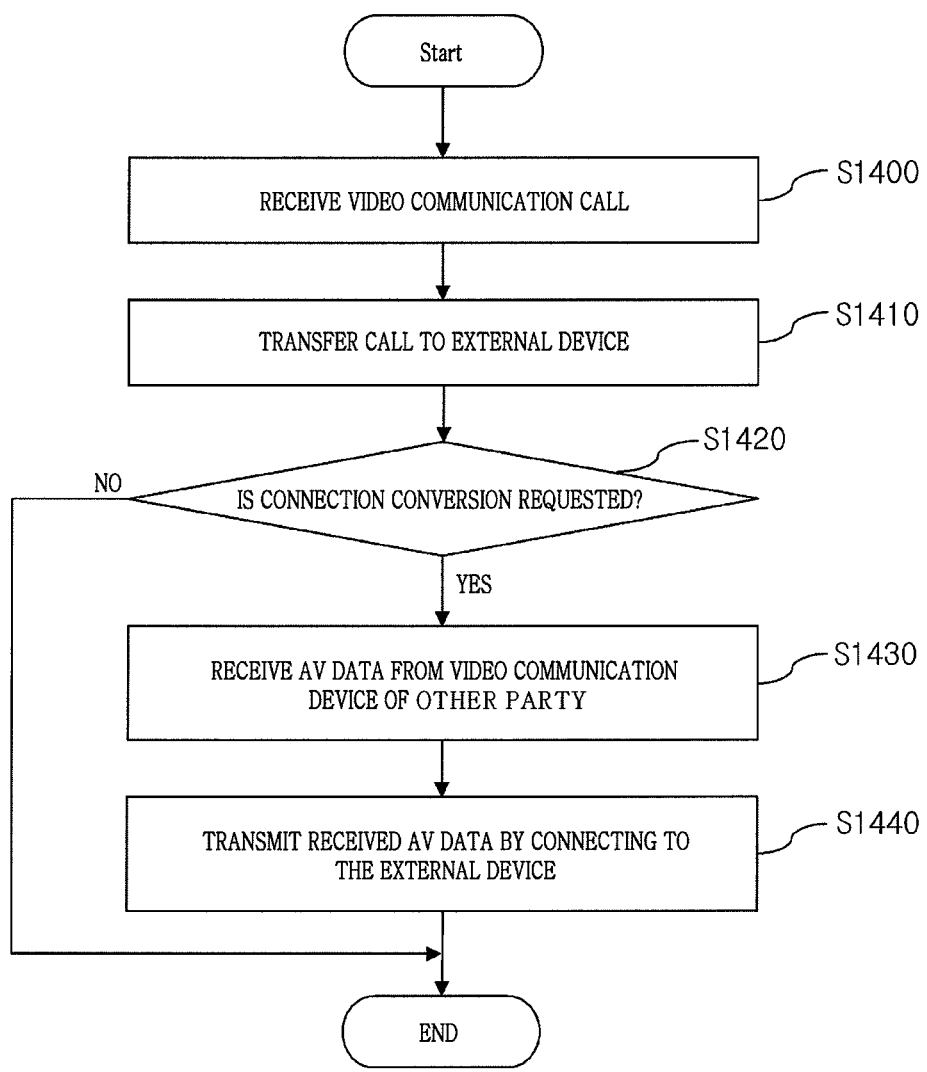
FIG. 83 is a flow chart showing a method for transmitting communication calls to external devices according to an exemplary embodiment.

FIG. 83 is a flowchart of an embodiment of a method of transmitting video communication calls to an external device, in which the method of transmitting calls will be described in combination with the block diagrams shown in FIGS. 3 and 74.

Referring to FIG. 83, the communication unit 100 of the second display device 80 receives a video communication call from the first display device 70 of the other party (S1400) and transmits (routes) the received call to the external device 90 (S1410).

For example, the user can set in advance a transmission of a video communication call to the external device 90, and accordingly, the video communication call received by the second display device 80 can be set up to be transmitted to the external device 90.

In more detail, the controller 110 of the second display device 80 can store information on the external device 90 to which the call is to be transferred in accordance with the setting-up of call transmission into the storage unit 130, and can transmit/route the call to the external device 90 by using the information stored in the storage unit 130 when a video communication call is received.

The external device 90 that has received the video communication call then can inform the user at the external device 90 that the video communication call has been received from the first display device 70.

Thereafter, the controller 110 of the second display device 80 determines whether or not there has been a request from the external device for switching the video communication (S1420).

Figure 84:
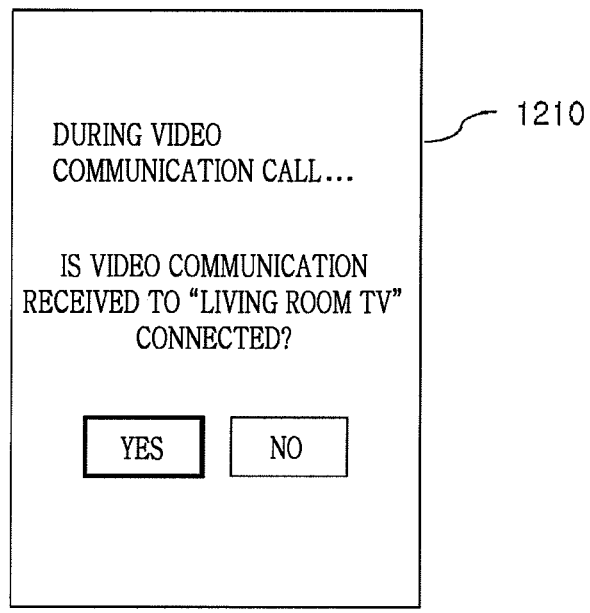
FIG. 84 is a diagram for explaining a method for connecting video communication to external devices receiving video communication calls.

Referring to FIG. 84, 'my mobile phone' (the external device 90) that has received the video communication call can display that the video communication call has been received on the screen 1210 of the mobile phone, and can receive a selection about whether to receive the video communication switched from the 'dining room TV' (the second display device 80) by the user.

When there is a request for device switching, the communication unit 100 receives the AV data from the first display device 70 (S1430) and connects to the external device 90 to transmit the received AV data to the external device 90 (S1440).

The process in steps S1430 and S1440 after the request for switching may be the same as (or similar to) those described with reference to FIGS. 76 to 82.

Figure 85:
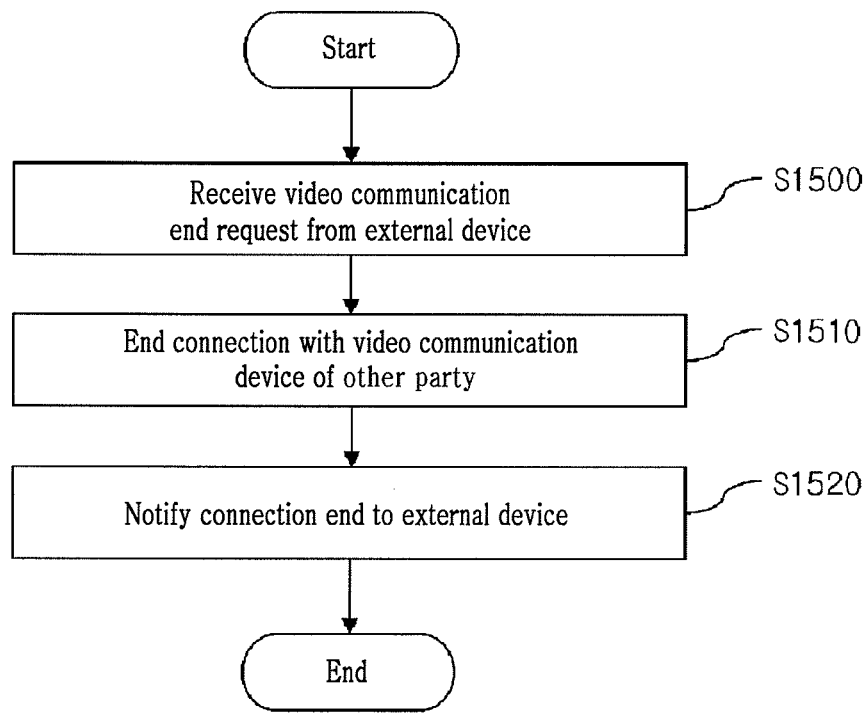
FIG. 85 is a flow chart showing a method for ending video communication according to an exemplary embodiment.

FIG. 85 is a flowchart illustrating an embodiment of a method of ending a video communication.

Referring to FIG. 85, the communication unit 100 of the second display device 80 is requested to end a currently active video communication from the external device 90 (S1500) and in response, the communication unit 100 ends the connection with the first display device 70 of the other party (S1510). For example, the controller 110 ends the data transmission/reception with the first display device 70 for the video communication in accordance with the request for ending the video communication and returns the sources, thereby ending the connection with the first display device 70.

Thereafter, the communication unit 100 notifies that the connection with the first display device 70 (e.g., video communication with the first display device 70) has been terminated, to the external device 90 (S1520).

Figure 86:
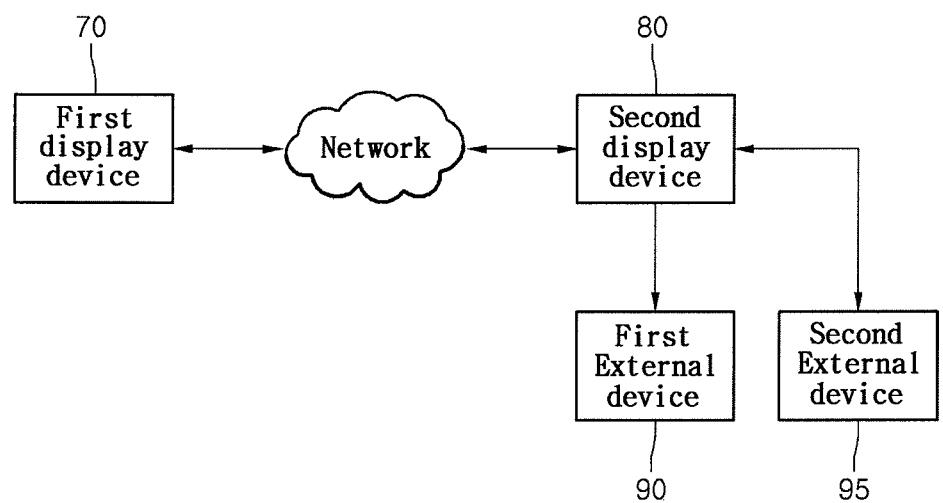
FIG. 86 is a block diagram showing a configuration of a video communication system according to another exemplary embodiment of the present invention.

FIG. 86 is a block diagram illustrating the configuration of a video communication system according to another embodiment of the present invention, in which the same description in the configuration of the system in FIG. 86 as that provided with reference to FIGS. 1 to 85 may not provided below. In this example, multiple external devices for the device switching are involved.

Referring to FIG. 86, the second display device of the user can be connected with a plurality of external devices 90 and 95, and accordingly, video communication received to the second display device 80 can be switched to at least one of the plurality of external devices 90 and 95.

A method of switching the video communication received by the second display device 80 to the first external device 90 or the second external device 95 is the same as that described with reference to FIGS. 75 to 85 and the detailed description may not be repeated.

According to an embodiment of the present invention, the video communication apparatus (e.g., the second display device 80) can be connected simultaneously with a plurality of external devices, and accordingly, received video communications can be switched to the plurality of external devices simultaneously, sequentially or in any desired order.

For example, the second display device 80, in more detail, the communication unit 100 of the second display device 80 is connected with the first external device 90 and the second external device 95 at the same time, and can transmit the AV data received from the first display device 70 to the first and second external devices 90 and 95 and can also transmit the AV data received from the first and second external device 90 and 95 to the first display device 70. Although the discussion here involves two external devices 90 and 95, any other number of external devices are possible.

In this case, the second display device 80 can synchronize the AV data received from the first external device 90 with the AV data received from the second external device 95 and transmit it to the first display device 70.

For example, the controller 110 of the second display device can synchronizes the AV data by performing drop of delay data or combining the same time data by using a time stamp etc. of the AV data received from the first and second external devices 90 and 95.

Therefore, it is possible to easily switch the video communication received by the second display device 80 to the plurality of external devices 90 and 95, such that two or more users at different external devices can participate in the video communication.

Figure 87:
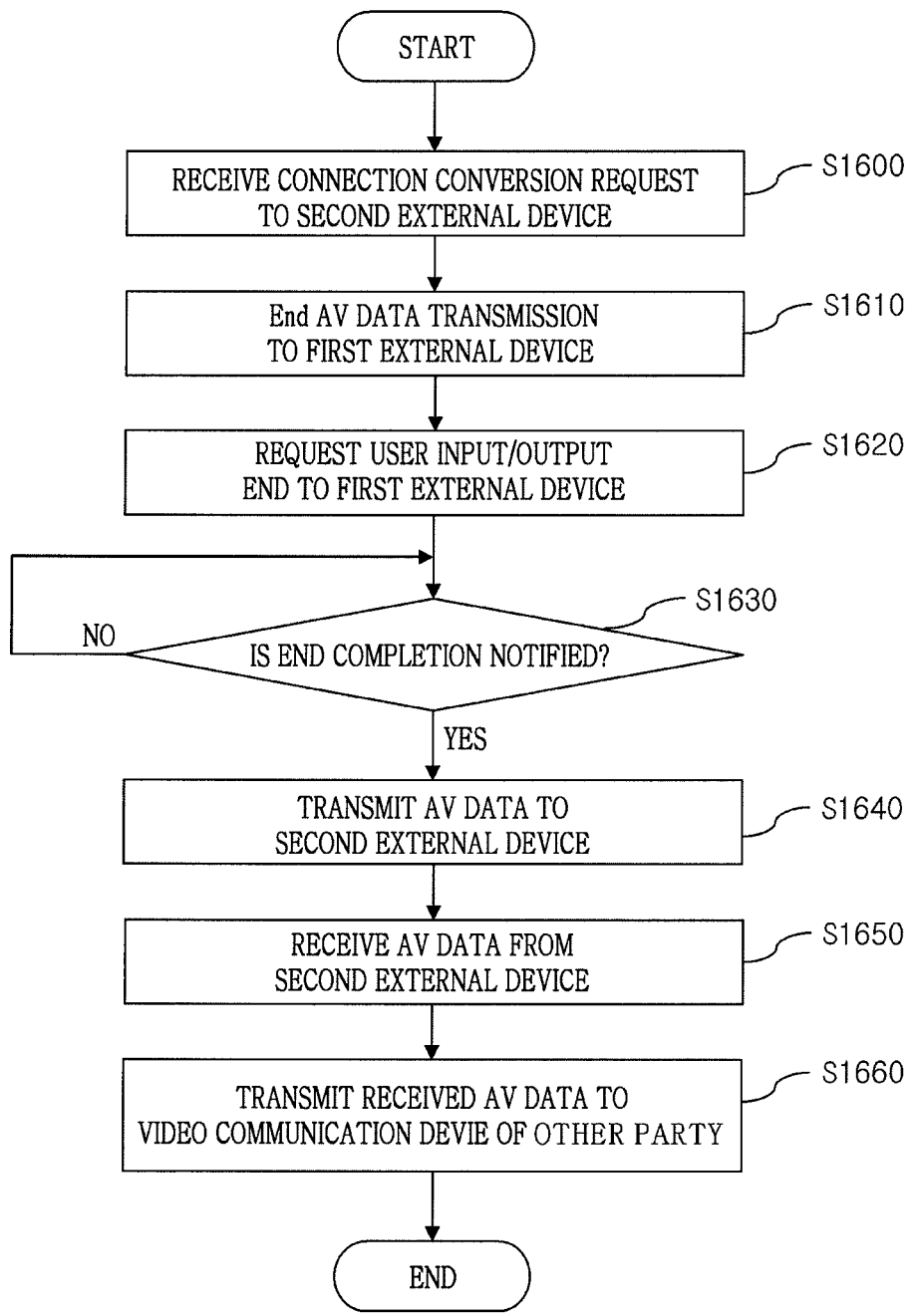
FIG. 87 is a flowchart showing a method for connecting video communication according to a fourth exemplary embodiment of the present invention.

FIG. 87 is a flowchart showing a method for connecting video communication according to a fourth exemplary embodiment of the present invention. The method for connecting video communication will be described in combination with the block diagram shown in FIG. 86. Meanwhile, the same features in the method for connecting video communication shown in FIG. 87 as those described with reference to FIGS. 75 to 86 may not be described hereafter.

Referring to FIG. 87, a second display device is requested to switch the video communication to a second external device 95 (S1600).

For example, the second display device 80 may route the video communication to a first external device 90 in accordance with a user's request, and the user who is having the video communication at the first external device 90 can request to the second display device 80 that the video communication be switched to the second external device 95, which is another external device.

According to the switch request, the second display device 80 ends the AV data transmission to the first external device 90 and requests the end of input/output of the user at the first external device 90.

Accordingly, the first external device 90 acquires the user input/output, for example, video and voice of the user, using the camera or the microphone and stops generation of the AV data, and notifies the end of the user input/output at the first external device 90 to the second display device 80, after the AV data transmission to the second display device 80 ends (S1630).

When receiving the end notification from the first external device 90, the second display device 80 then transmit the AV data received from the first display device 70 to the second external device 95 (S1640).

Further, the second display device 80 receives the AV data from the second external device 95 (S1650) and transmits the received AV data to the first display device 70.

The connection for transmission/reception of the AV data between the second display device 80 and the second external device 95 can be configured before the switch to the second external device 95 is requested, as described above with reference to FIG. 76, or may be configured after the switch request in step S1500 or after the end notification in step S1630.

Figure 88:
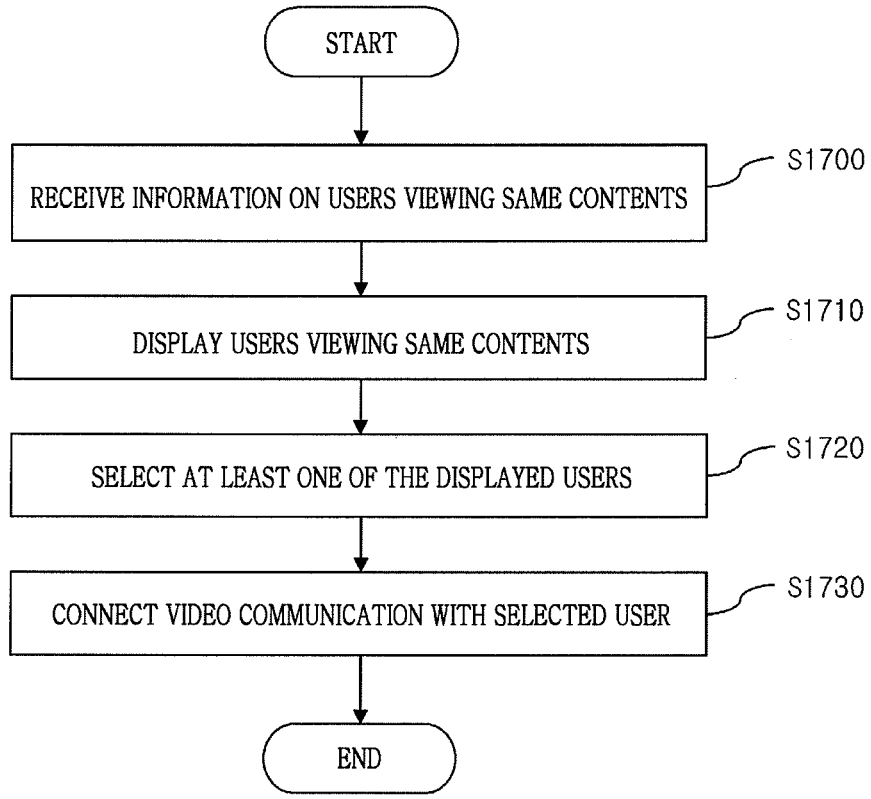
FIG. 88 is a flow chart showing a method for connecting video communication according to an exemplary embodiment of the present invention.

FIG. 88 shows a flowchart showing a method for connecting video communication according to an exemplary embodiment of the present invention. The method for connecting video communication shown in FIG. 88 will be described in combination with the block diagram shown in FIG. 2.

Referring to FIG. 88, the communication unit 100 of the second display device 80 receives information on users that watch the same contents as contents currently produced in the display unit 143 of the second display device 80 (S1700). For instance, the user at the second display device 80 can view a specific program and while viewing the program, the user can know other users at other devices who are currently viewing the same program.

The contents may be a plurality of contents such as real-time broadcast, COD (Contents on Demand), game, news, etc. To this end, the display device 80 may receive signals corresponding to the plurality of contents using a wired/wireless network.

Meanwhile, there may be content providers corresponding to the contents. In this case, the display device may be connected to the content providers according to a request by the user, thereby receiving a variety of contents such as real-time broadcast, COD, game, moving image, photograph, weather information, news, etc., provided by the content providers.

According to an exemplary embodiment of the present invention, the contents produced in the display unit 143 may be an image of a certain broadcast channel selected by the user. To this end, the display device may comprise a tuner that selects and receives a broadcast signal of a certain broadcast channel through an antenna or a cable.

Also, in step S1700, the communication unit 100 may receive the information on the users that watch the same contents as the currently produced contents from the server. The server may be a server that provides a video communication service or a server that provides a messenger service, for example.

The display unit 143 displays the users that watch the same contents using the received information (S1710), and the user input unit 145 receives a selection for at least one of the displayed users that watch the same contents (S1720).

Then, the communication unit 100 connects the video communication with the selected user (S1730).

Figure 89:
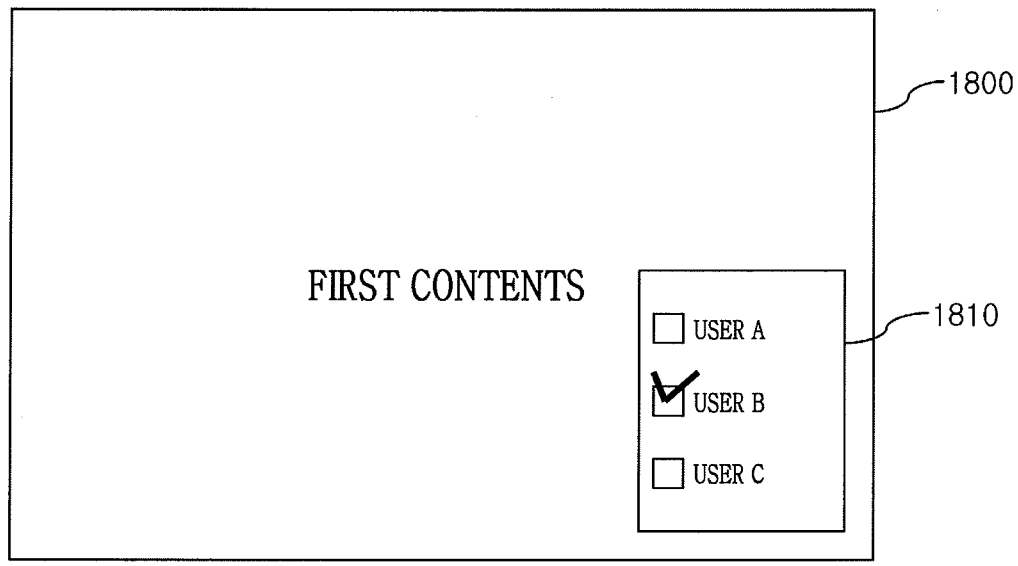
FIGS. 89 to 91 are diagrams showing a method for connecting video communication according to a first exemplary embodiment.

For instance, referring to FIG. 89, the display unit 143 of the second display device 80 may simultaneously display first contents as well as other users that are viewing the first contents, e.g., user A, user B, and user C on the screen 1800 of the second display device 80.

For example, a user information display window 1810 for displaying the other users that view the same contents may be displayed on a certain area of the screen 1800 of the second display device 80, and information on the other users that watch the same contents as well as the currently produced first contents may be displayed on the user information display window 1810. It can determined that the other users are viewing the same program if the same program is displayed on the devices of the other users.

Figure 90:
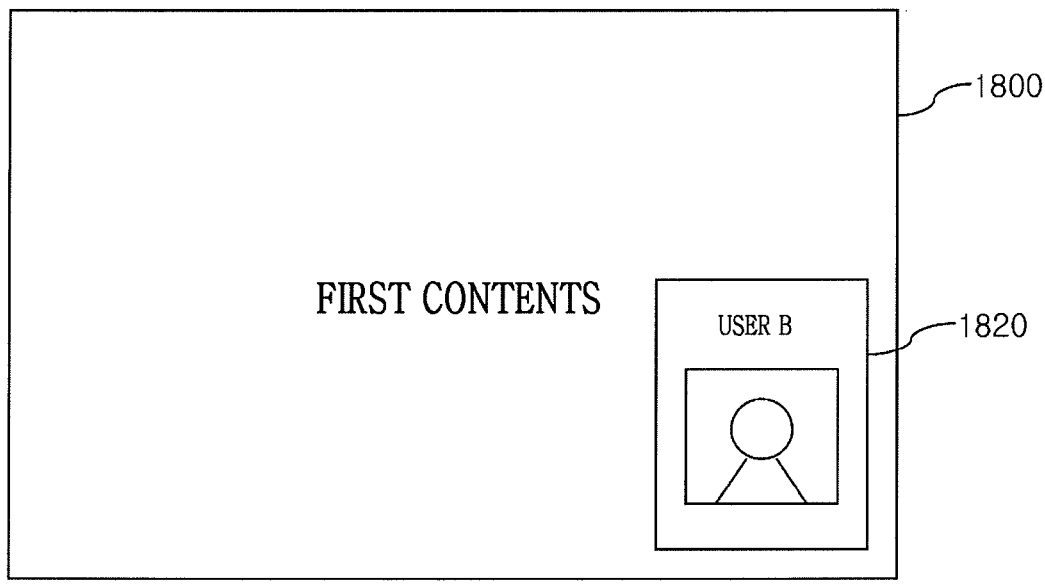

Also, the user at the second display device 80 may select the other user(s) to make a video communication with the other user(s) displayed on the user information display window 1810 using the user input unit 145. For example, in the case where the user selects the user B among the users that watch the same contents, a communication window 1820 for video communication is displayed on the screen 1800 as shown in FIG. 90, and the user may perform the video communication with the selected user B using the communication window 1820. As a result, the user may discuss the program being viewed or any other matter.

According to an exemplary embodiment of the present invention, a step of displaying the other users that watch the same contents on the screen 1800 as described above may be performed by a request by the user, for example, by a selection of "the same contents watching user view" button by the user.

Meanwhile, according to another embodiment of the present invention, the step of displaying the other users that watch the same contents may be performed by a contents information display request by the user.

Figure 91:
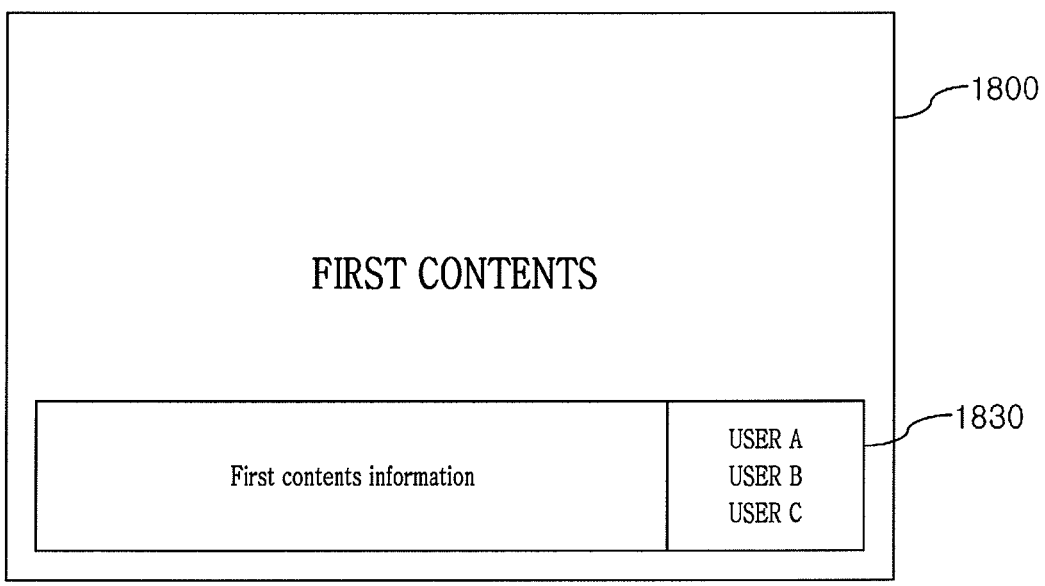

Referring to FIG. 91, the user may request the information on currently produced contents, and a contents information window 1830 including information on the requested first contents may be displayed on a certain area of the screen 1800, accordingly.

Meanwhile, the information window 1830 may include information on the other users watching the same contents as the currently produced contents. For example, a user A, a user B, and a user C who are other users watching the first contents may be displayed on the contents information window 1830 of the user's screen.

Also, the user may select one or more of the other user A, B, and C displayed on the contents information window 1830 to connect a video communication with the other user(s) as described above.

When the video communication is connected with the other user watching the same contents as the currently produced contents, all the users who are viewing the same contents may talk about the contents which they are currently watching, for example, the first contents as a common interest.

Hereinafter, a method for connecting video communication according to the embodiment of the present invention will be described in more detail with reference to FIGS. 92 to 96.

As described with reference to FIGS. 88 to 91, the other user watching the same contents displayed on the screen 1800 may be other users previously registered with the user of the display device as interested users.

For example, the user, may register other users as the interested users, and information on the interested users may be stored in the server corresponding to the user.

In this case, the server may collect the information on each of the registered interested users, more specifically, contents which each of the registered interested users is watching, for example, the information on the broadcast channel which each of the registered interested users is watching, and send the information on the other users watching the same contents as the same contents currently produced in the display device among the interested users to the display device using the collected information.

Meanwhile, the display device may display the users watching the same contents as the currently produced contents among the interested users on the screen 1800 using the information received from the server.

According to an exemplary embodiment of the present invention, the user of the display device may register desired other users as a 'friend', and the information on the other user registered as the 'friend' may be stored in the server that provides the video communication server or the server that provides the messenger service.

Meanwhile, the video communication server or the messenger server may obtain the information on the broadcast channel which the user of the display device and each of the other users registered as the 'friend' currently views or is interested in. For example, the server may receive the information on the viewing channel corresponding to each of the users from the display device.

Then, the server may confirm the other users viewing the same broadcast channel as the broadcast channel currently produced in the display device among the other users registered as the 'friend' using the obtained information, and send information on the other users registered as the 'friend' watching the same broadcast channel to the display device of the user according to the result of the confirmation.

Meanwhile, the server may send the viewing channel information on each of the other users registered as the 'friend' to the display device of the user.

The display device receiving the information from the server may display the other users watching the same broadcast channel among the other users registered as the 'friend' on the screen 1800 using the received information.

Figure 92:
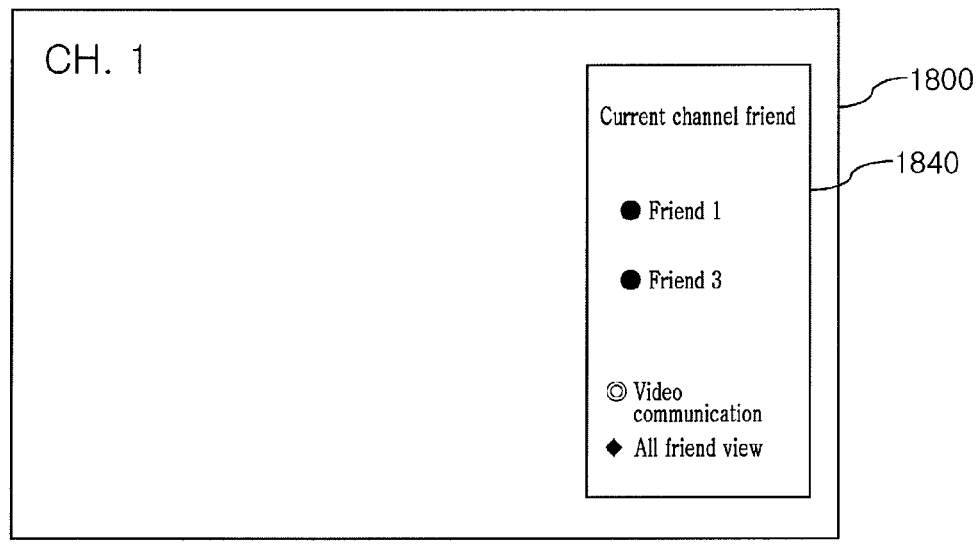
FIGS. 92 to 96 are diagrams showing a method for connecting video communication according to a second exemplary embodiment.

Referring to FIG. 92, the display unit 143 of the user displays an image of 'CH. 1' which is the broadcast channel currently selected by the user or displyed on the screen 1800 of the user. At the same time, the 'friends' watching the same broadcast channel as 'CH. 1' which is the current broadcast channel may be displayed on a certain area of the screen 1800.

For example, a friend information display window 1840 for displaying information on the other users registered as the 'friend' on the screen 1800 may be displayed, and 'Friend 1' and 'Friend 3' watching the same broadcast channel as the broadcast channel currently watched by the user, e.g., 'CH. 1', may be displayed on the friend information display window 1840 of the user's scren 1800.

The user may select one of the current channel friends displayed on the friend information display window 1840 and then request a video communication with the selected friend(s), thereby connecting the video communication with the selected friend(s).

Figure 93:
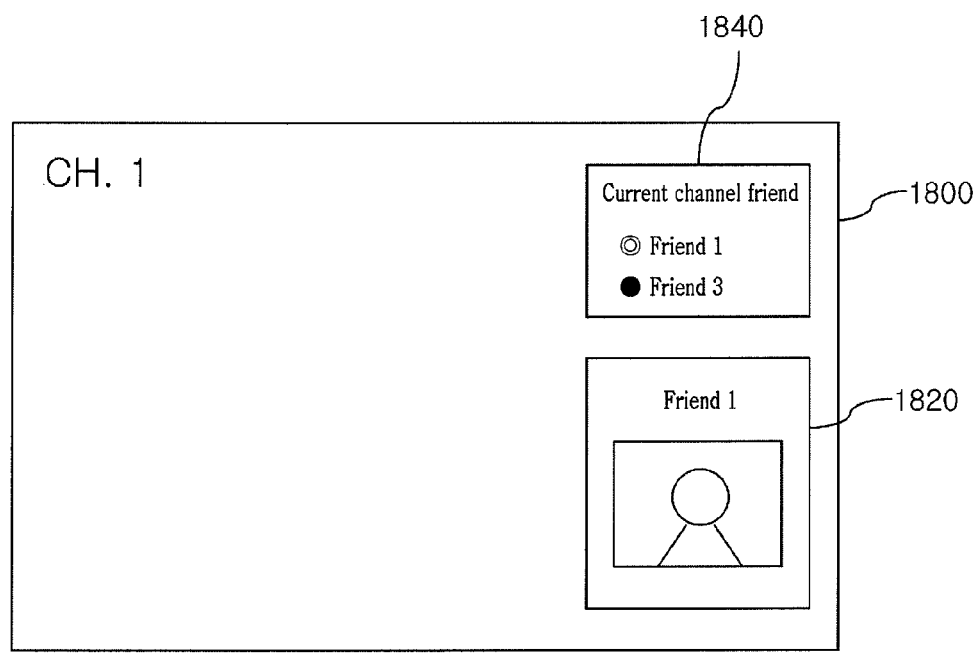

For example, in the case where the user selects 'Friend 1' among the current channel friends displayed on the friend information display window 1840 and presses a video communication button, the communication window 1820 for a video communication is displayed on the screen 1800 and the user may make a video communication with the selected 'Friend 1' using the communication window 1820, as shown in FIG. 93.

Figure 94:
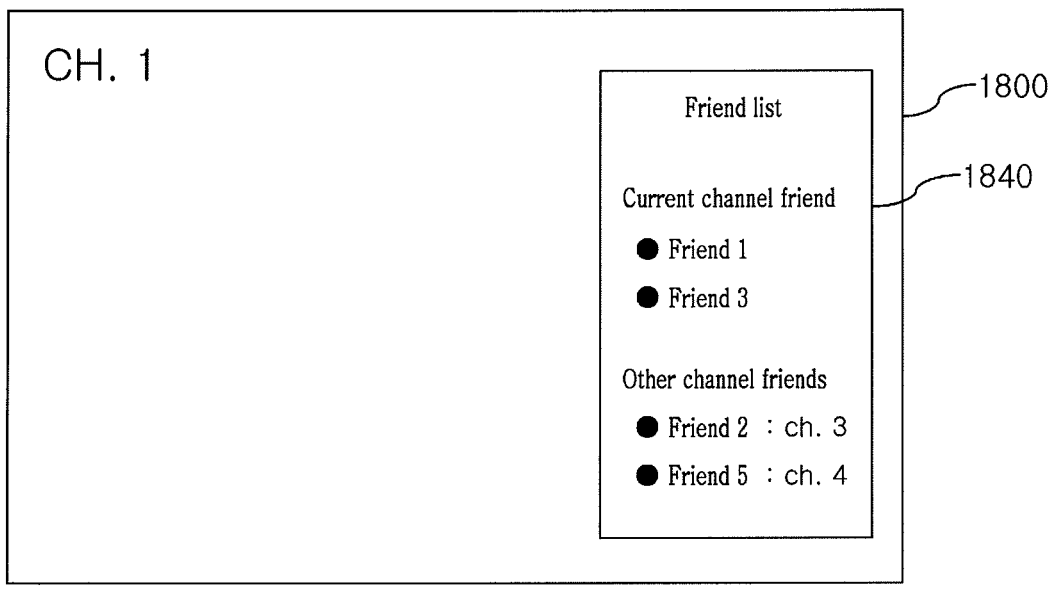

Meanwhile, the user may select 'all friend view' in the friend information display window 1840, and all users registered as the 'friend' may be displayed on the friend information display window 1840 as shown in FIG. 94, accordingly.

Referring to FIG. 94, all the other users registered as the 'friend' may be divided into 'current channel friend(s)' watching the same broadcast channel as the broadcast channel currently watched by the user and 'different channel friend (S)' watching different broadcast channel(s) from the current broadcast channel program, as displayed on the friend information display window 1840.

For example, 'Friend 1' and 'Friend 3' watching 'CH. 1' currently produced in the display device of the user are displayed as the 'current channel friend' and 'Friend 2' and 'Friend 5' watching different channels from the 'CH. 1' are displayed as the 'different channel friend', on the friend information display window 1840.

Meanwhile, as shown in FIG. 94, for each of the other users displayed as the 'different channel friend', the broadcast channel which the corresponding other user currently watches may be displayed together.

Figure 95:
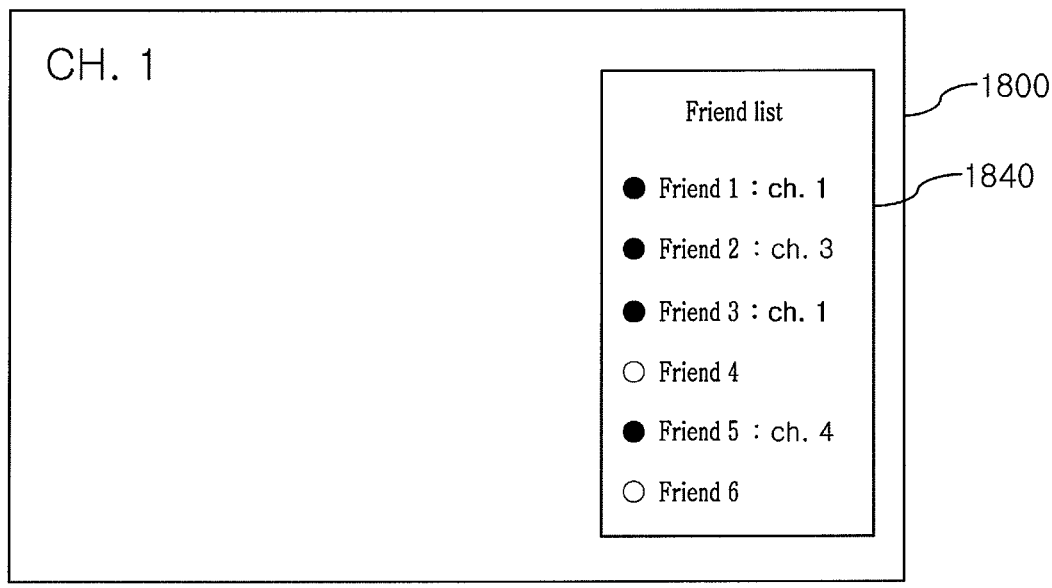

Also, if the user selects 'all friend view', the channels which each of all users registered as the 'friend' is currently watching and whether or not each of all the users registered as the 'friend' has been logged-in may be displayed on the friend information display window 1840 as shown in FIG. 95.

For instance, referring to FIG. 95, assume that users 1 to 6 are registered as the 'friend' of the user, and friends 1, 2, 3 and 5 are currently logged-in so that they are watching the broadcast channel, and friends 4 and are currently not logged-in. Such infomration may be displayed on the friend information display window 1840.

Meanwhile, for each of the 'friends' watching the broadcast channel, the broadcast channel which the corresponding user currently watches may be displayed together as shown in FIG. 95.

The user may select any one of the users registered as the 'friend' in the friend information display window 1840 as shown in FIG. 94 or FIG. 95 to connect a video communication with the selected friend. For example, the user may select any one of the users included in the 'current channel friend' as well as the users included in the 'different channel friend' to request the video communication with the selected friend(s).

Figure 96:
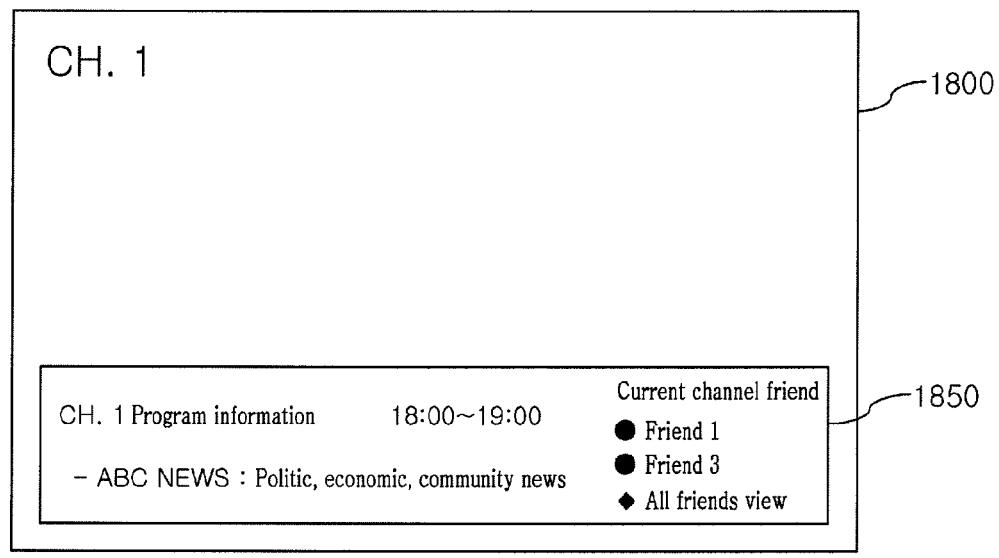

Referring to FIG. 96, the user may request a display of information on a broadcast channel which he is currently watching, for example, 'CH. 1' and a program information window 1850 including the information on the program broadcast in the 'CH. 1' may be displayed on a certain area of the screen 1800, accordingly.

Meanwhile, the program information window 1850 may include information on 'friends' watching the same broadcast channel as the currently produced broadcast channel. For example, 'Friend 1' and 'Friend 3' may be displayed as 'current channel friend' watching the 'CH. 1' on the program information window 1850.

Also, the user may receive a friend list as shown in FIG. 94 or FIG. 95 through the screen 1800 using 'all friend view' displayed on the program information window 1850.

Figure 97:
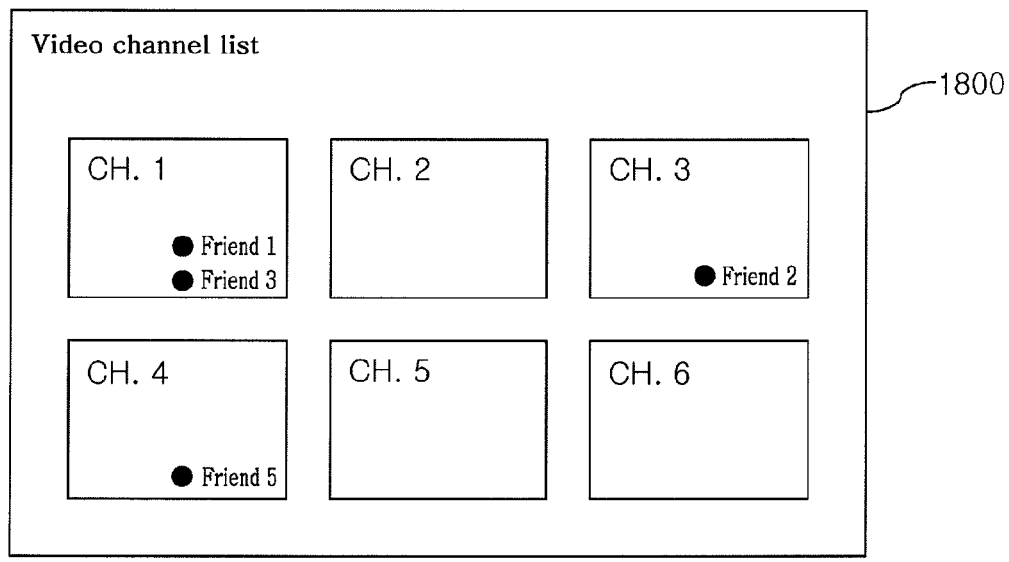
FIG. 97 is a diagram showing a method for displaying channel information according to an exemplary embodiment.

FIG. 97 shows an exemplary embodiment of a method for displaying channel information and in particular, an exemplary embodiment of a configuration of a channel browser displayed on a screen.

Referring to FIG. 97, the channel browser including thumbnail images corresponding to each of a plurality of broadcast channels capable of being received at a display device may be displayed on the screen 1800 of the display device of the user.

As such, since the channel browser includes the thumbnail images corresponding to each of the plurality of channels, the user may intuitively recognize contents broadcast in the plurality of channels.

Meanwhile, the channel browser displayed on the display unit may further include an editing menu. The editing menu may include a "locking" item performing a locking function in order to be unable to edit a selected thumbnail image, an "editing" item editing the selected thumbnail image, an "arranging" item arranging and displaying the thumbnail image, a "previous" item displaying a previous thumbnail image other than the displayed thumbnail image, a "next" item displaying a next thumbnail image other than the displayed thumbnail image, and an "exit' item performing movement from an "image channel list" to other menu items, etc.

Meanwhile, the thumbnail images displayed in the channel browser may be a still image or a moving image, and may be an image of contents currently received in a corresponding channel or an image of pre-stored contents.

Meanwhile, the thumbnail images may be images processed and output from a channel browsing processor of the display device.

If any one of a plurality of displayed thumbnail images is selected in the state where the channel browser is displayed, a broadcast signal image of a channel corresponding to the selected thumbnail image may be displayed on the screen 1800.

Also, the thumbnail images displayed within the channel browser may be arranged according to any one of channel number, preset preferred channel, recently watched channel, and preset deleted channel.

According to another embodiment of the present invention, for a plurality of broadcast channels included in the channel browser, it is possible to display information on 'Friend' currently watching each channel.

As shown in FIG. 97, it is possible to display 'Friends' currently watching 'CH. 1' to be corresponded to the thumbnail image of the 'CH. 1', e.g., 'Friend 1' and 'Friend 3', display 'Friend 2' currently watching 'CH 3' to be corresponded to the thumbnail image of the 'CH 3', and display 'Friend 5' currently watching 'CH 4' to be corresponded to the thumbnail image of the 'CH 4'.

Meanwhile, the user may connect a video communication with a desired friend using the watching channel information of 'Friend' displayed on the channel browser as described above. For example, the user may select the 'Friend 1' displayed corresponding to the thumbnail image of the 'CH. 1' to connect a video communication with the 'Friend 1' currently watching the 'CH. 1', and obtain more specific information on the program of the 'CH. 1' through the video communication.

Thus, the user may obtain objective program information displayed on a channel browser, e.g., program information provided from a broadcaster as well as information such as subjective evaluation of 'Friend' on the program, etc. Therefore, it is possible to easily select the channel.

The video communication methods according to the embodiments of the present invention may be produced as one or more software programs to be run in the computer(s) and/or other devices and may be stored in one or morecomputer-readable recording media. Examples of the computer-readable recording medium includes Read Only Memory, Random Access Memory, Compact Disc Read Only Memory, magnetic tape, floppy disc, optical data storage, etc., as well as those implemented in a form of carrier wave (for example, transmission through the Internet).

The computer-readable recording medium can be distributed over a computer system connected to a network so that a code capable of being read by a computer may be stored and run in a distributed manner. And, functional programs, codes, and code segments for implementing the video communication method may easily be inferred by programmers in the art to which the present invention pertains.

Although preferable embodiments of the present invention have been illustrated and described, the present invention is not limited to the above-mentioned specific embodiments. Various modifications thereof may be made by those skilled in the art without departing from the gist of the present invention claimed in the claims. These modifications should not be understood separately from technical idea or view of the present invention.

What is claimed is:

1. A digital TV comprising:
   a tuner configured to receive a digital broadcast signal;
   a storage unit configured to store facial information;
   a display unit configured to display contents included in the received digital broadcast signal;
   a camera unit configured to capture an image of multiple users watching contents included in the received digital broadcast signal; and
   a controller configured to:
   detect a plurality of facial information of the multiple users in the captured image,
   display a plurality of cropped face regions corresponding to the detected plurality of facial information on the display unit, wherein the plurality of cropped face regions are displayed in a window overlaid on the displayed contents included in the received digital broadcast signal,
   receive a selection signal to select one of the plurality of face regions displayed on the the display unit,
   display information indicating a user corresponding to the selected face region is logged into an application or function of the digital TV when the facial information corresponding to the selected face region is stored in the storage unit,
   display a registration menu on the display unit for registering the facial information when the facial information corresponding to the selected face region is not stored in the storage unit, and
   control the application or function of the digital TV based on a selected user whose facial information is stored in the storage unit.

2. A method for controlling a digital TV, the method comprising:
   receiving, via a tuner, a digital broadcast signal;
   storing, via a storage unit, facial information;
   displaying, via a display unit, contents included in the received digital broadcast signal;
   capturing, via a camera unit, an image of multiple users watching contents included in the received digital broadcast signal;
   detecting, via a controller, a plurality of facial information of the multiple users in the captured image;
   displaying, via the display unit, a plurality of cropped face regions corresponding to the detected plurality of facial information on the display unit, wherein the plurality of cropped face regions are displayed in a window overlaid on the displayed contents included in the received digital broadcast signal;

receiving, via the controller, a selection signal to select one of the plurality of face regions displayed on the display unit;

displaying, via the display unit, information indicating a user corresponding to the selected face region is logged into an application or function of the digital TV when the facial information corresponding to the selected face region is stored in the storage unit;

displaying, via the display unit, a registration menu on the display unit for registering the facial information when the facial information corresponding to the selected face region is not stored in the storage unit; and controlling, via the controller, the application or function of the digital TV based on a selected user whose facial information is stored in the storage unit.

3. The digital TV of claim 1, wherein when the facial information corresponding to the selected face region is stored in the storage unit, the controller is configured to log in the user to the application or function of the digital TV.

4. The digital TV of claim 1, wherein the controller is further configured to differently display the face regions based on the facial information being stored or not being stored in the storage unit.

5. The digital TV of claim 4, wherein the controller is further configured to display information for each face region indicating whether or not the facial information is stored or is not stored in the storage unit.

6. The method of claim 2, further comprising:

differently displaying the face regions based on the facial information being stored or not being stored in the storage unit.

7. The method of claim 6, further comprising:

displaying information for each face region indicating whether or not the facial information is stored or is not stored in the storage unit.

* * * * *